(12) United States Patent
Fukumoto et al.

(10) Patent No.: US 8,033,086 B2
(45) Date of Patent: Oct. 11, 2011

(54) LAWN MOWER WITH GRASS COLLECTION BOX

(75) Inventors: Takeshi Fukumoto, Osaka (JP); Kazuma Moriguchi, Osaka (JP); Koji Kawakami, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 59 days.

(21) Appl. No.: 12/450,851

(22) PCT Filed: Dec. 25, 2007

(86) PCT No.: PCT/JP2007/074798
§ 371 (c)(1),
(2), (4) Date: Nov. 23, 2009

(87) PCT Pub. No.: WO2008/136161
PCT Pub. Date: Nov. 13, 2008

(65) Prior Publication Data
US 2011/0120072 A1     May 26, 2011

(30) Foreign Application Priority Data

May 1, 2007 (JP) .................................. 2007-120817
May 10, 2007 (JP) .................................. 2007-126076
May 23, 2007 (JP) .................................. 2007-137175

(51) Int. Cl.
*A01D 43/00* (2006.01)
*A01D 43/06* (2006.01)

(52) U.S. Cl. ........................................ 56/202; 56/320.2

(58) Field of Classification Search ..................... 56/202, 56/16.6, 320.2; 15/83, 79.1; 298/11; 414/387, 414/421, 471
See application file for complete search history.

(56) References Cited

U.S. PATENT DOCUMENTS

| | | | | |
|---|---|---|---|---|
| 3,461,474 A | * | 8/1969 | McCandless | ..................... 15/83 |
| 3,744,653 A | * | 7/1973 | Jensen | ........................... 414/471 |
| 3,816,986 A | * | 6/1974 | Van Der Gaast | ................. 56/202 |
| 4,476,668 A | * | 10/1984 | Reilly | ............................. 56/202 |
| 4,487,007 A | * | 12/1984 | Mullet et al. | ................... 56/16.6 |

(Continued)

FOREIGN PATENT DOCUMENTS

JP     04099409 A   *   3/1992

(Continued)

*Primary Examiner* — Arpad Fabian-Kovacs
(74) *Attorney, Agent, or Firm* — Jordan and Hamburg LLP

(57) ABSTRACT

A lawn mower is provided with a lawn mowing mechanism, a grass collection box receiving grass mowed by the lawn mowing mechanism, a lift mechanism for lifting the grass collection box high, and a rear lid plate structured such as to openably close an opening in the rear surface of the grass collection box wherein an improvement is achieved in the stability of a support at a time of lifting up the grass collection box high in the case of discharging the mowed grass in the grass collection box in a state of lifting up the grass collection box high, and also achieves a downsizing and a weight saving. A bottom portion of the grass collection box is opened, the opened bottom portion being operably closed by a bottom lid plate, and the mowed grass is discharged from the grass collection box by an opening actuation of the bottom lid plate and the rear lid plate.

2 Claims, 52 Drawing Sheets

U.S. PATENT DOCUMENTS

| | | | | |
|---|---|---|---|---|
| 4,523,788 A | * | 6/1985 | Prasad | 298/11 |
| 4,569,187 A | * | 2/1986 | Spiker et al. | 56/202 |
| 4,709,541 A | * | 12/1987 | Broman et al. | 56/202 |
| 4,989,917 A | * | 2/1991 | Schmidt, Jr. | 298/11 |
| 5,193,882 A | * | 3/1993 | Gamaldi | 298/11 |
| 5,778,648 A | * | 7/1998 | Parkes et al. | 56/202 |
| 6,513,312 B1 | | 2/2003 | Ishimori et al. | |
| 6,766,633 B2 | * | 7/2004 | Wanie et al. | 56/202 |
| 7,047,718 B2 | * | 5/2006 | Caroni | 56/205 |
| 7,325,389 B2 | * | 2/2008 | Walker | 56/205 |
| 7,617,663 B1 | * | 11/2009 | Walton et al. | 56/202 |
| 7,730,706 B2 | * | 6/2010 | Ogata et al. | 56/203 |

FOREIGN PATENT DOCUMENTS

| | | | |
|---|---|---|---|
| JP | 5-38220 | | 2/1993 |
| JP | 11056064 A | * | 3/1999 |
| JP | 2001-275438 | | 10/2001 |
| JP | 2002-084950 | | 3/2002 |
| JP | 2003-033107 | | 2/2003 |
| JP | 2004-141038 | | 5/2004 |
| JP | 2006141344 A | * | 6/2006 |
| JP | 2006-304729 | | 11/2006 |

* cited by examiner

BRAKE CANCELLATION

LAWN MOWER WITH GRASS COLLECTION BOX

TECHNICAL FIELD

The present invention relates to a lawn mower which is provided with a lawn mowing mechanism mowing grass on a ground surface, and a grass collection box collecting grass mowed by the lawn mowing mechanism, and more particularly to a lawn mower structured such as to discharge the mowed grass from the grass collection box after lifting up the grass collection box to a predetermined height position.

BACKGROUND ART

Conventionally, this kind of lawn mower has been structured such as to continuously mow lawn grass standing on a ground surface by the lawn mowing mechanism and collect the grass in the grass collection box via a discharge duct extending rearward from the lawn mowing mechanism. One example of the lawn mower is disclosed in Patent Documents 1 and 2.

The lawn mowers in the patent documents 1 and 2 are of a so-called high dump specification, and are provided with a lift mechanism for lifting up a grass collection box to a predetermined height position. A rear surface opening portion of the grass collection box is closed by a rear lid plate which can be opened and closed. In this case, since the grass collection box is rotated so as to change its attitude in such a manner that the rear surface opening portion is directed downward (faces to the ground surface) while opening the rear lid plate after lifting up the grass collection box filled with the mowed grass to the predetermined height position by driving the lift mechanism, the mowed grass in the grass collection box is discharged to a container, a loading platform of a truck or the like from the high position.

Patent Document 1: Japanese Unexamined Patent Publication No. 2001-275438
Patent Document 2: Japanese Unexamined Patent Publication No. 2002-84950

DISCLOSURE OF THE INVENTION

Problem to be Solved by the Invention

However, in the conventional structure mentioned above, since the mowed grass received in the grass collection box is discharged by widely rotating the grass collection box backward in such a manner that the opening in the rear surface is directed downward, under a state in which the grass collection box is lifted up high, a height of gravity center of the grass collection box becomes high from the ground surface at a time of discharging. Accordingly, there is a problem that it becomes unstable to support the grass collection box in a state of lifting up high, such as the grass collection box tends to swing in a lateral direction.

Further, it is necessary to widely rotate the grass collection box backward in such a manner that the opening of the rear surface is directed downward, under a heavy state in which the mowed grass is put in the grass collection box, and it is necessary to construct a mechanism (for example, a hydraulic cylinder or the like) for rotating backward as a mechanism having a great output (a great size), so that a weight of the grass collection box increases largely. Accordingly, not only an unstableness of the support in the state in which the grass collection box is lifted up high is increased, but also there is a problem that an increase of scale and an increase of weight of the lift mechanism are caused, and an increase of scale and an increase of weight of a whole of the lawn mower are caused as well.

A technical object of the present invention is to provide a lawn mower which can dissolve these problems.

Means for Solving the Problem

In order to achieve the technical object, in accordance with a first aspect of the present invention, there is provided a lawn mower comprising:
 a lawn mowing mechanism installed to a traveling machine body;
 a grass collection box for receiving grass mowed by the lawn mowing mechanism in a forward attitude;
 a lift mechanism for lifting up the grass collection box in the forward attitude;
 the grass collection box having a rear lid plate for openably closing an opening formed in a rear surface thereof,
 wherein the lawn mower is provided with a bottom lid plate for opening a bottom portion of the grass collection box and openably closing the opened bottom portion, and the mowed grass in the grass collection box is discharged by an opening actuation of the bottom lid plate and the rear lid plate.

In accordance with a second aspect of the present invention, there is provided a lawn mower as recited in the first aspect, wherein the bottom lid plate is coupled to the rear lid plate or an opening and closing mechanism thereof in such a manner as to rotate to open in accordance with the opening actuation of the rear lid plate.

In accordance with a third aspect of the present invention, there is provided a lawn mower as recited in the second aspect, wherein the bottom lid plate is coupled to the rear lid plate or an opening and closing mechanism thereof via a flexible member which is arranged in the grass collection box.

In accordance with a fourth aspect of the present invention, there is provided a lawn mower as recited in the first aspect, wherein the bottom lid plate is structured such as to rotate to open in such a manner that a front portion side is bounded up toward an inner portion of the grass collection box and a rear portion side comes down, and a bottom portion guide plate protruding from a mowed grass receiving port of the grass collection box toward the discharge duct in a state of closing the bottom lid plate is attached to a front portion of the bottom lid plate in such a manner as to integrally move with the bottom lid plate.

In accordance with a fifth aspect of the present invention, there is provided a lawn mower as recited in the fourth aspect, wherein the bottom portion guide plate and the mowed grass receiving port of the grass collection box are formed such that they do not interfere with each other in process of the opening and closing rotation of the bottom lid plate.

In accordance with a sixth aspect of the present invention, there is provided a lawn mower as recited in the fourth aspect, wherein a center of the opening rotation of the bottom lid plate is positioned between a front end and a rear end of the bottom lid plate.

In accordance with a seventh aspect of the present invention, there is provided a lawn mower as recited in the sixth aspect, wherein the center of the opening rotation of the bottom lid plate is positioned which is shifted rearward from a center position between the front end and the rear end of the bottom lid plate.

In accordance with an eighth aspect of the present invention, there is provided a lawn mower as recited in the fourth aspect, wherein the bottom lid plate is structured such as to be rotatable to open in a state in which the grass collection box is held at a down position for receiving the mowed grass.

In accordance with a ninth aspect of the present invention, there is provided a lawn mower as recited in the eighth aspect, wherein the bottom lid plate rotating to open in a state in which the grass collection box is at the down position is held in a discharge inclined attitude in which a leading end portion of the bottom portion guide plate is faced to an upper portion of a mowed grass discharge port of the discharge duct.

In accordance with a tenth aspect of the present invention, there is provided a lawn mower as recited in the first aspect, wherein the lawn mower is provided with an outrigger protruding toward the ground surface so as to come close thereto by a driving motion of an elevating hydraulic cylinder of the lift mechanism, at any moment from a time before lifting up the grass collection box to a partway of the lift.

Effect of the Invention

The mowed grass discharging work of the lawn mower according to the present invention is as follows, for example. First of all, the mowed grass is received in the grass collection box in accordance with a progress of the mowing work by the lawn mowing mechanism. If a predetermined amount of mowed grass is received in the grass collection box, the lift mechanism lifts up the grass collection box to a high position. Since the bottom lid plate of the bottom portion and the rear lid plate of the rear surface in the grass collection box are opened, in the lifted state, the mowed grass in the grass collection box is discharged from a position which is high away from the ground surface.

In other words, since the discharge of the mowed grass from the grass collection box is carried out by the opening actuation of the bottom lid plate and the rear lid plate, and it is not necessary to widely rotate a whole of the grass collection box rearward in a state of lifting up high as is different from the conventional one, it is possible to widely lower the height of gravity center from the ground surface in the state of lifting up high in comparison with the conventional case.

Particularly, in accordance with the invention as described in the second aspect, in the lawn mower described in the first aspect, since the bottom lid plate is coupled to the rear lid plate or the opening and closing mechanism thereof in such a manner as to rotate to open in accordance with the opening actuation of the rear lid plate, it is possible to downsize the mechanism for executing the opening and closing actuation of the bottom lid plate and the rear lid plate, and it is possible to save the weight of the grass collection box. Accordingly, it is possible to improve a stability of support in a state in which the grass collection box is lifted up high, and it is possible to achieve a downsizing and a weight saving of the lift mechanism, and a downsizing and a weight saving of a whole of the lawn mower as well.

Further, in accordance with the invention described in the third aspect, in the lawn mower described in the second aspect, since the interlocking and coupling of the bottom lid plate with respect to the rear lid plate or the opening and closing mechanism thereof is carried out by the flexible member, it is possible to have the mechanism (the flexible member) for interlocking and coupling built in the grass collection box, and it is possible to achieve a further downsizing and weight saving of the grass collection box as well. Accordingly, it is possible to achieve a further downsizing and weight saving of a whole of the lawn mower.

In accordance with the invention described in the fourth aspect, in the lawn mower described in the first aspect, since the bottom lid plate is structured such as to rotate to open in such a manner that the front portion side is bounded up toward the inner portion of the grass collection box and the rear portion side comes down, and the bottom portion guide plate protruding from the mowed grass receiving port of the grass collection box toward the discharge duct in the state of closing the bottom lid plate is attached to the front portion of the bottom lid plate in such a manner as to integrally move with the bottom lid plate, the bottom side portion between the discharge duct and the mowed grass receiving port of the grass collection box (the joint portion) is closed by the bottom portion guide plate, at a time of a normal mowing work. Accordingly, it is possible to smoothly guide the mowed grass discharged from the discharge duct into the grass collection box via the bottom portion guide plate, and it is possible to suppress an overspill of the mowed grass from the bottom side of the joint portion at a time of recovering the mowed grass in the grass collection box.

Further, since the bottom portion guide plate is activated to open together with the bottom lid plate, at a time of discharging the mowed grass in the state in which the grass collection box is lifted up high, not only the mowed grass piled up on the bottom lid plate, but also the mowed grass piled up on the bottom portion guide plate fall down. In other words, it is possible to smoothly and securely discharge not only the mowed grass on the bottom lid plate but also the mowed grass on the bottom portion guide plate out of the grass collection box, at a time of discharging the mowed grass, while it is possible to suppress the overspill of the mowed grass from the bottom side of the joint portion, at a time of recovering the mowed grass in the grass collection box.

In accordance with the invention described in the fifth aspect, in the lawn mower described in the fourth aspect, since the bottom portion guide plate and the mowed grass receiving port of the grass collection box are formed such the shape that they do not interfere with each other in process of the opening and closing rotation of the bottom lid plate, the bottom portion guide plate can smoothly enter into the grass collection box without catching on a peripheral edge of the mowed grass receiving port of the grass collection box, in process of the opening and closing rotation of the bottom lid plate. Accordingly, both the bottom lid plate and the bottom portion guide plate can widely rotate to open, and it is possible to smoothly discharge the mowed grass on the bottom lid plate and the bottom portion guide plate out of the grass collection box.

In accordance with the invention described in the sixth aspect, in the lawn mower described in the fourth aspect, since the center of the opening rotation in the bottom lid plate is positioned at the position between the front end and the rear end of the bottom lid plate, the mowed grass during the discharging drop comes into contact with the rear portion of the bottom lid plate, at a time of rotating to open the bottom lid plate at a time of discharging the mowed grass, and the bottom lid plate is widely rotated to open in such a manner as to automatically bound up further by the weight of the sliding mowed grass regardless of the opening actuation of the rear lid plate. Therefore, it is possible to smoothly discharge the mowed grass in the grass collection box.

In accordance with the invention described in the seventh aspect, in the lawn mower described in the sixth aspect, since the center of the opening rotation in the bottom lid plate is positioned at the position which is shifted rearward from the center position between the front end and the rear end of the bottom lid plate, it is possible to automatically carry out the closing rotation of the bottom lid plate by the weight of the front portion side thereof.

In accordance with the invention described in the eighth aspect, in the lawn mower described in the fourth aspect, since the bottom lid plate is structured such as to be rotatable to open in the state in which the grass collection box is held at the down position for receiving the mowed grass, it is possible to easily execute the discharging work while keeping the grass collection box be arranged in the rear portion of the traveling machine body. Further, it is possible to easily carry out a change-over work from the mowed grass recovery work to the discharging work and vise versa without replacing the grass collection box, for example, by a discharge cover. Accordingly, if the invention described in the eighth aspect is employed, it is possible to achieve an effect of easy handling with a reduced work burden of an operator in spite of the lawn mower having high utility which can be used for the mowed grass recovery work and the discharge work by one.

In accordance with the invention described in the ninth aspect, in the lawn mower described in the eighth aspect, since the bottom lid plate rotating to open in the state in which the grass collection box is at the down position is structured such as to be held in the discharge inclined attitude in which the leading end portion of the bottom portion guide plate is faced to the upper portion of the mowed grass discharge port of the discharge duct, the lower surface of the bottom lid plate serves as the guide surface guiding the mowed grass to the ground surface, in the state in which the bottom lid plate is held in the discharge inclined attitude. In other words, the bottom lid plate can serve as a deflector changing a discharge end of the mowed grass, and can smoothly discharge the mowed grass discharged from the discharge duct to the ground surface by a guide action (a deflector action) of the bottom lid plate.

In accordance with the invention described in the tenth aspect, in the lawn mower described in the first aspect, since the lawn mower is provided with the outrigger protruding toward the ground surface so as to come close thereto by the driving motion of the elevating hydraulic cylinder of the lift mechanism, at any moment from the time before lifting up the grass collection box to the partway of the lift, it is possible to securely reduce a risk that the lawn mower is inclined in a state in which the grass collection box is lifted up high, at a time of discharging the mowed grass. Further, since the outrigger moves to protrude at any moment from the time before lifting up the grass collection box to the partway of the lift, it is possible to securely avoid the outrigger from forming an obstacle for a normal travel of the lawn mower. Further, since the protrusion of the outrigger is structured such as to come close to the ground surface, it is possible to travel the lawn mower so as to come close to the container for the grass collection while keeping the outrigger protrude.

BEST MODE FOR CARRYING OUT THE INVENTION

A description will be given below of embodiments obtained by specifying the present invention with reference to the accompanying drawings (FIGS. 1 to 52).

1. First Embodiment (1) Outline of Lawn Mower

FIGS. 1 to 21 show a first embodiment according to the present invention. In these drawings, reference numeral 1 denotes a passenger riding type lawn mower. The lawn mower 1 has a traveling machine body 2 constructed by a pair of right and left side frames 3 extending in a longitudinal direction, the traveling machine body 2 is supported by a pair of right and left front wheels 5 grounding on a ground surface 4, and a pair of right and left rear wheels 6 grounding on the ground surface 4, and the traveling machine body 2 is provided in its upper surface with an engine 7, a control handle 8 and a control seat 9 in a sequential order from a front portion, and is provided with a hood cover 10 detachably covering the engine 7, a step table 11 with respect to the control seat 9 and a fender 12 covering both the rear wheels 6. In this case, if an operator seating on the control seat 9 rotationally controls the control handle 8, a hydraulic torque generator 137 mentioned below (refer to FIG. 15) for a power steering is activated in correspondence to a control amount (an amount of rotation), and a steered angle (a steering angle) of the right and left front wheels 5 is changed.

A transmission case 61 having a hydrostatic type (HST type) continuously variable transmission 95 mentioned below or the like is arranged below the control seat 9. In the first embodiment, rear portions of both the right and left side frames 3 are formed as forward low and rearward high type inclined portions, and the transmission case 61 is supported to both the inclined portions. Further, the transmission case 61 is structured such as to travel forward or travel backward by appropriately changing a power from the engine 7 and transmitting the power to the right and left rear wheels 6.

A rotary type lawn mowing mechanism 13 structured such as to mow a lawn grass on the ground surface 4 by a drive of a power transmission from the engine 7 is provided at a position between the front wheels 5 and the rear wheels 6, in a lower surface of the traveling machine body 2, so as to be movable up and down, and a discharge duct 14 structured such as to discharge the grass mowed by the rotary type lawn mowing mechanism 13 to a rear side of the traveling machine body 2 is provided at a position between both the rear wheels 6, so as to extend rearward.

In this case, a rope hanging device 15 formed by bending a metal rod in a semicircular loop shape or the like is detachably attached to an outer surface of a center portion in both the rear wheels 6, as shown in FIGS. 1 and 2, by simultaneously fastening a plurality of bolts 15a for detachably attaching a hub in the center of the rear wheels 6 with respect to an axle thereof, thereby structuring such that a rope or a chain for fixing a rear portion of the lawn mower 1 to a trailer or the like can be hanged with respect to the rope hanging device 15, at a time of mounting the lawn mower 1 on the trailer or the like for transportation.

The rope hanging device 15 is not limited to be formed in the loop shape, but may be constructed as a hook shape, however, in the case that it is constructed as the semicircular loop shape as illustrated, there is advantages that it is possible to improve a rigidity, as well as it is possible to reduce a matter that the grass or the like enwinds. Further, the rope hanging device 15 having the structure mentioned above may be provided on the front wheels 5 in place of the rear wheels 6, or may be provided on both of the front wheels 5 and the rear wheels 6.

A grass collection discharge mechanism 16 is installed to the rear portion of the lawn mower 1 in such a manner as to collect and lift up high so as to discharge the mowed grass discharged rearward from the discharge dust 14, which will be in detail mentioned below. On the other hand, a weight 17 for achieving a weight balance between front and rear with respect to the grass collection discharge mechanism 16 is attached to the front portion of the lawn mower 1.

A fuel tank 62 supplying a fuel to the engine 7 is mounted to a rear end portion of the inclined portion in both the right and left side frames 3. An oil tank 63 for supplying a working fluid to the hydrostatic type continuously variable transmission 95 or the like of the transmission case 61 is mounted to an outer side of the inclined portion of the right side frame 3. A battery 64 used for starting the engine 7 is mounted to an outer side of the inclined portion of the left side frame 3 (in an opposite side to the oil tank 63 with respect to the fuel tank 62).

(2) Power Transmission System

Next, a description will be given of a power transmission system of the lawn mower with reference to FIGS. 1 and 2.

In the lawn mower 1 in accordance with the first embodiment, there is employed a two-wheel drive system that a part of a rotational power of the engine 7 is distributed to both the right and left rear wheels 6. In other words, a part of the rotational power of the engine 7 is transmitted from a rear end portion of an output shaft 65 protruding outward to front and rear sides from the engine 7 to the transmission case 61 via a propeller shaft 66 having universal joints in both front and rear ends, a traveling transmission relay case 67 arranged at a forward position of the transmission case 61 and an endless input belt 68. Further, it is transmitted to right and left axles existing in a rear side of the traveling machine body 1 via right and left endless rear wheel drive chains 70 from horizontal right and left rear wheel drive shafts 69 provided in the transmission case 61 so as to protrude outward to right and left sides. As a result, the right and left rear wheels 6 attached to the right and left axles are rotationally driven.

On the other hand, the other rotational power of the engine 7 is transmitted to a PTO shaft 72 arranged rotatably below the engine 7 via an endless PTO transmission belt 71 for transmitting a PTO power, from a front end portion of the output shaft 65. Next, it is power transmitted to a mower gear box 74 arranged at a further right side position of the right side frame 3 in an upper surface of the lawn mowing mechanism 13, via an intermediate shaft 73 having universal joints in both front and rear ends, from the PTO shaft 72. As a result, a pair of right and left mowing blades (not shown) constructing the lawn mowing mechanism 13 are rotationally driven, and the mowed grass is collected to the center of a lateral width of the lawn mowing mechanism 13 so as to be discharged to the discharge duct 14, while mowing the lawn grass or the like on the ground surface by both the mowing blades.

(3) Structure of Grass Collection Discharge Mechanism

Next, a description will be given of a structure of the grass collection discharge mechanism with reference to FIGS. 1 to 9.

The grass collection discharge mechanism 16 is provided with a grass collection box 18 having an opening portion (a mowed grass receiving port) 18a in which a rear end of the discharge duct 14 faces to a front surface, and a lift mechanism 19 structured such as reciprocally move up and down the grass collection box 18 between a forward attitude (an attitude in which a front surface side is opened) receiving the mowed grass discharged from the discharge duct 14 at a down position, and a state of being lifted up high while keeping the forward attitude.

(3-1) Details of Grass Collection Box

The grass collection box 18 of the grass collection discharge mechanism 16 is structured such that both right and left side surfaces and an upper surface are surrounded by a side surface plate 18b and a ceiling plate 18c made of an air-permeable plate such as a porous plate (a punching plate), a metal net or the like, and a bottom surface and a rear surface are open, and the open bottom surface and the open rear surface of the grass collection box 18 are structured such as to be respectively closed by an openable bottom lid plate 20 and an openable rear lid plate 21.

The bottom lid plate 20 is rotatably pivoted to a lower end of a bracket member 22 firmly attached to an outer side of both the right and left side surface plates 18b of the grass collection box 18 by a pivot pin 23. The bottom lid plate 20 is structured such that a rigidity thereof is enhanced by folding a thin metal plate having air permeability such as a porous plate (a punching plate), a metal net or the like into a low saw-toothed cross section, for example, by repeatedly providing an inclined portion 20a which is inclined upward diagonally at a comparatively gentle angle from a front end to a rear side, and a vertical portion 20b bent downward from a rear end of the inclined portion 20a at plural times, as shown in FIG. 5.

A position of the pivot pin 23 is positioned which is closer to a front side than a rear side of the bottom lid plate 20, and is shifted to a rear end at an appropriate dimension from a center position between the front end and the rear end of the bottom lid plate 20. Accordingly, the bottom lid plate 20 comes into contact with an upper surface of a transverse member 39 coupling between lower ends of both the right and left side surface plates 18b of the grass collection box 18 by a weight of a front side of the pivot pin 23 in a normal state, and closes all the opened bottom portions of the grass collection box 18, however, it is structured such that the front end is rotated so as to open in such a manner that the front end is bounded up around the pivot pin 23, if an external force is applied downward to the rear end portion.

On the other hand, the rear lid plate 21 is also made of the air permeable plate such as the porous plate (the punching plate), the metal net or the like, and is structured such as to be actuated so as to open and close between a state of closing the open rear surface of the grass collection box 18, and a state of opening so as to be bounded up from the rear surface, by rotatably coupling to a pair of upper and lower links 24 and 25 which are rotatably pivoted to the outer side surfaces of both the right and left side surface plates 18b of the grass collection box 18 in both right and left side surfaces by pin shafts 24a and 25a. The opening and closing action is carried out by a double acting type opening and closing the hydraulic cylinder 26 which is installed between the bracket member 22, and the lower link 25 in a pair of upper and lower links 24 and 25.

If the rear lid plate 21 is bounded up and rotated in such a manner as to open the rear surface of the grass collection box 18 by a piston protruding motion of the opening and the closing hydraulic cylinder 26, by coupling between the rear lid plate 21 and the front end portion of the bottom lid plate 20, with a flexible member such as a pair of right and left metal wires 27 or chains corresponding to one example of a connecting means arranged in the inner portion of the grass collection box 18, the bottom lid plate 20 is rotated in such a manner that a front end thereof is bounded up and a rear end thereof comes down working therewith via the metal wire 27 so as to open the bottom surface of the grass collection box 18, and if the rear lid plate 21 is returned to the state of closing the rear surface of the grass collection box 18 by a piston rearward movement of the opening and closing hydraulic cylinder 26, the bottom lid plate 20 is structured such as to be returned to the state of closing the bottom surface of the grass collection box 18 by its front weight working therewith.

In the case that the flexible member is constructed by the metal wire 27 as mentioned above, the metal wire 27 is set to a state of being twisted against elasticity at an appropriate angle (for example, 90 to 180 degree) around the longitudinal axis, at a time of rotatably coupling both ends of both the metal wires 27 to the bottom lid plate 20 and the rear lid plate 21 by the pins 27a and 27b, and is coupled by the pins 27a and 27b in this state.

Accordingly, when the bottom lid plate 20 and the rear lid plate 21 are in the closed state, a portion of the metal wire 27 which is loosened in the process can be maintained in a state of coming into contact with the upper surface of the bottom lid plate 20 as shown in FIG. 1, by the twisting. Accordingly, it is possible to avoid the metal wire 27 forming an obstacle at a time when the mowed grass is received into the grass collection box 18.

In this case, the other embodiment can be structured such that the bottom lid plate 20 is rotated to open working with the opening actuation of the rear lid plate 21, by coupling in an interlocking manner one of the upper and lower links 24 and 25 corresponding to the opening and closing mechanism for the rear lid plate 21 or the opening and closing hydraulic cylinder 26, and the bottom lid plate 20, in both the outer sides of the grass collection box 18.

In a lower side of the front surface opening portion (the mowed grass receiving port) 18a of the grass collection box 18, there is provided a bottom portion guide plate 28 for smoothly guiding the mowed grass discharged rearward from the rear end of the discharge duct 14 into the grass collection box 18 without spilling. As shown in FIGS. 4, 9, 11 and 12, the bottom portion guide plate 28 protrudes toward the discharge duct 14 from the front surface opening portion 18a (the mowed grass receiving port) of the grass collection box 18, in a state in which the bottom lid plate 20 is closed. The front end portion of the bottom portion guide plate 28 is faced to the rear end portion of the discharge duct 14 in a state in which the grass collection box 18 is at the down position (refer to FIGS. 1 and 10) receiving the mowed grass, and the bottom lid plate 20 is closed. Accordingly, the bottom portion guide plate 28 closes a portion close to a bottom side between the rear end discharge port of the discharge duct 14 and the front surface opening portion 18a of the grass collection box 18.

(3-2) Details of Lift Mechanism

The lift mechanism 19 of the grass collection discharge mechanism 16 is structured as shown in FIGS. 3 to 7. In other words, the lift mechanism 19 is provided with a mast member 29 arranged in each of both right and left sides while having the grass collection box therebetween, a double acting type elevating hydraulic cylinder 30 serving as an elevating actuator, and a pair of upper and lower lifting links 31 and 32, and both the mast members 29 are made of a rectangular pipe having a hollow cross section so as to extend in a vertical direction, and are detachably attached to the rear portion of the traveling machine body 2 in a lower end portion 29a thereof by fastening a bolt 59. Further, they are coupled therebetween by a plurality of lateral members 33, and are constructed as a curb plate as seen from a traveling direction of the lawn mower 1.

The attachment of both the mast members 29 to the traveling machine body 2 in the detachable state is structured such as to be carried out by the fastening to the rear end of both the side frames 3 of the traveling machine body 2 by the bolt 59 and the fastening to the rear wheel supporting frame 3a extending downward from the rear end of both the side frame 3 by the bolt 59.

Further, both the mast members 29 are bent forward in its midstream portion in such a manner that an upper end portion 29b is positioned forward at an appropriate dimension E from a lower end portion 29a corresponding to an attaching portion with respect to the traveling machine body 2, in a side view (FIGS. 1, 3, 4 and 6), an upper bracket member 34 constructed as a backward looking groove cross section is firmly attached to a rear surface of the upper end portion 29b in both the mast members 29 by welding or the like, and a lower bracket member 35 is firmly attached to a lower end of both the mast members 29 in such a manner as to protrude backward.

Base ends of a pair of upper and lower lifting links 31 and 32 are rotatably pivoted to the upper bracket member 34 at the upper end portion 29b of both the mast members 29 by lift pins 36 and 37 which are detachably inserted in such a manner as to pass through the upper bracket member 34, in a state of being inserted into a groove of the upper bracket member 34.

In other words, the lift pins 36 and 37 with respect to the base ends of both the lifting links 31 and 32 can improve a rigidity and a durability of the support by the lift pins 36 and 37 due to a construction of both ends support with respect to the upper bracket member 34. In addition, since the base ends of both the lifting links 31 and 32 are inserted into the groove of the upper bracket member 34, it is possible to securely reduce an oscillation in a lateral direction of the lifting links 31 and 32.

Further, since both the mast members 29 are structured such as to be bent forward in such a manner that the upper end portion 29b is positioned forward by the appropriate dimension E compared to the lower end portion 29a, the position along the longitudinal direction of the traveling machine body 2 at the lift pins 36 and 37 of the base ends of a pair of upper and lower lifting links 31 and 32 can be positioned which is forward (close to the traveling machine body 2) by the appropriate dimension E, in comparison with the case that the mast member 29 is constructed straight, it is possible to make a maximum ascending height of the grass collection box 18 higher by the appropriate dimension E at a time of ascending the box 18 to the maximum, as mentioned below, and it is possible to make the length of the lifting links 36 and 37 demanded for obtaining the maximum height shorter by the appropriate dimension E.

Further, since a point of application of the support load with respect to the traveling machine body 2 at the grass collection box 18 is positioned forward (close to the traveling machine body 2) by the appropriate dimension E, it is possible to reduce a back load to the traveling machine body 2.

On the other hand, a leading end of the upper link 31 in a pair of upper and lower lifting links 31 and 32 is rotatably pivoted to the bracket member 22 firmly attached to the outer side of both the right and left side surface plates 18b of the grass collection box 18 by a pin 38, and a leading end of the lower link 32 in a pair of upper and lower lifting links 31 and 32 is rotatably pivoted to a lower end portion of both the right and left side surface plates 18b of the grass collection box 18 by a pivot pin 23 with respect to the bottom lid plate 20.

In this case, the pivot pin with respect to the grass collection box 18 at the leading end of the lower link 32 in a pair of upper and lower lifting links 31 and 32 is integrally used as the pivot pin 23 with respect to the bottom lid plate 20 of the grass collection box 18, however, it goes without saying that the pivot pin with respect to the grass collection box 18 at the leading end of the lower link 32 can be constructed independently from the pivot pin 23 with respect to the bottom lid plate 20.

A lever body 40 is rotatably pivoted to each of inner surfaces of the lower bracket member 35 at the lower end of both the mast members 29 by a pin 41, both the lever bodies 40 are integrally coupled to each other via a lateral member 42 in such a manner that both the lever bodies 40 are simultaneously rotated, and a base end of the elevating hydraulic cylinder 30 is rotatably coupled to each of both the lever bodies 40 by a cylinder pivoting pin 43.

Further, both the lever bodies 40 are structured such that the cylinder pivoting pin 43 comes into contact with the stopper portion 44 at the rear end of the lower bracket member 35 in such a manner as to prevent any more backward rotation, at a time when the lever body 40 is rotated rearward.

In this case, in place of the structure in which the cylinder pivoting pin 43 comes into contact with the stopper portion 44, it is possible to employ such a structure that the other stopper member provided in the lever body 40 comes into contact with the stopper member 44.

In addition, both the lever bodies 40 are provided with an outrigger 45 structured such as to protrude downward from the lower surface of the lower bracket member 35 in a state in which the lever body 40 is rotated rearward and the cylinder pivoting pin 43 comes into contact with the stopper portion 44, and a bumper body 46 structured such as to protrude rearward to substantially the same position as the stopper portion 44 at the lower bracket member 35 or protrude further rearward than the stopper portion 44.

Further, both the lever bodies 40 are provided with a stopper piece 47 which comes into contact with the lower bracket member 35 or the mast member 29 in such a manner as to prevent a further forward rotation at a time when the lever body 40 is rotated forward. Accordingly, both the right and left lever bodies 40, the outrigger 45, the bumper body 46 and the stopper piece 47 which are provided respectively therein are structured such as to integrally change their attitudes around the pin 41.

Further, the grass collection box 18 is structured such as to be moved up and down in a reciprocating manner between a forward attitude receiving the mowed grass discharged from the discharge duct 14 at the down position, and a state of lifting up high while keeping the forward attitude, by coupling the leading end of both the elevating hydraulic cylinders 30 to the lower. link 32 in a pair of upper and lower lifting links 31 and 32 by a pin 48 and rotating a pair of upper and lower lifting links 31 and 32 in a vertical direction by both the elevating hydraulic cylinders 30.

In other words, the structure is made such as to lift up the grass collection box 18 in the forward attitude by the piston protruding motion of the elevating hydraulic cylinder 30, and move down the grass collection box 18 in the forward attitude to the original position by the piston rearward movement of the elevating hydraulic cylinder 30.

In this case, the lower link 32 in a pair of upper and lower lifting links 31 and 32 is provided with a hook-shaped lock means 49 detachably engaging with the upper end portion 29b of both the mast members 29 or the first bracket member 34 in such a manner as to inhibit the downward rotation, in the attitude of lifting up the grass collection box 18, and the hook-shaped lock means 49 may be provided in the upper link 31, or may be provided in the upper end portion 29b of both the mast members 29 or the first bracket member 34 side.

The lifting links 31 and 32 on the right side and the lifting links 31 and 32 on the left side are coupled therebetween via lateral members 50 and 51 in their upper end portions in such a manner that these links are simultaneously rotated.

Further, at a position which is within reach from the control seat 9 of the lawn mower 1, there is a PTO control lever 52 serving as a PTO control body controlling the rotary type lawn mowing mechanism 13 so as to turn on and off, and there is provided an opening and closing control lever 53 for controlling so as to switch the opening and closing hydraulic cylinder 26 to an open position moving the piston to protrude, a close position moving the piston rearward, and a neutral position stopping the piston actuation therebetween. Further, there is provided an elevation control lever 54 for controlling so as to switch the elevating hydraulic cylinder 30 to an up position moving the piston to protrude, a down position moving the piston rearward and a neutral position stopping the piston actuation therebetween.

(4) Hydraulic Circuit Structure of Lawn Mower

Next, a description will be given of a hydraulic circuit structure of the lawn mower with reference to FIG. 15.

A hydraulic circuit 91 of the lawn mower 1 is provided with a charging hydraulic pump 92 and a variable displacement type shifting hydraulic pump 93 which are activated by a rotating force of the engine 7, and a fixed displacement type shifting hydraulic motor 94 which is activated by a high-pressure working fluid discharged from the shifting hydraulic pump 93. The shifting hydraulic pump 93 and the shifting hydraulic motor 94 construct hydrostatic type continuously variable transmission 95, and the hydrostatic type continuously variable transmission 95 (the shifting hydraulic pump 93 and the shifting hydraulic motor 94) of the first embodiment is incorporated in the transmission case 61.

The shifting hydraulic pump 93 and the shifting hydraulic motor 94 are connected in their intake sides and discharge sides via a closed loop oil path 96. A rotating speed of right and left axels (axles close to the rear portion of the traveling machine body 1) driven by a power from the shifting hydraulic motor 94 is changed by regulating an angle of a swash plate 97 of the shifting hydraulic pump 93 driven by the power of the engine 7 with a shift pedal 81 (refer to FIGS. 1, 2 and 15) arranged at a right lower portion of the control handle 8. As a result, it is possible to change a rotating speed of the rear wheels 6 attached to the right and left axles, and the vehicle speed (the traveling speed) of the traveling machine body 1 as well.

The hydraulic circuit 91 mentioned above is provided with a relief valve, an oil filter, a check valve and the like, as shown in FIG. 15. The intake side of the charging hydraulic pump 92 is connected to a strainer 99 in the oil tank 63 via a low pressure charge oil path 98. A high pressure charge oil path 102 having a resupplying relief valve 100 and a returning relief valve 101 is connected to the discharge side of the charging hydraulic pump 92. The high pressure charge oil path 102 is connected to the closed loop oil path 96 via the resupplying relief valve 100, a forward replenishing check valve 103 and a rearward replenishing check valve 104.

Accordingly, during the actuation of the engine 7, the working fluid from the charging hydraulic pump 92 is always replenished to the closed loop oil path 96. Further, if there is any surplus of the working fluid in each of the charge oil paths 98 and 102 for supplying from the charging hydraulic pump 92 to the closed loop oil path 96, the working fluid in each of the charge oil paths 98 and 102 is returned to the oil tank 63 via the returning relief valve 101.

On the other hand, to the closed loop oil path 96, there is connected a bypass valve 105 for short-circuiting between the intake side of the shifting hydraulic pump 93 and the discharge side of the shifting hydraulic motor 94, and between the intake side of the shifting hydraulic motor 94 and the discharge side of the shifting hydraulic pump 93. If the bypass valve 105 is switched to a state (a state of the bypass valve 105 shown in FIG. 15) in which the closed loop circuit 96 is not short-circuited, by a control of a bypass change-over lever 106 provided in connection with the bypass valve 105, the shifting hydraulic pump 93 and the shifting hydraulic motor 94 are communicated in a travel driving state via the closed loop oil path 96, and the rear wheels 6 are driven by the rotational power of the engine 7.

On the other hand, if the bypass valve 105 is switched to a state in which the closed loop circuit 96 is short-circuited, by the control of the bypass change-over lever 106, the shifting hydraulic motor 94 is held in a free rotating state (a state of rotating with no load). For example, the switching control mentioned above is executed in a state in which the rear wheels 6 can not be driven due to a malfunction such as the fuel in the fuel tank 62 runs short, the hydrostatic type continuously variable transmission 95 in the transmission case 61 is held in a no-load state. Accordingly, the operator can push and move the traveling machine body 1.

The charging hydraulic pump 92 is connected to an elevating hydraulic valve 107 for supplying the working fluid to the double acting type elevating hydraulic cylinder 30 via an electromagnetic discharge valve 135 for regulating and controlling the supply of the working fluid to a glitch preventing check valve 108 and an elevating hydraulic valve 107 (the elevating hydraulic cylinder 30). The electromagnetic discharge valve 135 is structured such as to be automatically switched by a driving of an electromagnetic discharge solenoid 136 in correspondence to a detection signal (an on and off signal) of various sensors 142 to 145 (refer to FIG. 20) mentioned below. An opening and closing hydraulic valve 109 for supplying the working fluid to the double acting type opening and closing hydraulic cylinder 26 is connected to a tank port of the elevating hydraulic valve 107. Further, the electromagnetic discharge valve 135 mentioned above is connected to an oil path between the opening and closing hydraulic valve 109 and a torque generator (in detail mentioned below) existing in a downstream side thereof.

If the elevating hydraulic valve 107 is switched by the control of the elevating control lever 54 in a state (a state of the electromagnetic discharge valve 135 shown in FIG. 15, hereinafter called as a supply state) in which the electromagnetic discharge valve 135 supplies the working fluid to the elevating hydraulic valve 107, the elevating hydraulic cylinder 30 is actuated so as to expand and contract, and the grass collection box 18 moves up and down to a down position receiving the mowed grass discharged from the discharge duct 14 in a forward attitude, and an up position at a time of lifting up high while keeping the forward attitude.

If the opening and closing hydraulic valve 109 is switch actuated by the control of the opening and closing control lever 53, the opening and closing hydraulic cylinder 26 is actuated so as to expand and contract, and the rear lid plate 21 is actuated so as to open and close to a state closing the opened rear surface of the grass collection box 18, and a state opening so as to be bounded from the rear surface. Further, in accordance with the opening and closing actuation of the rear lid plate 21, the bottom lid plate 20 is rotated in such a manner that the front end is bounded up and the rear end comes down by the tension of the metal wire 27 and is actuated so as to open and close to a state opening the bottom surface of the grass collection box 18, and a state closing the bottom surface of the grass collection box 18 by the front side weight.

If the electromagnetic discharge valve 135 comes to a state stopping the supply of the working fluid to the elevating hydraulic valve 107 (hereinafter, called as a supply stop state), the working fluid via the electromagnetic discharge valve 135 from the charging hydraulic pump 92 is not fed to the elevating hydraulic cylinder 30, but is supplied only to the opening and closing hydraulic valve 109, and the opening and closing hydraulic cylinder 26 as well. Accordingly, in this state, only the rear lid plate 21 and the bottom lid plate 20 can be actuated so as to open and close by the control of the opening ad closing control lever 53, and even if the elevating control lever 54 is controlled, the elevating hydraulic cylinder 30, and the grass collection box 18 as well does not move up and down.

A torque generator 137 for a power steering for actuating so as to steer the front wheels 5 by utilizing a great hydraulic force generated by the control of the steering handle 10 is connected to the tank port of the tank valve 109. The torque generator 137 is connected to the returning relief valve 101 via a line filter 110 and a relief valve 111 which are arranged in parallel. Accordingly, the working fluid from the torque generator 137 is returned to the oil tank 63 via a line filter 112. In this case, the torque generator 137 is constructed by a control valve switching by the rotational control of the steering handle 10, a hydraulic pump actuated by the control valve and the like, and is structured such as to change direction of the front wheels 5 by utilizing the rotating force of the hydraulic pump.

As is apparent from FIG. 15, the elevating hydraulic valve 107, the opening and closing hydraulic valve 109 and the torque generator 137 are connected to the charging hydraulic pump 92 respectively in series. Accordingly, all the while the elevating hydraulic cylinder 30 is driven so as to expand and contract by the switching actuation of the elevating hydraulic valve 107, at a time when the electromagnetic discharge valve 135 is in the supply state, the opening and closing hydraulic cylinder 26 and the torque generator 137 are not driven.

Further, while the opening and closing hydraulic cylinder 26 is driven so as to expand and contract by the switching actuation of the opening and closing hydraulic valve 109 at a time when the electromagnetic discharge valve 135 is in the supply state, the torque generator 137 is not driven. Further, if none of the elevating hydraulic cylinder 30 and the opening and closing hydraulic cylinder 26 are driven, at a time when the electromagnetic discharge valve 135 is in the supply state, the torque generator 137 is driven.

In other words, when the electromagnetic discharge valve 135 is in the supply state, the elevating hydraulic valve 107, the opening and closing hydraulic valve 109 and the torque generator 137 are structured such as to be driven by priority in accordance with this order.

(5) Attaching Structure of Elevating Control Lever and Opening and Closing Control Lever.

Next, a description will be given of an attaching structure of the elevating control lever and the opening and closing control lever with reference to FIGS. 16 to 19.

A hydraulic unit case 116 (refer to FIG. 2) arranged in a right oblique rearward side of the control seat 9 has a hydraulic piping block 114 for connecting a hydraulic piping (not shown) to the charging hydraulic pump 92, the elevating hydraulic cylinder 30 and the opening and closing hydraulic cylinder 26, and a hydraulic valve unit body 115 having an elevating hydraulic valve 107 and an opening and closing hydraulic valve 109 built-in.

The elevating control lever 54 and the opening and closing control lever 53 are attached to a front surface of the hydraulic valve unit body 115 via a lever bearing portion 117 so as to be rotatably controlled in a vertical direction. The elevating control lever 54 protrudes approximately horizontally toward a forward side of the hydraulic valve unit body 115 in a state in which the elevating hydraulic valve 107 is neutral. If the elevating control lever 54 is rotationally controlled up and down, the elevating hydraulic valve 107 is switched to an ascending side or a descending side, and the elevating hydraulic cylinder 30 is driven so as to expand and contract. If the opening and closing control lever 53 is rotationally controlled up and down, the opening and closing hydraulic valve 109 is switched to an open moving side or a close moving side, and the opening and closing hydraulic cylinder 26 is driven so as to expand and contract.

Further, the hydraulic unit case 116 is provided with a lever guide body 118 for guiding the upward and downward rotation of both the control levers 53 and 54, a lock arm body 120 coupled in an interlocking manner to the brake pedal 82 (refer to FIGS. 1, 2 15) arranged in a right lower portion of the control handle 8 via a brake detecting wire 119, and a diversionary arm body 121 restricting the other control at a time of controlling any one of both the lift levers 53 and 54. In the first embodiment, the lock arm body 120 and the diversionary arm body 121 are pivoted to the lever guide body 118 fixed to the hydraulic unit case 116 so as to be independently rotatable via a support shaft 122 extending longitudinally.

The lock arm body 120 is formed as an approximately hook shape in a front view, and an elevation regulating notch 120a catching on a shaft portion of the elevating control lever 54 so as to be capable of engaging is formed in a side end portion 120b facing to the elevating control lever 54 in the lock arm body 120. In the diversionary arm body 121, there are formed an elevating diversionary notch 121a catching on the shaft portion of the elevating control lever 54 so as to be capable of engaging, and an opening and closing diversionary notch 121b catching on the shaft portion of the opening and closing control lever 53 so as to be capable of engaging. Further, a pair of upper and lower pressure rolls 123 and 124 which can come into contact with the shaft portion of the lift lever 110 are rotatably pivoted to the diversionary arm body 121 via upper and lower roll shafts 125 and 126. Both the pressure rolls 123 and 124 are arranged so as to be separated to both upper and lower sides while having the lift diversionary notch 121a in the diversionary arm body 121 therebetween.

A coupling bracket 130 attached to one end portion of the brake detecting wire 119 is fixed to one end portion of the lock arm 120 via a coupling pin 129. A stopper body 131 for regulating a rotation of the lock arm body 120 in such a direction that the elevation regulating notch 120a stays away from the lift lever 110 is integrally formed in the other end portion which is opposite to the coupling pin 129 while having the support shaft 122 therebetween in the lock arm body 120.

The other end portion 127b of a snap spring shaped brake detecting spring 127 is hanged on the coupling pin 129, one end portion 127a thereof being fixed to the front surface of the lever guide body 118. The brake detecting spring 127 energized the lock arm body 120 in such a rotating direction that the elevation regulating notch 120a stays away from the elevating control lever 54, by its elastic energizing force. Between the coupling pin 129 and the upper roll shaft 125 of the upper pressure roll 123, there is installed a tension spring shaped cancel spring 128 for energizing the diversionary arm body 121 in such a rotating direction that the opening and closing diversionary notch 121b stays away from the opening and closing control lever 53.

In this case, a spring force of the brake detecting spring 127 is set smaller than a spring force of a pedal return spring (not shown) maintaining the brake pedal 82 at the initial position (the brake cancel position). A spring force of the cancel spring 128 is set smaller than the spring force of the brake detecting spring 127.

In the case that the brake pedal 82 is at the initial position (the brake cancel position) at which it is not controlled to be stepped down, the brake detecting wire 119 is pulled by the spring force of the pedal return spring. Accordingly, the lock arm body 120 is rotated in a clockwise direction around the support shaft 122 in FIG. 17 against the spring force of the brake detecting spring 127, and the elevation regulating notch 120a catches on the shaft portion of the elevating control lever 54 so as to be engaged. At this time, the diversionary arm body 121 is rotated in a counterclockwise direction around the support shaft 122 in FIG. 17 by the spring force of the cancel spring 128, and the lower pressure roll 124 comes into contact with the side end portion 120b of the lock arm body 120. In this state, the opening and closing diversionary notch 121b catches on the shaft portion of the opening and closing control lever 53 so as to be engaged.

Accordingly, if the brake pedal 82 is not at the step down position (the brake position), the controls of none of the elevating control lever 54 and the opening and closing control lever 53 are inhibited by the lock arm body 120 and the diversionary arm body 121.

As shown in FIG. 18, in the case that the brake pedal 82 is controlled to be stepped down so as to apply the brake to the rear wheels 6, the brake detecting wire 119 is loosened. Accordingly, the lock arm body 120 is rotated in the counterclockwise direction around the support shaft 122 in FIG. 18 by the spring force of the brake detecting spring 127, until the stopper body 131 comes into contact with the upper surface of the lever guide body 118, and the elevation regulating notch 120a is detached from the shaft portion of the elevating control lever 54. At this time, the diversionary arm body 121 is rotated in the counterclockwise direction around the shaft 122 in FIG. 18 by the spring force of the cancel spring 128, and the opening and closing diversionary notch 121b is detached from the shaft portion of the opening and closing control lever 53. Both the upper and lower pressure rolls 123 and 124 come into contact with the shaft portion of the elevating control lever 54.

In other words, if the rear wheels 6 are braked by controlling so as to step down the brake pedal 82, the elevating control lever 54 and the opening and closing control lever 53 come to a controllable state.

Then, if the opening and closing control lever 53 is controlled so as to rotate up and down precedently as shown in FIG. 18, the opening and closing control lever 53 moves to a contact position with the regulating end portion 121c or 121d of the diversionary arm body 121, rotates the diversionary arm body 121 further in the counterclockwise direction around the support shaft 122 shown in FIG. 18, and engages the elevating diversionary notch 121a between both the upper and lower pressure rolls 123 and 124 with the shaft portion of the elevating control lever 54.

Even if it is intended to rotationally control up and down the elevating control lever 54 in this state, the regulating end portion 121c or 121d of the diversionary arm body 121 comes into contact with the shaft portion of the opening and closing control lever 53, and the rotation in the clockwise direction of the diversionary arm body 121 is inhibited, and the engagement between the shaft portion of the elevating control lever 54 and the elevating diversionary notch 121a is maintained. Accordingly, it is impossible to rotationally control up and down the elevating control lever 54. In other words, in a state in which the opening and closing control lever 53 is rotationally controlled up and down, the upward and downward rotating control of the elevating control lever 54 is inhibited by a cooperation between the opening and closing control lever 53 and the diversionary arm body 121.

On the other hand, if the elevating control lever 54 is rotationally controlled up and down precedently as shown in FIG. 19, the elevating control lever 54 presses either pressure roll 123 or 124 against the spring force of the cancel spring 128, rotates the diversionary arm body 121 in the clockwise direction around the support shaft 122 shown in FIG. 19, and engages the opening and closing diversionary notch 121b with the shaft portion of the opening and closing control lever 53.

Even if the opening and closing control lever 53 is rotationally controlled up and down in this state, either pressure roll 123 or 124 comes into contact with the shaft portion of the elevating control lever 54, the rotation in the counterclockwise direction of the diversionary arm body 121 is inhibited, and the engagement between the shaft portion of the opening and closing control lever 53 and the opening and closing diversionary notch 121b is maintained. Accordingly, it is impossible to rotationally control up and down the opening and closing control lever 53. In other words, in the state in which the elevating control lever 54 is rotationally controlled up and down, the upward and downward rotational control of the opening and closing control lever 53 is inhibited by the cooperation between the elevating control lever 54 and the diversionary arm body 121.

Accordingly, if the rear wheels 6 are braked by stepping down the brake pedal 82, the operator can alternatively rotate up and down any one of the elevating control lever 54 and the opening and closing control lever 53.

(6) Structure of Restricting Mechanism

Next, a description will be given of a structure of a restricting mechanism for preventing the upward and downward movements of the grass collection box in accordance with an erroneous control of the elevating control lever with reference to FIG. 20.

A restricting mechanism 140 of the lawn mower 1 in the first embodiment is provided with a battery 64, a key switch 141 for applying a power supply, and an electromagnetic discharge solenoid 136 of the electromagnetic discharge valve 135. In this case, the key switch 141 and the electromagnetic discharge solenoid 136 are connected in series to the battery 64. The key switch 141 is structured such as to be connectable to a starter (not shown) for starting the engine 7.

Between the key switch 141 and the electromagnetic discharge solenoid 136, there are connected in series an on-off changeover switch type operator sensor 142 actuated to be turned on if the operator seats on the control seat 9, an on-off changeover switch type rear lid plate detecting sensor 143 actuated to be turned off if the rear lid plate 21 is at a close position closing the rear surface opening of the grass collection box 18, an on-off changeover switch type bottom lid plate detecting sensor 144 actuated to be turned off if the bottom lid plate 20 is at a close position closing the bottom surface opening of the grass collection box 18, and an on-off changeover switch type grass collection box sensor 145 actuated to be turned on if the grass collection box 18 is at a down position.

The rear lid plate detecting sensor 143 is provided in association with the pin shaft 24a rotatably pivoting the upper link 24 with respect to the rear lid plate 21. The bottom lid plate detecting sensor 144 is provided in association with the pivot pin 23 rotatably pivoting the bottom lid plate 20. The grass collection box sensor 145 is provided in a rear side of the discharge duct 14 (close to the traveling machine body 2, for example, on the lowest lateral member 33 connecting both the mast members 29), and is structured such that the bottom portion guide plate 28 comes into contact with the grass collection box sensor 145 at a time when the grass collection box 18 is at the down position, whereby the grass collection box sensor 145 is actuated to be turned on.

In the structure mentioned above, if all of four conditions are satisfied, the conditions including (1) the operator seats on the control seat 9, (2) and (3) the rear lid plate 21 and the bottom lid plate 20 are actuated to be opened, and (4) the grass collection box 18 is at the down position, the electromagnetic discharge solenoid 136 is driven to be switched by the on actuations of four sensors 142 to 145 mentioned above, and the supply of the working fluid from the electromagnetic discharge valve 135 to the elevating hydraulic valve 107 is stopped. As a result, the working fluid is not fed to the elevating hydraulic cylinder 30, and the elevating hydraulic cylinder 30 and the grass collection box 18 as well is not moved up and down even by controlling the elevating control lever 54.

(7) Structure of PTO Regulating Mechanism.

Next, a description will be given of a structure of a PTO regulating mechanism (a safety mechanism) for preventing an unexpected drive of the lawn mowing mechanism, with reference to FIG. 21.

A PTO regulating mechanism 150 of the lawn mower 1 in the first embodiment is provided with a battery 64, a PTO on sensor 151 serving as a PTO detecting means actuated to be turned on at a time of turning on the PTO control lever 52, and an engine stop solenoid 152 serving as an engine stop mechanism provided in association with a fuel injection pump with governor (not shown) for regulating a fuel injection amount to the engine 7. In this case, the PTO on sensor 151 and the engine stop solenoid 152 are connected in series to the battery 64. The fuel supply from the fuel tank 62 to the engine 7 is suspended by driving the engine stop solenoid 152. As a result, the drive of the engine 7 is stopped.

Between the PTO on sensor 151 and the engine stop solenoid 152, there are connected in parallel a seating sensor 153, a parking sensor 154, an outrigger sensor 155 serving as an outrigger detecting means, a rear lid plate rotation sensor 156, a bottom lid plate rotation sensor 157, a grass collection sensor 158 serving as a grass collection detecting means, and a lift stroke sensor 159 serving as a means for detecting a lift stroke in the elevating hydraulic cylinder 30. As seen from each of the sensors 153 to 159, each of the sensors 153 to 159 is connected in series to the PTO on sensor 151 and the engine stop solenoid 152.

The seating sensor 153 is an on-off changeover switch type sensor which is actuated to be turned on if the operator stays away from the control seat 9. In the case that the operator does not seat on the control seat 9 and the PTO control lever 52 is controlled to be turned on, the seating sensor 153 and the PTO on sensor 151 are actuated to be turned on, and the engine stop solenoid 152 is driven. As a result, the driving of the engine 7 is automatically stopped. Accordingly, as long as the operator does not seat on the control seat 9, the driving of the lawn mowing mechanism 13 is inhibited.

The parking sensor 154 is an on-off changeover switch type sensor which is actuated to be turned on by controlling to turn on the parking lever 160 maintaining the brake pedal 82 at the step-down position (the brake position). In this case, the parking lever 160 is provided for locking and holding the brake pedal 82 at the step-down position so as to be capable of being engaged and disengaged, and is arranged below the control handle 8 which is not illustrated in detail.

In the case that the parking lever 160 is in an on state (a state in which the brake pedal 82 is held at the step-down position) and the PTO control lever 52 is actuated to be turned on, the parking sensor 154 and the PTO on sensor 151 are actuated to be turned on, and the engine stop solenoid 152 is driven. As a result, the driving of the engine 7 is automatically stopped. Accordingly, as long as the parking lever 160 is in an on state, the driving of the lawn mowing mechanism 13 is inhibited.

The outrigger sensor 155 is an on-off changeover switch type sensor detecting whether or not the outrigger 45 is in a protruding attitude (an actuating attitude) protruding toward the ground surface. The outrigger sensor 155 is provided, for example, in a lower end portion of at least one of both the mast members 29 (refer to FIGS. 1, 3 and 10 to 14), and is structured such that the stopper piece 47 of the lever body 40 rotating forward around the pin 41 so as to come to a storage attitude (a non-actuating attitude) comes into contact with the outrigger sensor 155, whereby the outrigger sensor 155 is actuated to be turned off.

In the case that the outrigger 45 is in the protruding attitude and the PTO control lever 52 is actuated to be turned on, the outrigger sensor 155 and the PTO on sensor 151 are actuated to be turned on, and the engine stop solenoid 152 is driven. As a result, the driving of the engine 7 is automatically stopped. Accordingly, as long as the outrigger 45 protrudes toward the ground surface, the driving of the lawn mowing mechanism 13 is inhibited.

The rear lid plate rotation sensor 156 is an on-off changeover switch type sensor which is actuated to be turned off if the rear lid plate 21 is at the close position closing the rear surface opening of the grass collection box 18, and is provided, for example, in association with the pin shaft 24a rotatably pivoting the upper link 24 with respect to the rear lid plate 21. The bottom lid plate rotation sensor 157 is an on-off changeover switch type sensor which is actuated to be turned off if the bottom lid plate 20 is at the close position closing the bottom surface opening of the grass collection box 18, and is provided, for example, in association with the pivot pin 23 rotatably pivoting the bottom lid plate 20.

In the case that at least one of the rear lid plate 21 and the bottom lid plate 20 is at the open position, and the PTO control lever 52 is actuated to be turned on, the rotation sensors 156 and 157 corresponding to the lid plates 21 and 20 and the PTO on sensor 151 are actuated to be turned on, and the engine stop solenoid 152 is driven. As a result, the driving of the engine 7 is automatically stopped. Accordingly, as long as at least one of the rear lid plate 21 and the bottom lid plate 20 is actuated to be opened, the driving of the lawn mowing mechanism 13 is inhibited.

The grass collection sensor 158 is provided for detecting the vertical position of the grass collection box 18 on the basis of whether there is contact with the bottom portion guide plate 28 of the grass collection box 18, and is provided in a rear side of the discharge duct 14 (close to the traveling machine body 2, for example, in the lowest lateral member 33 connecting both the mast members 29). The grass collection sensor 158 is structured such that the bottom portion guide plate 28 comes into contact with the grass collection sensor 158 in the state in which the grass collection box 18 is at the down position and the rear end discharge port of the discharge duct 14 comes close to the front surface opening portion (the mowed grass receiving port) 18a of the grass collection box 18, whereby the grass collection sensor 158 is actuated to be turned off.

The lift stroke sensor 159 is provided for detecting the vertical position of the grass collection box 18 on the basis of the piston protruding amount (the protruding position) of the elevating hydraulic cylinder 30 serving as the elevating actuator, and is structured such as to be actuated to be turned off at a time when the piston of the elevating hydraulic cylinder 30 is in the shortest state, that is, the grass collection box 18 is at the down position. Both of the grass collection sensor 158 and the lift stroke sensor 159 correspond to a grass collection detecting means detecting the down position of the grass collection box 18, that is, the mowed grass receiving attitude from the discharge duct 14 of the grass collection box 18.

In the case that the grass collection box 18 is at the up position and the PTO control lever 52 is controlled to be turned on, the grass collection sensor 158, the lift stroke sensor 159 and the PTO on sensor 151 are actuated to be turned on, and the engine stop solenoid 152 is driven. As a result, the driving of the engine 7 is automatically stopped. Accordingly, as long as at least one of the grass collection sensor 158 and the lift stroke sensor 159 is in the on state, the driving of the lawn mowing mechanism 13 is inhibited.

Summarizing the above, if any one of five conditions is satisfied, the conditions including (1) the case that the operator does not seat on the control seat 9, (2) the case that the parking lever 160 is in the on state, (3) the case that the outrigger 45 protrudes toward the ground surface, (4) the case that at least one of the rear lid plate 21 and the bottom lid plate 20 is actuated to be opened, and (5) the case that at least one of the grass collection sensor 158 and the lift stroke sensor 159 is in the on state, the driving of the lawn mowing mechanism 13 is inhibited even if the PTO control lever 52 is in the on state.

Accordingly, for example, even if the lawn mowing mechanism 13 erroneously comes into contact with the elevating control lever 54 or the opening and closing control lever 53 during the driving, the driving of the engine 7 is automatically stopped. Therefore, the driving of the lawn mowing mechanism 13 is automatically stopped, the grass collection box 18 is moved up widely to the up position, and the rear lid plate 21 and the bottom lid plate 20 are not actuated to be opened. Accordingly, it is possible to prevent the mowed grass, the pebble or the like from being unexpectedly scattered to the rear side of the traveling machine body 2 from the rear end discharge port of the discharge duct 14.

Further, even if the operator erroneously controls the PTO control lever 52 to turn on at a time when the grass collection box 18 is at the up position (at a time of discharging the mowed grass), the driving of the lawn mowing mechanism 13 is automatically stopped together with the engine 7. Accordingly, it is possible to prevent the mowed grass, the pebble of the like from being unexpectedly scattered to the rear side of the traveling machine body 2 from the rear end discharge port of the discharge duct 14 even in this case.

Particularly, in the first embodiment, since the sensors 155, 158 and 159 detecting the behaviors of the outrigger 45, the bottom portion guide plate 28 and the elevating hydraulic cylinder 30 in accordance with the upward and downward movement of the grass collection box 18 respectively detect independently the state in which the grass collection box 18 is at the up position, it is possible to automatically stop the driving of the lawn mowing mechanism 13 together with the engine 7 (the PTO regulating mechanism 150 is actuated without trouble), at a time when the operator erroneously controls the PTO control lever 52 to turn on in the state in which the grass collection box 18 is at the up position, as long as at least one of the sensors 155, 158 and 159 functions, even if any of the sensors 155, 158 and 159 is out of order. In other words, it is possible to doubly or triply secure an actuation stability of the PTO regulating mechanism 150 preventing the unexpected driving of the lawn mowing mechanism 13, and it is possible to securely prevent the mowed grass, the pebble or the like from being unexpectedly scattered.

(8) Action Aspect of Grass Collection Discharge Mechanism

Next, a description will be given of one example of action aspects of the grass collection discharge mechanism with reference to FIGS. 1 and 10 to 14.

In the structure mentioned above, it is possible to achieve the attitude receiving the mowed grass discharged from the discharge duct 14, by holding the grass collection box 18 of the grass collection discharge mechanism 16 at the down position in the state closing the bottom lid plate 20 and the rear lid plate 21, and it is possible to carry out a predetermined lawn mowing by traveling the lawn mower 1 forward while driving the rotary type lawn mowing mechanism 13, in this state, whereby the grass mowed by the rotary lawn mowing mechanism 13 is collected in such a manner as to come into the grass collection box 18 via the discharge duct 14 and the bottom portion guide plate 28.

Further, if a predetermined amount of mowed grass is reserved in the grass collection box 18, the grass mowing work and the forward traveling are stopped, and the discharging work of the mowed grass from the grass collection box 18 is started. At a time of this discharging work, first of all, the grass collection box 18 is lifted up by actuating both the elevating hydraulic cylinders 30 in such a manner that the piston moves to protrude by the actuation of the elevating control lever 54 to the up position.

Then, first of all, the lever body 40 at the base end of both the elevating hydraulic cylinders 30 is rotated rearward, and the pivot pin 43 comes into contact with the stopper portion 44. Accordingly, as shown in FIG. 10, the outrigger 45 provided in the lever body 40 protrudes so as to come close to the ground surface 4, and comes to the state inhibiting the front portion of the lawn mower 1 from being lifted and inclined to the rearward direction.

In other words, it is possible to securely reduce the risk that the traveling machine body 2 is inclined rearward in the state lifting up high the grass collection box 18 by protruding such that the outrigger 45 comes close to the ground surface, at any moment from the time before lifting up the grass collection box 18 to the process of lifting, at a time of discharging the mowed grass received in the grass collection box 18.

Further, since the protrusion of the outrigger 45 is carried out at any moment from the time before lifting up the grass collection box 18 to the process of lifting, it is possible to securely avoid the risk that the existence of the outrigger 45 prevents the normal travel of the lawn mower 1. In addition, since the outrigger 45 protrudes so as to come close to the ground surface, it is possible to travel in such a manner as to make the lawn mower 1 approximate the grass collection container A or the like in the state in which the outrigger 45 is protruded.

Particularly, in the first embodiment, since the outrigger 45 is structured such as to be protruded by the elevating hydraulic cylinder 30 of the lift mechanism 19, it is not necessary to independently provide the structure for protruding the outrigger 45, the structure becomes simple, and there is an advantage that it is possible to achieve a downsizing and a weight saving.

When the outrigger 45 protrudes in such a manner as to come close to the ground surface 4, the bumper body 46 provided in the lever body 40 protrudes rearward to substantially the same position as the stopper portion 44, or protrudes further rearward than the stopper portion 44. In other words, before the lifting actuation of the grass collection box 18, the outrigger 45 protrudes so as to come close to the ground surface 4, and the bumper 46 protrude rearward.

Next, since a pair of upper and lower lifting links 31 and 32 are rotated upward by the further piston protruding motion in both the elevating hydraulic cylinders 30, the grass collection box 18 is lifted up in the state in which the bottom lid plate 20 and the rear lid plate 21 are closed, as shown in FIG. 11, and if it is lifted up to the highest maximum up position, the grass collection box 18 is locked by the lock means 49 in such a manner as to be prevented from coming down from the highest position at the same time when the further piston protruding motion in both the elevating hydraulic cylinder 30, that is, the lifting of the grass collection box 18 is stopped, by controlling the elevating control lever 54 to the neutral position.

In this case, both the elevating hydraulic cylinder 30 can be structured such as to automatically come to the neutral position stopping the actuation of the piston if it comes to the state lifting the grass collection box 18 to the maximum up position. Further, the grass collection box 18 is structured such as to be inclined forward in such a manner that the front portion is low and the rear portion is high in the state receiving the mowed grass discharged from the discharge duct 14 at the down position, however, be inclined rearward in such a reverse manner that the front portion is high and the rear portion is low, in the state in which it is lifted up to the highest position.

Further, the rear portion moves so as to come close to the grass collection container A on the ground surface 4, as shown in FIG. 12, by controlling the lawn mower 1 so as to travel forward or travel rearward, in this state, so that the grass collection box 18 lifted up high as mentioned above is positioned just above the grass collection container A. It is possible to securely avoid the generation of the breakage of the lift mechanism 19 due to the collision with the grass collection container A by the bumper body 46, at a time of traveling the lawn mower 1 rearward in such a manner that the rear portion thereof comes close to the grass collection container A. Particularly, since the bumper body 46 is structured such as to protrude outwardly compared to at least the base end portion of the elevating hydraulic cylinder 30 of the lift mechanism 19, it is possible to securely prevent the base end portion of the elevating hydraulic cylinder 30 from being damaged.

In addition, since the bumper body 46 protrudes at any moment from the time before starting lifting up the grass collection box 18 to the process of lifting, and comes to the state in which it does not protrude at the normal traveling time, it is possible to securely prevent the bumper body 46 from being an obstacle for the normal travel. In this case, in the first embodiment, since the protruding motion of the bumper body 46 is carried out by the elevating hydraulic cylinder 30 of the lift mechanism 19, in the same manner as the outrigger 45, it is not necessary to independently provide the structure for protruding the bumper body 46, which makes the structure simple, down-sized, and lightweight.

After the lawn mower 1 is moved in such a manner that the rear portion thereof comes close to the grass collection container A put on the ground surface 4, the opening and closing hydraulic cylinder 26 is activated in such a manner that the piston is protruded by controlling the opening and closing lever 53 to the open position. Then, since the rear lid plate 21 is rotated to open with respect to the grass collection box 18, as shown in FIG. 12, the discharge of the mowed grass in the grass collection box 18 into the grass collection container A is started.

Next, since the bottom lid plate 20 with respect to the grass collection box 18 works with the opening rotation of the rear lid plate 21 via the metal wire 27 having the flexibility, and is rotated as shown in FIG. 13 such that the front end thereof is bounded up and the rear end thereof comes down so as to open the bottom surface of the grass collection box 18, the discharge of the mowed grass in the grass collection box 18 into the grass collection container A is further progressed.

If the rear lid plate 21 is fully opened, the further piston protruding motion in both the opening and closing hydraulic cylinders 26, that is, the opening actuation of the rear lid plate 21 is stopped, by controlling the opening and closing control lever 53 to the neutral position. In this case, both the opening and closing hydraulic cylinder 26 can be structured such that if the rear lid plate 21 opens maximum, it automatically comes to a neutral position at which the piston stops its actuation.

Next, the mowed grass under the discharging drop comes into contact with the rear end of the bottom lid plate 20, in accordance with the discharge of the mowed grass in the grass collection box 18, whereby, as shown in FIG. 14, the bottom lid plate 20 is automatically rotated to open further widely regardless of the opening rotation of the rear lid plate 21, while loosening the metal wire 27 coupling the bottom lid plate 20 and the rear lid plate 21 in an interlocking manner. Accordingly, it is possible to discharge all the mowed grass in the grass collection box 18 and it is possible to set the discharge position of the mowed grass to a position which is away from the lawn mower 1.

Particularly, since the first embodiment is structured such that the opening actuation of the bottom lid plate 20 is rotated to open in such a manner that the front end portion of the bottom lid plate 20 is bounded up toward the grass collection box 18 and the rear end portion comes down, the mowed grass in the grass collection box 18 is not only discharged from the rear surface opening portion of the grass collection box 18, but also discharged from the portion corresponding to the rear end portion of the bottom lid plate 20 in the open bottom portion in the grass collection box 18. Accordingly, there is an advantage that it is possible to securely and rapidly discharge the mowed grass.

Further, in the first embodiment, since the bottom lid plate 20 is structured such as to be formed by folding the thin metal plate in the saw-toothed cross section, it is possible to widely save weight in the state in which the rigidity of the bottom lid plate 20 is secured, and it is possible to achieve the further weight saving of the grass collection box 18. Accordingly, it is possible to further achieve the downsizing and the weight saving of a whole of the lawn mower 1. Further, since the saw-toothed cross section of the bottom lid plate 20 is provided with the inclined portion 20a which is diagonally upward toward the rear side from the front end, the mowed grass in the upper surface slides down along the inclined portion 20a at a time when the bottom lid plate 20 is rotated to be bound up. Accordingly, it is possible to securely avoid the attachment of the mowed grass to the upper surface of the bottom lid plate 20. Particularly, since the bottom lid plate 20 is made of the thin metal plate having the air permeability, it is possible to achieve the further weight saving of the bottom lid plate 20, and it is possible to contribute to a low cost as well as promoting the effects mentioned above.

As is apparent from the aspect mentioned above, the discharge of the mowed grass from the grass collection box 18 is carried out by opening the bottom lid plate 20 closing the opened bottom portion of the grass collection box 18, and the rear lid plate 21 closing the opening of the rear surface of the grass collection box 18. Accordingly, since it is unnecessary to widely rotate a whole of the grass collection box 18 rearward in the state in which it is lifted up high, as is different from the conventional one, it is possible to make the height of gravity point from the ground surface at a time of lifting up high widely lower than the conventional one. Further, since the opening and closing actuation of the bottom lid plate 20 and the rear lid plate 21 can be carried out by the compact mechanism (for example, the hydraulic cylinder) having the comparatively smaller output than the conventional case, and it is possible to reduce the weight of the whole of the grass collection box 18, it is possible to further improve the support stability in the state in which the grass collection box 18 is lifted up high, and it is possible to achieve the downsizing and the weight saving of the lift mechanism 19, and the downsizing and the weight saving of a whole of the lawn mower 1 as well.

In addition, in the first embodiment, since the bottom lid plate 20 and the rear lid plate 21 are coupled in an interlocking manner via the flexible member 27 (the metal wire) arranged in the grass collection box 18, it is possible to incorporate the interlocking mechanism in the grass collection box 18, and it is possible to achieve the further downsizing and weight saving of the grass collection box 18 as well. Accordingly, it is possible to contribute to the further downsizing and weight saving of a whole of the lawn mower 1.

Particularly, since both ends of the metal wire 27 are coupled to the rear lid plate 21 and the bottom lid plate 20 in a state in which they are twisted at the appropriate angle around their axes, it is possible to achieve the improvement of the durability and the weight saving of the flexible member. Further, since the partway portion in the metal wire 27 contacts with the upper surface at a time when the bottom lid plate 20 is closed, the metal wire 27 is not disturbing at a time of receiving the mowed grass in the grass collection box 18.

In this case, the opening rotation caused by the contact of the mowed grass under discharged drop with the rear end of the bottom lid plate 20 is structured, as mentioned below, such as to be carried out following the opening rotation of the rear lid plate 21. In other words, as shown in FIG. 9, a pivot pin 55 in the base end of the opening and closing hydraulic cylinder 26 is rotatably provided with a lever body 56 having a receiving piece 56a with which the lower surface of the rear end portion of the bottom lid plate 20 comes into contact, and the lever body 56 is coupled to the lower link 25 via a link 57 in such a manner as to be rotated downward in accordance with the upward rotation of the lower link 25, that is, the rotation of the direction opening the rear lid plate 21. Accordingly, there is not carried out rapidly and at a stroke the opening rotation caused by the contact of the mowed grass under the discharged down with the rear end of the bottom lid plate 20, and the discharge of the mowed grass due to opening rotation of the bottom lid plate 20.

As mentioned above, if the discharge of the mowed grass in the grass collection box 18 to the grass collection container A is finished, the rear lid plate 21 is closed by the control of the opening and closing control lever 53 to the close position. In this case, since the center of the opening rotation of the bottom lid plate 20 is positioned at the position which is shifted to the rear end from the center position between the front end and the rear end of the bottom lid plate 20, the bottom lid plate 20 is automatically closed by the weight of the front end thereof. In this case, the opening and closing control lever 53 sets to the neutral position at a time of closing the rear lid plate 21, however, it is possible to structure such as to automatically carry out this.

Next, the grass collection box 18 comes down and is returned to the attitude receiving the mowed grass discharged from the discharge duct 14, as shown in FIG. 10, by controlling the elevation control lever 54 to the down position so as to actuate both the elevating hydraulic cylinders 30 to move the piston rearward after moving the lawn mower 1 in such a manner as to move away from the grass collection container A.

Next, since both the elevating hydraulic cylinders 30 move the piston rearward further, whereby both the lever bodies 40 are rotated in the forward direction in such a manner that the pivot pin 43 moves away from the stopper portion 44, and rotated forward in such a manner that the stopper piece 47 comes into contact with the lower bracket member 35 or the mast member 29, the outrigger 45 and the bumper body 46 are returned to the original backward position as shown in FIG. 1 so as to be returned to the grass mowing work.

In this case, the elevation control lever 54 may be automatically set to the neutral position at a time when both the lever bodies 40 are rotated forward in such a manner as to come into contact with the second bracket member 35 or the mast member 29. Further, the embodiment mentioned above is the case that the protrusion of the outrigger 45 is structured such as to be carried out at the moment before (just before) starting the lift-up of the grass collection box 18, however, in further the other embodiment, it is possible to structure such as to carry out after starting the lift-up of the grass collection box 18, and until lifting up to the high position, that is, in the moment in the process of lifting up.

2. Second Embodiment

Next, a description will be given of a second embodiment employing a structure in which a bottom portion guide plate of a grass collection box integrally moves with a bottom lid plate, with reference to FIGS. 22 to 29. In this case, the same reference numerals are attached to elements in the second embodiment in which their structure and operations are not different from the first embodiment, and a detailed description thereof will be omitted. A description will be given below of different points form the first embodiment.

(1) Structure of Bottom Portion Guide Plate

First, a description will be given of a structure of a bottom portion guide plate in a grass collection box.

In the second embodiment, a bottom portion guide plate 228 corresponding to a construction element of a grass collection box 18 is provided in a front portion of a bottom lid plate 20, and the bottom portion guide plate 228 protrudes forward to a discharge duct 14 from a front surface opening portion 18a (a mowed grass receiving port) of the grass collection box 18 in a state in which the bottom lid plate 20 is closed (refer to FIGS. 23 and 24). Further, in a state in which the grass collection box 18 is at a down position receiving the mowed grass and the bottom lid plate 20 is closed, the bottom portion guide plate 228 closes a bottom side portion between a rear end discharge port of the discharge duct 14 and the front surface opening portion 18a of the grass collection box 18, in the same manner as the first embodiment.

The bottom portion guide plate 228 is structured such as to be integrally rotated with the bottom lid plate 20 around a pivot pin 23 serving as a supporting point of rotation. In this case, there is employed a structure in which the bottom lid plate 20 is rotated in such a manner that a front end is bounded up and a rear end comes down, thereby opening the bottom surface of the grass collection box 18. Accordingly, the bottom portion guide plate 228 and the front surface opening portion 18a of the grass collection box 18 are formed such that they do not interfere with each other in the process of the opening and closing rotation of the bottom lid plate 20, in such a manner that the bottom portion guide plate 228 enters into the grass collection box 18 and the bottom lid plate 20 can be rotated widely to open (to an attitude approximately close to a vertical attitude).

In other words, in a side view of FIG. 26, a radius D of rotation (a distance from the pivot pin 23 to a front end portion of the bottom portion guide plate 228) of the front end portion of the bottom portion guide plate 228 is set smaller than a distance L from the pivot pin 23 to an upper edge portion of the front surface opening portion 18a of the grass collection box 18 (D<L). A lateral width of the bottom portion guide plate 228 is set smaller than a lateral internal dimension of the front surface opening portion 18a of the grass collection box 18. Accordingly, in the process of the opening and closing rotation of the bottom lid plate 20, the bottom portion guide plate 228 can smoothly enters into the grass collection box 18 from the forward side without catching on the peripheral edge of the front surface opening portion 18a of the grass collection box 18.

The bottom portion guide plate 228 in accordance with the second embodiment is provided with a bottom plate 228a which can come into contact with a lateral member 39 in a forefront of the grass collection box 18, and right and left guide side plates 228b which come close to inner surfaces of both the right and left side surface plates 18b of the grass collection box 18, and is formed in an upward C-shaped form in a front view. Rear end portions of the right and left guide side plates 228b extend to an upper surface front portion of the bottom lid plate 20.

In accordance with this structure, in a state in which the grass collection box 18 is at a down position and the bottom lid plate 20 is closed, a bottom portion (of a joint portion) between a rear end discharge port of the discharge duct 14 and the front surface opening portion 18a of the grass collection box 18 is surrounded by the upward C-shaped bottom portion guide plate 228. Therefore, it is possible to securely inhibit the mowed grass from spilling from the joint portion at a time of recovering the mowed grass into the grass collection box 18. Further, since the rear end portions of the right and left guide side plates 228b are extended to the upper surface front portion of the bottom lid plate 20, an attaching strength (rigidity) of the bottom portion guide plate 228 to the bottom lid plate 20 is high.

(2) Structure Related to PTO Control

Next, a description will be given of a structure related to a PTO control.

As shown in FIG. 27, a PTO clutch 163 serving as a clutch means is arranged between a drive pulley 161 firmly attached to a front end portion of an output shaft 65, and a driven pulley 162 firmly attached to a front end portion of a PTO shaft 72. The PTO clutch 163 is of a belt tension type connecting and disconnecting a power from an engine 7 by straining and loosening an endless PTO transmission belt 71 wound around the drive pulley 161 and the driven pulley 162. In this case, an illustration of a hood cover 10 is omitted as a matter of convenience for explanation in FIG. 27.

The PTO clutch 163 is coupled in an interlocking manner to a PTO clutch motor (not shown) serving as a connecting and disconnecting actuator via a coupling link mechanism 165 and a PTO clutch wire 166. In this case, a power transmission from an output shaft 65 to a PTO shaft 72 is connected and disconnected by rotating the PTO clutch 163 around a rotation support shaft 164 in a lower end portion via a coupling link mechanism 165 and a PTO clutch wire 166 so as to turn on and off, in such a manner as to strain or loosen the endless PTO transmission belt 71 by the driving of the PTO clutch motor (refer to FIG. 27).

On the other hand, a PTO control lever 252 serving as a PTO control body is arranged at a position reached from the control seat 9 of the lawn mower 1, and is structured such that if it is controlled to be turned on (controlled to be inclined forward) under a predetermined condition mentioned below, the PTO clutch 163 (refer to FIG. 27) is actuated to be turned on by driving the PTO clutch motor so as to strain the endless PTO transmission belt 71, and if it is controlled to be turned off (controlled to be inclined rearward), the PTO clutch 163 is actuated to be turned off by driving the PTO clutch motor so as to loosen the endless PTO transmission belt 71. The PTO control lever 252 is provided with a PTO on sensor 171 (refer to FIG. 28) serving as a PTO detecting means which is actuated to be turned on at a time of controlling it to turn on. It is possible to detect whether or not the PTO control lever 252 is at an on control position (a power connecting position) by the on and off actuation of the PTO on sensor 171.

(3) Hydraulic Circuit Structure of Lawn Mower

Next, a description will be given of a hydraulic circuit structure of the lawn mower with reference to FIG. 15.

A structure of a hydraulic circuit 91 of the lawn mower 1 in the second embodiment is the same as that of the first embodiment. The second embodiment is structured such that if an opening and closing control lever 53 is controlled toward an open position in the case that an electromagnetic discharge valve 135 is in a supply stop state, the opening and closing hydraulic cylinder 26 is actuated until the bottom lid plate 20 rotating to open while working with the rear lid plate 21 comes to a rearward diagonally downward discharge inclined attitude (refer to FIG. 29). Further, the structure is made such that the bottom lid plate 20 is held at a discharge inclined attitude, as a result of automatically setting the opening and closing hydraulic valve 109 to a neutral position and stopping the actuation of the opening and closing hydraulic cylinder 26. Further, the embodiment is structured such that a front end portion (a leading end portion) of the bottom portion guide plate 228 is faced (comes close) to an upper portion of a rear end discharge port (a mowed grass discharge port) of the discharge duct 14, at a time when the bottom lid plate 20 is at the discharge inclined attitude.

In a state in which the bottom lid plate 20 is held at the discharge inclined attitude, the bottom surface opening of the grass collection box 18 is opened. Accordingly, if the lawn mowing mechanism 13 is driven in this state, the grass mowed by the lawn mowing mechanism 13 is guided to the grass collection box 18 via the discharge duct 14, and is received by a back surface side (a lower surface side) of the bottom lid plate 20. Further, the mowed grass is smoothly guided to a rearward lower side along a rearward diagonally downward inclination of the bottom lid plate 20, and is scattered to the ground surface from a bottom surface opening of the grass collection box 18.

In other words, in the second embodiment, since the bottom lid plate 20 is structured such that it can be actuated to be opened in a state in which the grass collection box 18 is at the down position, it is possible to open the bottom surface opening of the grass collection box 18 at the down position. Accordingly, it is possible to easily carry out a discharging work scattering the mowed grass so as to pave the ground surface without recovering while keeping attaching the grass collection box 18 to the rear portion of the traveling machine body 2.

Further, in the second embodiment, one lawn mower 1 can be used for the mowed grass recovering work (the work for recovering the mowed grass into the grass collection box 18) and can be used for the discharging work only by switching the opening and closing attitude of the bottom lid plate 20 to a close attitude (a state in which the bottom surface opening is closed) or a discharge inclined attitude. In other words, since the operator can easily switch from the mowing recover work to the discharging word or vise versa without reattaching the grass collection box 18 and the discharge cover such as the conventional one, the lawn mower 1 in accordance with the second embodiment has a reduced working burden of the operator and is easily handled, while having high utility that one lawn mower can be used for the mowed grass recovering work and the discharge work.

Further, since the opening actuation of the bottom lid plate 20 in the second embodiment is structured such as to rotate to open the bottom portion guide plate 228 so as to be bounded up toward the grass collection box 18, and the bottom lid plate 20 rotated to open in the state in which the grass collection box 18 is at the down position is held to the discharge inclined attitude in which the front end portion of the bottom portion guide plate 228 is faced to the upper portion of the rear end discharge port of the discharge duct 14, the back surface side (the lower surface side) of the bottom lid plate 20 comes to the guide surface guiding the mowed grass toward the ground surface. In other words, the bottom lid plate 20 can serve as a deflector changing the discharge end of the mowed grass, and can smoothly discharge the mowed grass discharged from the discharge duct 14 to the ground surface by a guide action (a deflector action) of the bottom lid plate 20.

Further, since the front end portion of the bottom portion guide plate 228 is faced to the upper portion of the rear end discharge port of the discharge duct 14 in this case (at a time when the bottom lid plate 20 is in the discharge inclined attitude), a gap between the front end portion of the bottom portion guide plate 228 and the upper portion of the rear end discharge port of the discharge duct 14 is narrow, and there is a small risk that the mowed grass discharged from the discharge duct 14 leaks to the front surface side (the upper surface side) of the bottom lid plate 20. Accordingly, there is an advantage that it is possible to efficiently discharge the mowed grass from the discharge duct 14 to the ground surface without being piled up to the front surface side of the bottom lid plate 20.

(4) Motion Aspect of Bottom Portion Guide Plate

Next, a description will be given of an example of a motion aspect of the bottom portion guide plate.

In the structure mentioned above, after moving the lawn mower 1 close to the grass collection container A in a state of moving up the grass collection box 18 to a maximum up position by the grass collection discharge mechanism 16, the rear lid plate 21 of the grass collection box 18 is rotated to open by actuating the opening and closing hydraulic cylinder 26 in such a manner that the piston moves to protrude, by the control of the opening and closing control lever 53 to the open position, thereby starting discharging the mowed grass in the grass collection box 18 into the grass collection container A (refer to FIG. 24).

Next, the bottom lid plate 20 of the grass collection box 18 is rotated in such a manner that the front end is bounded up and the rear end comes down, in accordance with the opening rotation of the rear lid plate 21 via a metal wire 27 having a flexibility, and opens the bottom surface of the grass collection box 18 (refer to FIG. 25), so that the discharge of the mowed grass from the grass collection box 18 into the grass collection container A is further promoted. Further, if the rear lid plate 21 is fully opened, the further piston protruding motion of both the opening and closing hydraulic cylinder 26, that is, the opening actuation of the rear lid plate 21 is stopped, by controlling the opening and closing control lever 53 to the neutral position.

In this case, since the mowed grass during the discharge drop from the grass collection box 18 comes into contact with the rear end of the bottom lid plate 20 while sliding down, the bottom lid plate 20 is automatically rotated to open further widely by the weight of the sliding mowed grass, while loosening the metal wire 27, in spite that the rear lid plate 21 maintains the full-open state. The bottom portion guide plate 228 is rotated to open together with the bottom lid plate 20, and enters into the grass collection box 18. In other words, it is possible to rotate to widely open the bottom lid plate 20 and the bottom portion guide plate 228 (to an attitude approximately close to a vertical attitude), and it is possible to smoothly and securely discharge the mowed grass in the grass collection box 18 including the mowed grass piled up on the upper surface of the bottom portion guide plate 228, out of the grass collection box 18.

(5) Structure of PTO Regulating Mechanism.

Next, a description will be given of a structure of a PTO regulating mechanism for preventing the lawn mowing mechanism from being unexpectedly driven, with reference to FIGS. 28 and 29.

A PTO regulating mechanism 170 of the lawn mower 1 in the second embodiment is provided with a battery 64, a PTO on sensor 171 serving as a PTO detecting means which is actuated to be turned on at a time of activating a PTO control lever 252, a lift stroke sensor 172 serving as one example of a grass collection detecting means detecting the up and down positions of the grass collection box 18, and a motor drive circuit portion 173 for driving a PTO clutch motor (not shown). In this case, the PTO on sensor 171, the lift stroke sensor 172 and the motor drive circuit portion 175 are connected in series to the battery 64.

The lift stroke sensor 172 is structured such as to detect the up and down position of the grass collection box 18, on the basis of a piston protruding amount (protruding position) of the elevating hydraulic cylinder 30, and is structured such as to be actuated to be turned on in a state in which the piston of the elevating hydraulic cylinder 30 is the shortest, that is, the grass collection box 18 is at the down position.

A bottom lid plate close sensor 173 and a bottom lid plate discharge sensor 174 serving as an attitude detecting means are connected in parallel to each other between the lift stroke sensor 172 and the motor drive circuit portion 175. The bottom lid plate close sensor 173 is of an and off changeover switch type which is actuated to be turned on if the bottom lid plate 20 is in a close position (a close position, refer to FIGS. 1 and 10) in which the bottom lid plate 20 closes the bottom surface opening of the grass collection box 18, and the bottom lid plate discharge sensor 174 is of an on off changeover switch type which is actuated to be turned on if the bottom lid plate 20 comes to a rearward diagonally downward discharge inclined attitude shown in FIG. 29. These sensors 173 and 174 are provided, for example, in association with the peripheral edge portion of the bottom surface opening of the grass collection box 18, or the pivot pin 23 rotatably pivoting the bottom lid plate.

In the structure mentioned above, if the PTO control lever 252 is controlled to be turned on, at a time of satisfying any one of conditions (1) the case that the grass collection box 18 is at the down position and the bottom lid plate 20 is in the closed attitude, and (2) the case that the grass collection box 18 is at the down position and the bottom lid plate 20 is in the discharge inclined attitude, each of the sensors 171, 172 and 173 (or 171, 172 and 174) mentioned above is actuated to be turned on, and the electric current from the battery 64 flows to the motor drive circuit portion 175 via each of the sensors 171, 172 and 173 (or 171, 172 and 174). As a result, the PTO clutch motor is driven and the PTO clutch 163 (refer to FIG. 27) comes to the on state (the power connection state). In other words, only in the case that the grass collection box 18 is at the down position and the bottom lid plate 20 is in the closed attitude or the discharge inclined attitude, the drive of the lawn mowing mechanism 13 is allowed.

On the other hand, if the grass collection box 18 is at the up position or in the process of moving up, the lift stroke sensor 172 comes to the off state. Accordingly, the electric current from the battery 64 is disconnected halfway even by controlling the PTO control lever 152 to turn on. As a result, the PTO clutch 163 comes to the off state (the power disconnection state), and the drive of the lawn mowing mechanism 13 is inhibited. Further, if the bottom lid plate 20 is in a halfway open attitude which is neither the close attitude nor the discharge inclined attitude, both the bottom lid plate close sensor 173 and the bottom lid plate discharge sensor 174 come to the off state. Accordingly, the electric current from the battery 64 is disconnected halfway even by controlling the PTO control lever 252 to turn on. As a result, the PTO clutch 163 comes to the off state (the power disconnection state), and the drive of the lawn mowing mechanism 13 is inhibited.

Accordingly, for example, even if it erroneously comes into contact with the elevating control lever 54 or the opening and closing control lever 53 during the drive of the lawn mowing mechanism 13, the PTO clutch 163 comes to the off state and the drive of the lawn mowing mechanism 13 is automatically stopped. Accordingly, it is possible to prevent the mowed grass, the pebble or the like from being unexpectedly scattered to the rear side of the traveling machine body 2 from the rear end discharge port of the discharge duct 14.

Further, even if the operator erroneously controls to turn on the PTO control lever 252 at a time when the grass collection box 18 is at the up position (at a time of discharging the mowed grass), the PTO clutch 163 is held in the off state, and the lawn mowing mechanism 13 is not driven. Accordingly, even in this case, it is possible to prevent the mowed grass, the pebble or, the like from being unexpectedly scattered to the rear side of the traveling machine body 2 from the rear end discharge port of the discharge duct 14.

Further, since the drive of the lawn mowing mechanism 13 is allowed in the case that the grass collection box 18 is at the down position, and the bottom lid plate 20 is in the close attitude of the discharge inclined attitude, it goes without saying that it is possible to carry out the mowed grass recovering work and discharging work without any trouble, by using the lawn mower 1 in accordance with the second embodiment.

Further, as mentioned above, since the drive of the lawn mowing mechanism 13 is inhibited in the case that the bottom lid plate 20 is in the halfway open attitude which is neither the close attitude nor the discharge inclined attitude, the operator can easily grasp whether the bottom lid plate 20 is in a proper discharge inclined attitude on the basis of whether there is drive of the lawn mowing mechanism 13, at a time of the discharging work. In addition, it is possible to prevent a risk that the mowed grass discharged from the discharge duct 14 flows to the front surface side of the bottom lid plate 20 so as to be piled up, and it is possible to securely and smoothly discharge the mowed grass from the discharge duct 14 to the ground surface.

3. Third Embodiment

Next, a description will be given of a third embodiment showing the other example of the PTO regulating mechanism with reference to FIGS. 30 to 39. A lawn mower 1 in accordance with the third embodiment is basically structured such that a bottom portion guide plate 228 of a grass collection box 18 moves integrally with a bottom lid plate 20 (in the same manner as the second embodiment), and the same reference numerals as the second embodiment are attached to elements in which structures and operations in the third embodiment are not different from the second embodiment, and a detailed description thereof will be omitted. A description will be given below of different points from the second embodiment.

(1) Peripheral Structure of Grass Collection Box

First of all, a description will be given of a peripheral structure of a grass collection box.

As shown in FIGS. 32, 34 and 39, a triangle plate shaped rotating plate body 191 is rotatably provided in a pivot pin 55 in a base end of the opening and closing hydraulic cylinder 26, and an upper corner portion of the rotating plate body 191 is coupled in an interlocking manner to an end portion which is in a further forward side than a pin shaft 25*a* in a lower link 25 via a link 57. A lower corner portion of the rotating plate body 191 protrudes further downward than a side surface lower end of the grass collection box 18, and a headed lock long shaft 192 corresponding to one constructing element of a discharge lock means 200 (refer to FIGS. 37 and 38) mentioned below is detachably installed between the lower corner portions of both the right and left rotating plate bodies 191. In the embodiment, the lock long shaft 192 can not come off and can be detached by passing the lock long shaft 192 through the lower corner portions of both the right and left rotating plate bodies 191 and attaching a come-off preventing stop pin 193 to a leading end portion in an opposite side to the head portion of the lock long shaft 192.

Accordingly, when the lower link 25 rotates upward in a direction opening the rear lid plate 21, the rotating plate body 191 rotates downward around the pivot pin 55 while the lock long shaft 192 supporting the rear portion lower surface of the bottom lid plate 20 (refer to FIG. 32). Accordingly, it is possible to prevent the rotating speed from being rapidly increased by the contact of the mowed grass during the discharging drop with the rear end of the bottom lid plate 20, at a time when the bottom lid plate 20 is rotated to be opened. In other words, the discharge of the mowed grass is not carried out rapidly and at a moment by the opening rotation of the bottom lid plate 20. In this case, a combination of the lower link 25, the link 57 and the rotating plate body 191 corresponds to an opening and closing link mechanism 190.

A rear end portion of a detection rod 194 longitudinally extending along the side surface plate 18*b* of the grass collection box 18 is pivoted to a front corner portion of at least one rotating plate 191 (the left rotating plate body in the embodiment) in such a manner as to be rotatable to oscillate up and down by a lateral pin 195. A leading end portion of the detection rod 194 is passed through a vertically long groove hole 197 of a guide bracket 196 provided in the side surface front portion of the grass collection box 18 (refer to FIGS. 32, 33 and 34). In other words, the leading end portion of the detection rod 194 is loosely fitted to the vertically long groove hole 197 of the guide bracket 196, and is structured such that it can maintain a longitudinally extending attitude (it can not hang down) by an existence of the guide bracket 196.

An L-shaped plate shaped rod support plate 198 is fastened by a bolt to a lower surface side in a halfway portion of the detection rod 194. The rod support plate 198 of the detection rod 194 is set such as to come into contact with a bumper body 216 protruding to a rearward diagonally upward direction (that is to support the detection rod 194 from a lower side by the bumper body 216) at a time when an outrigger 215 mentioned below is in a protruding attitude (refer to FIG. 36). In this state, a leading end portion of the detection rod 194 passes through an upper portion side of the vertically long groove hole 197 at the guide bracket 196, and the detection rod 194 itself is held in an approximately horizontal attitude (refer to FIGS. 36 to 38). At this time, it goes without saying that the leading end portion of the detection rod 194 comes to a state in which it is loosened within the vertically long groove hole 197 of the guide bracket 196.

As shown in FIGS. 32, 37 and 38, a discharge lock means 200 for holding the bottom lid plate 20 in a rearward diagonally downward discharge inclined attitude (refer to a single dot chain line in FIG. 32) rotating so open the bottom lid plate 20 is provided to the grass collection box 18 and the bottom lid plate 20. The discharge lock means 200 in accordance with the third embodiment is constructed by both right and left bottom frames 201 of the grass collection box 18, a pair of right and left lock plates 202 provided in an upper surface rear portion of the bottom lid plate 20, the lock long shaft 192 mentioned above and a stop pin 193.

A through hole 203 concentrically passing through in a lateral direction is formed at a further rear position than the pivot pin 23 with respect to the bottom lid plate 20 in each of the bottom frames 201. Further, a lock hole 204 concentrically passing through in a lateral direction is formed in each of the lock plates 202. In a state in which the bottom lid plate 20 is in the discharge inclined attitude, the through holes 203 of both the right and left bottom frames 201 and the lock holes 204 in both the right and left lock plats 202 are set to be positioned concentrically (linearly) in the lateral direction. Accordingly, in this state, the lock long shaft 192 can be fitted to and detached from the through hole 203 and the lock hole 204. In this case, the third embodiment is structured such that the front end portion (the leading end portion) of the bottom portion guide plate 228 is faced to the upper portion of the rear end discharge port (the mowed grass discharge port) of the discharge duct 14 at a time when the bottom lid plate 20 is in the discharge inclined attitude.

At a time of the discharging work scattering the mowed grass so as to pave on the ground surface without recovery, after setting the bottom lid plate 20 in the discharge inclined attitude by a manual control or the like, and bringing the through holes 203 of both the right and left bottom frames 201 into line with the lock holes 204 of both the right and left lock plates 202, the lock long shaft 192 is passed through the through holes 203 and the lock holes 204, and the come-off preventing stop pin 193 is attached to the leading end portion of the lock long shaft 192. As a result, the bottom lid plate 20 is stably held in the discharge inclined attitude (refer to FIG. 38). The lock control (the engaging control) itself is extremely easy.

(2) Peripheral Structure of Lift Mechanism

Next, a description will be given of a peripheral structure of a lift mechanism.

A lever body 210 is rotatably pivoted to each of inner surfaces of the lower bracket member 35 at the lower ends of both the mast members 29 via a pin 211. Both the lever bodies 210 are integrally coupled therebetween via a lateral member 212 in such a manner that both the lever bodies 210 simultaneously rotate, and a base end of the elevating hydraulic cylinder 30 is rotatably coupled to each of the lever bodies 210 by a cylinder pivoting pin 213.

Both the lever bodies 210 are provided with an outrigger 215 protruding downward in such a manner as to come close to the ground surface 4, and a bumper body 216 protruding rearward at this time, in a state in which the lever body 210 rotates downward around the pin 211. Further, both the lever bodies 210 are provided with a stopper piece 217 coming into contact with a rear surface of the lower end portion 29*a* of the mast member 29 in such a manner as to inhibit the further downward rotation (the further downward rotation from the protruding attitude), at a time when the lever body 210 is rotated downward around the pin 211. Accordingly, the right and left lever bodies 210, and the outriggers 215, the bumper bodies 216 and the stopper pieces 217 which are provided respectively are integrally moved around the pin 211 so as to change their attitudes.

In this case, the lever body 210, the outrigger 215, the bumper body 216, and the stopper piece 217 in accordance with the third embodiment are different in their aspects, however, basically achieve the same functions as those of the lever body 40, the outrigger 45, the bumper body 46 and the stopper portion 44 in accordance with the first (and second) embodiments.

Further, the structure is made such as to reciprocally move up and down the grass collection box 18 between the forward attitude receiving the mowed grass discharged from the discharge duct 14 at the down position, and the state lifting up high while keeping the forward attitude, by coupling the leading ends of both the elevating hydraulic cylinders 30 to the lower link 32 of a pair of upper and lower lifting links 31 and 32 by the pin 48, and rotating a pair of upper and lower lifting links 31 and 32 in the vertical direction by both the elevating hydraulic cylinder 30.

As shown in FIGS. 31, and 36 to 38, an inner surface side of the mast member 29 (the left mast member 29 in the third embodiment) existing in the same side as the detection rod 194 is provided with a contact type limit switch 218 serving as a rod detecting means detecting the leading end portion of the detection rod 194 via a bracket plate 219. A leaf spring member 220 formed as an approximately C-shaped form in a side view and having an elasticity is arranged in a hanged manner in a rear surface side of the bracket plate 219, in such a manner as to be interposed between a sensing element 221 protruding rearward from the limit switch 218 and the leading end portion of the detection rod 194.

In this case, if the leading end portion of the detection rod 194 presses the leaf spring member 220 from the rear side and the leaf spring member 220 comes into contact with the sensing element 221, the limit switch 218 is actuated to be turned on, while if the pressing by the detection rod 194 is cancelled and the leaf spring member 220 is detached from the sensing element 221, the limit switch 218 is actuated to be turned off.

(3) Structure and Actuation Aspect of PTO Regulating Mechanism

Next, a description will be given of a structure and an actuation aspect of a PTO regulating mechanism for preventing the lawn mowing mechanism from being unexpectedly driven with reference to FIGS. 35-38.

A PTO regulating mechanism 225 of the lawn mower 1 in the third embodiment is provided with a battery 64, a PTO on sensor 226 serving as a PTO detecting means which is actuated to be turned on at a time of controlling the PTO control lever 52 to turn on, the contact type limit switch 218 serving as the rod detecting means mentioned above, and a motor drive circuit portion 227 for driving a PTO clutch motor (not shown). In this case, the PTO on sensor 226, the limit switch 218 and the motor drive circuit portion 227 are connected in series to the battery 64.

The limit switch 218 is provided for detecting a damp state (an up position or a down position) of the grass collection box 18 and an open and close state of the rear lid plate 21 on the basis of whether or not the leading end portion of the detection rod 194 comes into contact with the sensing element 221 via the leaf spring member 220, and is structured such that the limit switch 218 is actuated to be turned on in a state in which the leading end portion of the detection rod 194 presses the sensing element 221 by the leaf spring member 220, and the limit switch 218 is actuated to be turned off in a state in which the pressing is cancelled, as mentioned above.

In the structure mentioned above, in the case of controlling the elevating control lever 54 to the up position for the mowed grass discharging work, both the elevating hydraulic cylinders 30 are moved to protrude, as shown in FIG. 36, and the bumper body 216 is protruded rearward as well as the outrigger 215 is protruded in such a manner as to come close to the ground surface 4, before the lifting actuation of the grass collection box 18.

Then, the support of the bumper body 216 with respect to the rod support plate 198 of the detection rod 194 is detached, the detection rod 194 is inclined to the forward diagonally downward direction around the lateral pin 195 at the rear end, and the leading end portion of the detection rod strikes against (catches on) the lower end portion of the vertical long groove hole 197 of the guide bracket 196. At this time, since the leading end portion of the detection rod 194 comes into contact with the lower end side of the leaf spring member 220, the leaf spring member 220 elastically deforms by its own elastic restoring force in such a manner as to move a lower end side rearward, and moves away from the sensing element 221 of the limit switch 218, and the limit switch 218 comes to the off state.

As a result, the electric current from the battery 64 is interrupted halfway even by controlling the PTO control lever 52 to turn on, and the PTO clutch 163 always comes to the off state (the power interrupting state). Accordingly, the drive of the lawn mowing mechanism 13 is inhibited.

Further, in the case of controlling the opening and closing control lever 53 to the open position in the state in which the grass collection box 18 is at the down position, the rear lid plate 21 and the bottom lid plate 20 are actuated to be opened in an interlocking manner via the metal wire 27 as shown in FIG. 37. However, since the rotating plate body 191 of the opening and closing link mechanism 190 is rotated downward in a clockwise direction in a side view of FIG. 37 around the pivot pin 55 of the opening and closing hydraulic cylinder 26, at this time, the detection rod 194 is pulled rearward by the rotating action of the rotating plate body 191 while being supported from the below by the bumper body 216.

Then, the leading end portion of the detection rod 194 is detached from the leaf spring member 220, and the leaf spring member 220 is elastically deformed by its elastic restoring force in such a manner as to move the lower end rearward, and is detached from the sensing element 221 of the limit switch 218. As a result, the limit switch 218 comes to the off state, the electric current from the battery 64 is interrupted halfway even by controlling the PTO control lever 252 to be turned on, and the PTO clutch 163 always comes to the off state (the power interrupting state). Accordingly, even in this case, the drive of the lawn mowing mechanism 13 is inhibited.

Accordingly, since the PTO clutch 163 comes to the off state, and the drive of the lawn mowing mechanism 13 is automatically stopped, for example, even if it erroneously comes into contact with the elevation control lever 54 or the opening and closing control lever 53 during the drive of the lawn mowing mechanism 13, it is possible to prevent the mowed grass, the pebble or the like from being unexpectedly scattered to the rear side of the traveling machine body 2 from the rear end discharge port of the discharge duct 14.

Further, since the PTO clutch 163 is held in the off state, and the lawn mowing mechanism 13 is not driven, even if the operator erroneously controls the PTO lever 252 to turn on at a time when the grass collection box 18 is at the up position (at a time of the discharging work of the mowed grass), it is possible to prevent the mowed grass, the pebble or the like from being unexpectedly scattered to the rear side of the traveling machine body 2 from the rear end discharge port of the discharge duct 14, even in this case.

On the other hand, in the case that the grass collection box 18 is at the down position, and the rear lid plate 21 is at the closed attitude (the bottom lid plate 20 may be in the closed attitude or the discharge inclined attitude), the detection rod 194 is supported from the below by the bumper body 206, and the rotating plate body 191 of the opening and closing link mechanism 190 is held in a state upward rotating in a counterclockwise direction in a side view of FIG. 38 around the pivot pin 55 of the opening and closing hydraulic cylinder 26, as shown in FIG. 38. Accordingly, the detection rod 194 itself comes into contact with the upper end side of the leaf spring member 220 in an approximately horizontal attitude, and presses the sensing element 221 via the leaf spring member 220 from the rear side. Accordingly, the limit switch 218 comes to an on state.

If the PTO control lever 252 is controlled to turn on in this state, the PTO on sensor 226 mentioned above is actuated to be turned on, and the electric current from the battery 64 flows to the motor drive circuit portion 175 via the PTO sensor 226 and the limit switch 218. As a result, the PTO clutch motor is driven and the PTO clutch 163 comes to the on state (the power connecting state).

In other words, as long as the grass collection box 18 is at the down position, and the rear lid plate 21 is in the close attitude, the drive of the lawn mowing mechanism 13 is allowed regardless of the close attitude or the discharge inclined attitude of the bottom lid plate 20. Therefore, it is possible to carry out the mowed grass recovering work (the work for recovering the mowed grass into the grass collection box 18) and the discharging work (the work for scattering the mowed grass so as to pave on the ground surface) without any trouble by using the lawn mower 1 of the third embodiment.

Particularly, as shown in FIG. 38, since only the bottom surface opening of the grass collection box 18 is opened, in a state in which the bottom lid plate 20 is held in the discharge inclined attitude by controlling the engagement of the discharge lock means 200, the grass mowed by the lawn mowing mechanism 13 is guided to the grass collection box 18 via the discharge duct 14 by driving the lawn mowing mechanism 13 in this state, and is received by the back surface side (the lower surface side) of the bottom lid plate 20. Further, the mowed grass is smoothly guided to the rear lower side along the rearward inclined downward slope of the bottom lid plate 20, and is scattered into the ground surface from the bottom surface opening of the grass collection box 18.

In other words, in the third embodiment, since the PTO clutch 163 can be set to the on state while opening only the bottom surface opening of the grass collection box 18 at the down position and keeping closing the rear lid plate 21, it is possible to easily carry out the discharging work with the grass collection box 18 attached to the rear portion of the traveling machine body 2. Accordingly, since it is possible to use one lawn mower 1 for the mowed grass recovering work or the discharging work without reattaching the grass collection box 18, for example, to the discharge cover, the lawn mower 1 in accordance with the embodiment has an advantage that it gives a small work burden and easy handling to an operator, in spite that it has high utility capable of coping with both the mowed grass recovering work and the discharging work.

Further, since the opening actuation of the bottom lid plate 20 in the third embodiment is structured such as to bound up the bottom portion guide plate 28 to the grass collection box 18, and the bottom lid plate 20 rotated to open in the state in which the grass collection box 18 is at the down position is held in the discharge inclined attitude in which the front end portion of the bottom portion guide plate 28 is faced to the upper portion of the rear end discharge port of the discharge duct 14, the back surface side (the lower surface side) of the bottom lid plate 20 comes to the guide surface guiding the mowed grass toward the ground surface. In other words, the bottom lid plate 20 serves as a deflector changing the discharge end of the mowed grass, and it is possible to smoothly discharge the mowed grass discharged from the discharge duct 14 to the ground surface by the guide action (the deflector action) of the bottom lid plate 20.

Further, since the rear lid plate 21 is closed in this case (in the case that the bottom lid plate 20 is in the discharge inclined attitude), the mowed grass discharged from the discharge duct 14 is efficiently discharged to the ground surface from the bottom surface opening without leaking out of the rear surface opening of the grass collection box 18.

Further, it is possible to detect the matter that the rear lid plate 21 is in the closed state, and the matter that the grass collection box 18 is at the down position, by one limit switch 218. In other words, the limit switch 218 serving as the rod detecting means plays two roles of detecting the damp state of the grass collection box 18 and of detecting the open and close state of the rear lid plate 21. Accordingly, it is possible to construct the mechanism of allowing and inhibiting the on actuation of the PTO clutch 163 as a simple structure having a reduced parts number, and there is an advantage that it is possible to contribute to the suppression of the manufacturing cost.

4. Fourth Embodiment

Next, a description will be given of a fourth embodiment showing the other example of the PTO regulating mechanism with reference to FIG. 40. A basic structure of the lawn mower 1 in the fourth embodiment is the same as the third embodiment (or the second embodiment).

A PTO regulating mechanism 230 in accordance with the fourth embodiment is provided with a battery 64, a PTO on sensor 231 serving as a PTO detecting means which is actuated to be turned on at a time of controlling a PTO control lever 252 to be turned on, and an engine stop solenoid 232 serving as an engine stop mechanism which is provided in association with a fuel injection pump with governor (not shown) regulating a fuel injection amount to the engine 7. In this case, the PTO on sensor 231 and the engine stop solenoid 232 are connected in series to the battery 64. The fuel supply from the fuel tank 62 to the engine 7 is suspended by driving the engine stop solenoid 232. As a result, the drive of the engine 7 is stopped.

A seating sensor 233, a parking sensor 234 and a contact type limit switch 235 serving as a rod detecting means are connected in parallel to each other between the PTO on sensor 226 and the engine stop solenoid 232. As seen from these detecting means 233 to 235, the detecting means 233 to 235 are connected in series to the PTO on sensor 231 and the engine stop solenoid 232.

The seating sensor 233 is of an on-off changeover switch type sensor which is actuated to be turned on if the operator leaves the control seat 9. In the case that the operator does not seat on the control seat 9 and the PTO control lever 252 is controlled to be turned on, the seating sensor 233 and the PTO on sensor 231 are actuated to be turned on, and the engine stop solenoid 232 is driven. As a result, the driving of the engine 7 is automatically stopped. Accordingly, as long as the operator does not seat on the control seat 9, the driving of the lawn mowing mechanism 13 is inhibited.

The parking sensor 234 is of an on-off changeover switch type sensor which is actuated to be turned on by controlling to turn on the parking lever 236 maintaining the brake pedal 82 at the step-down position (the brake position). In this case, the parking lever 236 is provided for locking and holding the brake pedal 82 at the step-down position, and is arranged below the control handle 8 which is not illustrated in detail.

In the case that the parking lever 236 is in an on state (a state in which the brake pedal 82 is held at the step-down position) and the PTO control lever 252 is controlled to be turned on, the parking sensor 234 and the PTO on sensor 231 are actuated to be turned on, and the engine stop solenoid 232 is driven. As a result, the driving of the engine 7 is automatically stopped. Accordingly, as long as the parking lever 234 is in an on state, the driving of the lawn mowing mechanism 13 is inhibited.

The limit switch 235 has the same construction as the limit switch 218 described previously, in a point that it detects the damp state (the up position or the down position) of the grass collection box 18 and the open and close state of the rear lid plate 21 on the basis of whether or not the leading end portion of the detection rod 194 comes into contact with the sensing element 221 via the leaf spring member 220. In this case, the structure is made such that the limit switch 235 is actuated to be turned off in a state in which the leading end portion of the detection rod 194 presses the sensing element 237 by the leaf spring member 220, and the limit switch 235 is actuated to be turned on in a state in which the pressing is cancelled (the actuation aspect at a time of turning on and off is reversed to the limit switch 218 described previously).

In the case that the elevation control lever 54 is controlled to the up position for the mowed grass discharging work, or the opening and closing control lever 53 is controlled to the open position in the state in which the grass collection box 18 is at the down position, the leaf spring member 220 comes away from the sensing element 237 of the limit switch 235, and the limit switch 235 comes to the on state. Accordingly, the electric current from the battery 64 flows into the engine stop solenoid 232 via the PTO on sensor 231 and the limit switch 235, and the engine stop solenoid 232 is driven. As a result, the driving of the engine 7 is automatically stopped.

Accordingly, the driving of the lawn mowing mechanism 13 is allowed only in the case that the grass collection box 18 is at the down position and the rear lid plate 21 is in the close attitude (the bottom lid plate 20 may be set to the close attitude or the discharge inclined attitude), and the driving of the lawn mowing mechanism 13 is inhibited as long as the grass collection box 18 is controlled to be moved up, or the rear lid plate 21 is set to the open attitude.

Summarizing the above, if any one of three conditions is satisfied, the conditions including (1) the case that the operator does not seat on the control seat 9, (2) the case that the parking lever 236 is in the on state, and (3) the case that the grass collection box 18 is controlled to be moved up or the rear lid plate 21 is set to the open attitude, the driving of the lawn mowing mechanism 13 is inhibited even if the PTO control lever 252 is in the on state.

Accordingly, for example, even if the lawn mowing mechanism 13 erroneously comes into contact with the elevating control lever 54 or the opening and closing control lever 53 during the driving, the driving of the engine 7 is automatically stopped. Therefore, the driving of the lawn mowing mechanism 13 can be automatically stopped, the grass collection box 18, the rear lid plate 21 and the bottom lid plate 20 are not unexpectedly actuated. Accordingly, it is possible to prevent the mowed grass, the pebble or the like from being unexpectedly scattered to the rear side of the traveling machine body 2 from the rear end discharge port of the discharge duct 14.

Further, even if the operator erroneously controls the PTO control lever 252 to turn on at a time when the grass collection box 18 is at the up position (at a time of discharging the mowed grass), the driving of the lawn mowing mechanism 13 is automatically stopped together with the engine 7. Accordingly, it is possible to prevent the mowed grass, the pebble or the like from being unexpectedly scattered to the rear side of the traveling machine body 2 from the rear end discharge port of the discharge duct 14 even in this case.

Further, in the fourth embodiment, it is possible to detect the fact that the rear lid plate 21 is in the close state, and the fact that the grass collection box 18 is at the down position, by one limit switch 235. In other words, the limit switch 235 serving as the rod detecting means plays two roles of detecting the damp state of the grass collection box 18 and of detecting the open and close state of the rear lid plate 21. Accordingly, it is possible to construct the mechanism of forcibly stopping the driving of the engine 7 as a simple structure having a reduced parts number, and there is an advantage that it is possible to contribute to the suppression of the manufacturing cost.

5. Fifth Embodiment

Next, a description will be given of a fifth embodiment employing a structure in which a bottom portion guide plate of a grass collection box is rotated working with a bottom lid plate, with reference to FIGS. 41 to 46. In this case, the same reference numerals are attached to elements in the fifth embodiment in which their structure and operations are not different from the first embodiment, and a detailed description thereof will be omitted. A description will be given below of different points form the first embodiment.

(1) Structure of Bottom Portion Guide Plate

First, a description will be given of a structure of a bottom portion guide plate in a grass collection box.

A bottom portion guide plate 328 in accordance with the fifth embodiment is provided in a lower side of a front surface opening portion 18a in a grass collection box 18 in such a manner as to protrude forward so as to face to a rear end portion of a discharge duct 14. The bottom portion guide plate 328 is structured such that a rear end thereof is rotatably pivoted to both right and left side surface plates 18b of the grass collection box 18 by a pivot pin shaft 328a, whereby a front end of the bottom portion guide plate 328 is inclined and rotated around the pin shaft 328a at the rear end so as to be bounded upward.

Further, the bottom portion guide plate 328 is provided with right and left guide side plates 328b which come close to inner surfaces of both the right and left side surface plates 18b of the grass collection box 18, and is constructed as an upward C-shaped form in a front view.

Further, the bottom portion guide plate 328 is structured such as to be inclined and rotated working with an opening rotation of the bottom lid plate 20, by coupling both ends of a link 328e arranged between an arm 328c and an arm 328d to the arm 328c firmly attached to the pivot pin shaft 328a and the arm 328c firmly attached to the pivot pin 23 of the bottom lid plate 20, by pins 328f and 328g, as shown in FIG. 42.

In this case, as the other embodiment, the bottom portion guide plate 328 can be structured that the bottom portion guide plate 328 is inclined and rotated prior to the opening rotation of the bottom lid plate 20 and the bottom lid plate 20 is next rotated to be opened, by coupling the bottom portion guide plate 328 to the opening and closing hydraulic cylinder 26, the lower link 25 or the like.

(2) Motion Aspect of Bottom Portion Guide Plate

Next, a description will be given of an example of a motion aspect of the bottom portion guide plate.

In the structure mentioned above, after moving the lawn mower 1 close to the grass collection container A in a state of moving up the grass collection box 18 to a maximum up position by the grass collection discharge mechanism 16, the rear lid plate 21 of the grass collection box 18 is rotated to open by actuating the opening and closing hydraulic cylinder 26 in such a manner that the piston moves to protrude, by the control of the opening and closing control lever 53 to the open position, thereby starting discharging the mowed grass in the grass collection box 18 into the grass collection container A.

Next, the bottom lid plate 20 of the grass collection box 18 is rotated in such a manner that the front end is bounded up and the rear end comes down, in accordance with the opening rotation of the rear lid plate 21 via a metal wire 27 having a flexibility, and opens the bottom surface of the grass collection box 18 (refer to FIG. 45), so that the discharge of the mowed grass from the grass collection box 18 into the grass collection container A is further promoted. At this time, the arm 328d firmly attached to the pivot pin 23 of the bottom lid plate 20 pulls the arm 328c firmly attached to the pivot pin shaft 328a of the bottom portion guide plate 328 rearward via the link 328e, whereby the bottom portion guide plate 328 is inclined and rotated in such a manner that the front end portion is bounded up in accordance with the opening rotation of the bottom lid plate 20. Further, in the case that the rear lid plate 21 is fully opened, the further piston protruding motion of both the opening and closing hydraulic cylinder 26, that is, the opening actuation of the rear lid plate 21 is stopped, by controlling the opening and closing control lever 53 to the neutral position.

In this case, since the mowed grass during the discharge drop from the grass collection box 18 comes into contact with the rear end of the bottom lid plate 20 while sliding down, the bottom lid plate 20 is automatically rotated to open further widely by the weight of the sliding mowed grass, while loosening the metal wire 27, in spite that the rear lid plate 21 maintains the full-open state (refer to FIG. 46). Accordingly, it is possible to rotate to widely open the bottom lid plate 20 (to an attitude approximately close to a vertical attitude), and it is possible to smoothly and securely discharge the mowed grass in the grass collection box 18 out of the grass collection box 18.

Further, since the bottom portion guide plate 328 is further inclined and rotated in such a manner that the front end portion is bounded up, working with the further opening rotation of the bottom lid plate 20 by the weight of the mowed grass (refer to FIG. 46), the mowed grass piling up on the upper surface of the bottom portion guide plate 328 smoothly comes down in such a manner as to enter into the grass collection container A from the upper surface thereof. Accordingly, it is possible to smoothly and securely discharge the mowed grass in the grass collection box 18 including the mowed grass piled on the upper surface of the bottom portion guide plate 328 out by the grass collection box 18, by the lawn mower 1 in accordance with the fifth embodiment.

6. Sixth Embodiment

Next, a description will be given of a sixth embodiment employing a locking means holding an outrigger unchangeable in its attitude, and a lock means holding a grass collection box at a maximum up position so as to be immovable down, with reference to FIGS. 47 to 52. In this case, the same reference numerals as those of the first embodiment are attached to elements in the sixth embodiment in which constructions and operations are not different from the first embodiment, and a detailed description thereof will be omitted. A description will be given below of a different point from the first embodiment.

As shown in FIGS. 47, 48 and 52, an outrigger hook body 75 serving as a locking means constructed as an upward hook shape to which a cylinder pivoting pin 43 is fitted, is rotatably pivoted to an outer side surface of a lower end portion 29a in both mast members 29 by a pin 76. In the case that the outrigger hook body 75 is set to a solid line state in FIGS. 47 and 52, both the lever bodies 40 are not rotated rearward. In the case that the outrigger hook body 75 is rotated downward to a two-dot chain line state in FIG. 52, both the lever bodies 40 are rotated rearward, and the cylinder pivoting pin 43 is structured such as to come into contact with a stopper portion 44 in a rear end of the lower bracket member 35 in such a manner as to inhibit a further rearward rotation.

A detachable lock means 349 structured such as to lock the grass collection box 18 in a state of being lifted up high so that it can not be moved down is provided between the lower link 32 in a pair of upper and lower lifting links 31 and 32, and an upper end portion 29b of both the mast members 29 or a first bracket member 34.

The lock means 349 in accordance with the sixth embodiment is constructed, as shown in FIGS. 50 and 51, by a lever body 349a in which a base end is rotatably pivoted to an inner side surface of the upper end portion 29b of the mast member 29 by a pin 349b, a lock pin 349e which is fitted to a long groove hole 349c pierced in the lever body 349a and an inverted-L-shaped lock groove 349d pierced in the first bracket member 34, and a hook body 349f which is firmly attached to the lower link 32 of both the upper and lower lifting links 31 and 32.

The lock pin 349e is positioned in a lateral groove portion of the inverted-L-shaped lock groove 349d in a state of moving down the grass collection box 18, as shown by a solid line in FIG. 50. As shown by a two-dot chain line in FIG. 50, in a state in which the grass collection box 18 is lifted up highest, the structure is made such as to fit to and engage with the hook body 349f in the lower link 32 so as to lock the grass collection box 18 to the maximum up position so as to be immovable down, by controlling to change the lock pin 349e from the lateral groove portion to a vertical groove portion of the lock groove 349d along the long groove hole 349c of the lever body 349a, and cancel the downward immovable lock mentioned above by inversely controlling to change the lock pin 349e from the vertical groove portion to the lateral groove portion of the lock groove 349d along the long groove hole 349c of the lever body 349a.

In this case, the lock pin 349e is formed as one construction which is in common with both the right and left mast members 29, and both the right and left lever bodies 349a are coupled to each other via a lateral member 349g in such a manner as to work with each other.

In the structure mentioned above, at a time of carrying out the mowed grass discharging work, the grass collection box 18 is lifted up first of all by actuating both the elevating hydraulic cylinders 30 by the control of the elevating control lever 54 to the up position in such a manner that the piston protrudes.

Accordingly, if the outrigger hook body 75 is set to a downward rotating state as shown by a two-dot chain line in FIG. 52, the lever body 40 at the base end of both the elevating hydraulic cylinder 30 is rotated rearward, and the cylinder pivoting pin 43 becomes a state in which it comes into contact with the stopper portion 44. Accordingly, as shown in FIG. 49, the outrigger 45 provided in the lever body 40 protrudes in such a manner as to come close to the ground surface 4, and comes to a state which can inhibit the lawn mower 1 from inclined in the rearward direction in such a manner as to float up its front portion.

At the same time, the bumper body 46 provided in the lever body 40 comes to a state in which it protrudes rearward to a position which is substantially the same as the stopper portion 44, or a state in which it protrudes further rearward than the stopper portion 44. In other words, before the lifting actuation of the grass collection box 18, the outrigger 45 protrudes in such a manner as to come close to the ground surface 4, and the bumper body 46 protrudes rearward.

As long as the outrigger hook body 75 is rotated upward as shown by a solid line in FIG. 52 and is held at that position, prior to the lifting up of the grass collection box 18, it is possible to inhibit the lever body 40 from rotating backward by the outrigger hook body 75. In this case, the outrigger 45 is not actuated to protrude toward the ground surface 4.

In other words, in accordance with the lawn mower 1 of the sixth embodiment, it is possible to optionally select the state in which the outrigger 45 is moved to protrude working with the upward movement of the grass collection box 18, and the state in which the outrigger 45 is not moved to protrude, by the outrigger hook body 75.

Next, since a pair of upper and lower lifting links 31 and 32 are rotated upward by the further piston protruding motion in both the elevating hydraulic cylinders 30, the grass collection box 18 is lifted up while keeping the bottom lid body 20 and the rear lid plate 21 in the closed state, as shown in FIG. 49, and if it is lifted up to the highest maximum up position, the further piston protruding motion of both the elevating hydraulic cylinders 30, that is, the lift-up of the grass collection box 18 is stopped by controlling the elevating control lever 54 to the neutral position, and the grass collection box 18 is locked by the lock means 349 in such a manner as to be prevented from coming down from the maximum up position mentioned above.

In the sixth embodiment, since the outrigger hook body 75 coupled to the grass collection box 18 via the rod 77 is rotated downward as shown by the two-dot chain line in FIG. 52, in the process of locking the grass collection box 18 to the highest lifted up position by the lock means 349, the lever body 40 at the base end of the elevating hydraulic cylinder 30 is rotated rearward, and the outrigger 45 is actuated to protrude toward the ground surface 4. At a time point when the protruding actuation is finished, the lock means 349 comes to a completely lock state (a state in which the lock pin 349d is completely fitted to and engaged with the hook portion 349f in the lower link 32). In other words, it is possible to simultaneously execute the engagement canceling control of the outrigger hook body 75, and the locking control of the lock means 349, and it is possible to reduce the control burden of the operator.

7. Others

Each of the constructions of the embodiments mentioned above is not limited to the illustrated one, but can be variously changed within the range of the scope of the present invention.

BRIEF DESCRIPTION OF THE DRAWINGS

FIG. 13 is a view showing a fourth state of the mowed grass discharging work.

DESCRIPTION OF REFERENCE NUMERALS

Figure 1:
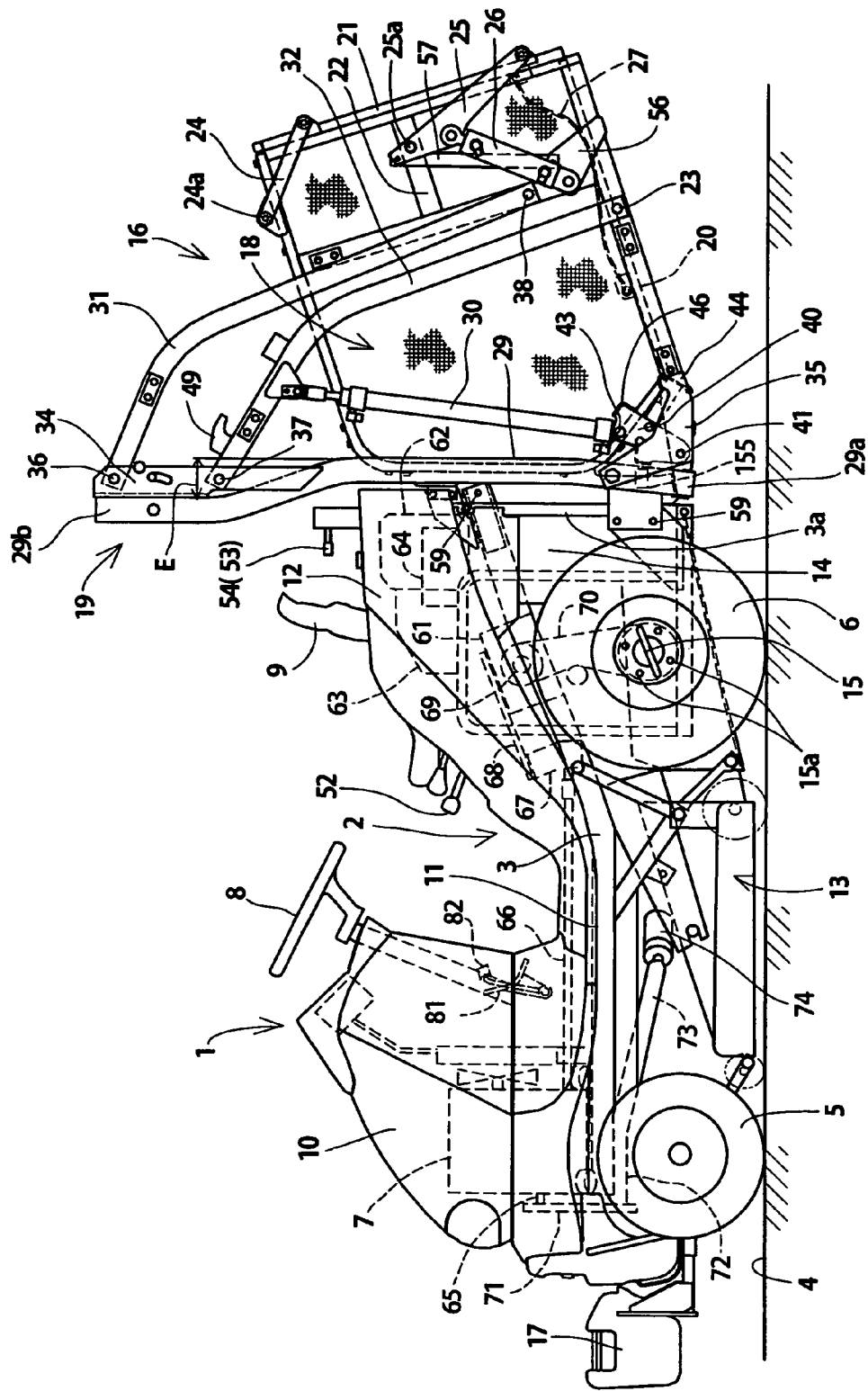
FIG. 1 is a side elevational view of a lawn mower in a first embodiment.
Figure 2:
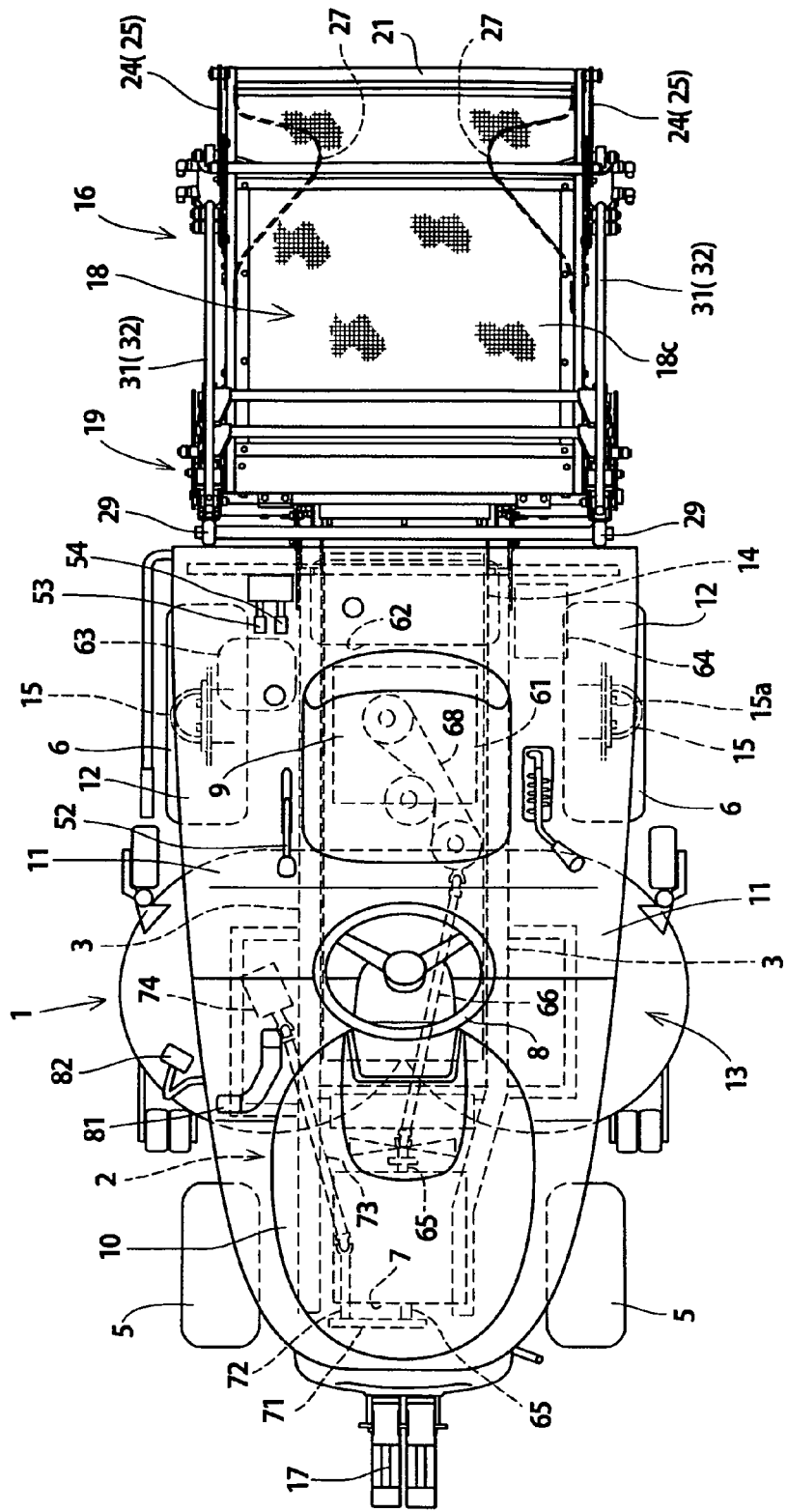
FIG. 2 is a plan view of FIG. 1.
Figure 3:
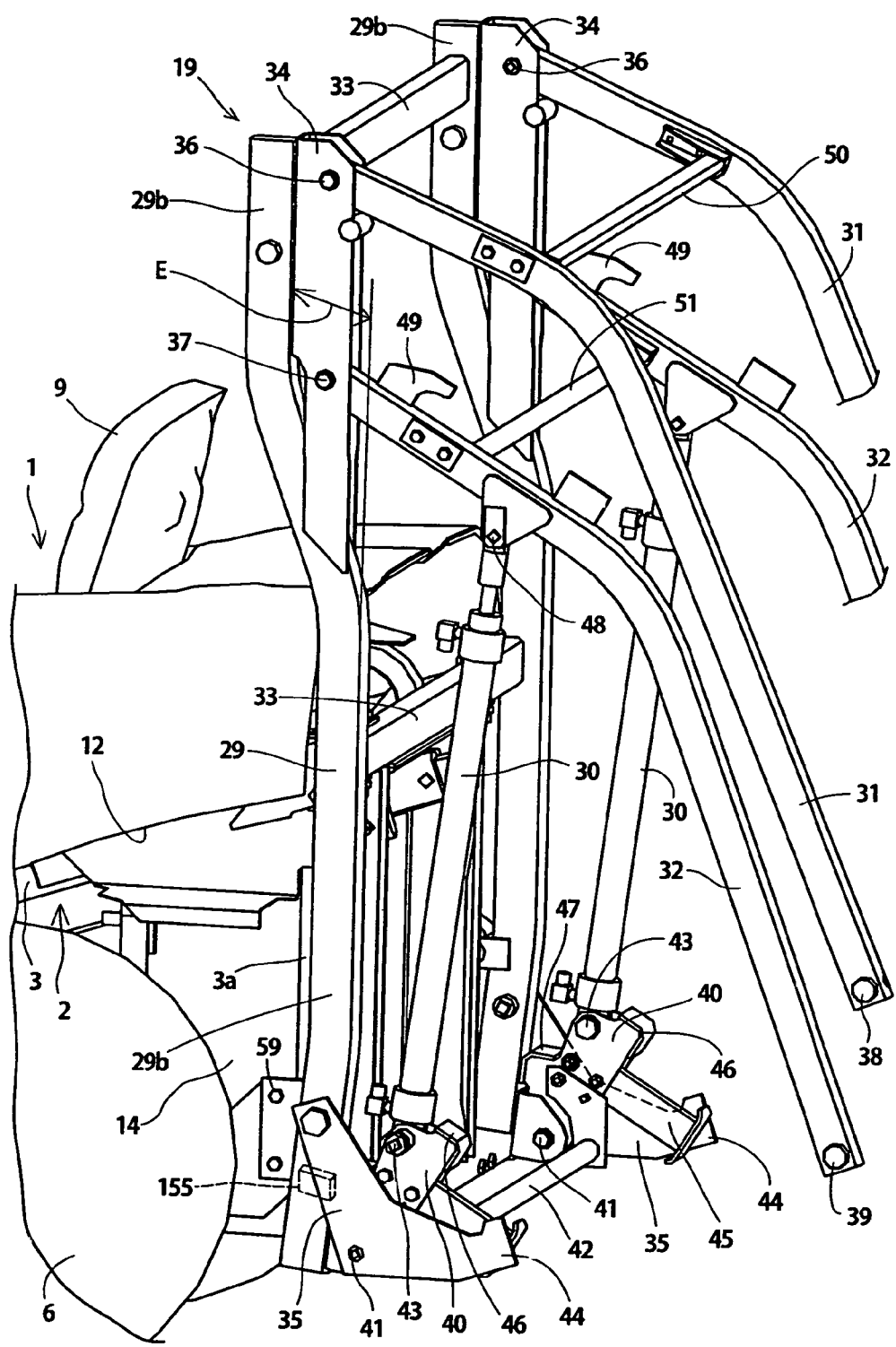
FIG. 3 is a perspective view of FIG. 1 as seen diagonally from the rear side in a state in which a grass collection box is detached.
Figure 4:
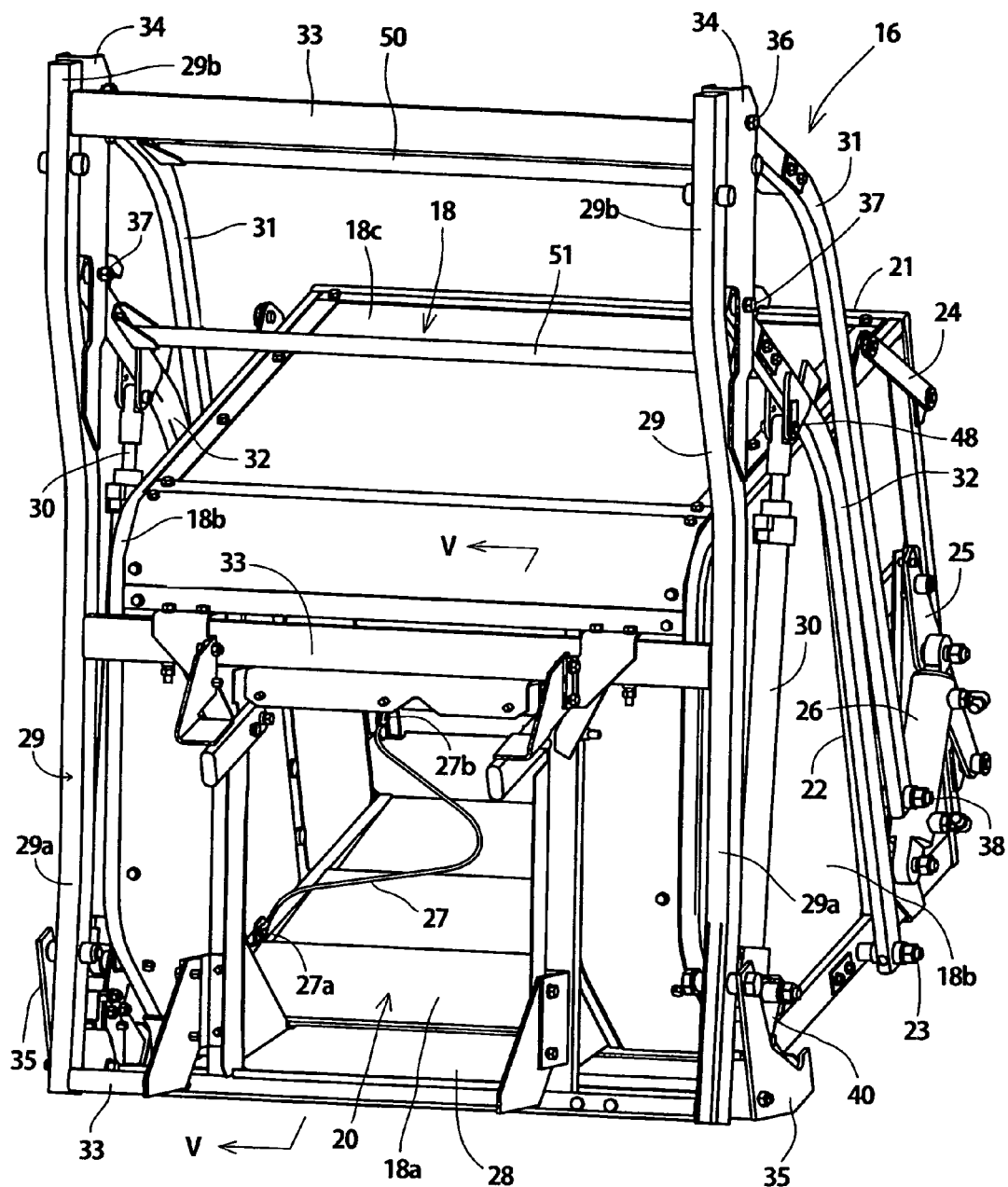
FIG. 4 is a perspective view of a grass collection discharge mechanism in FIG. 1 as seen diagonally from the front side.
Figure 5:
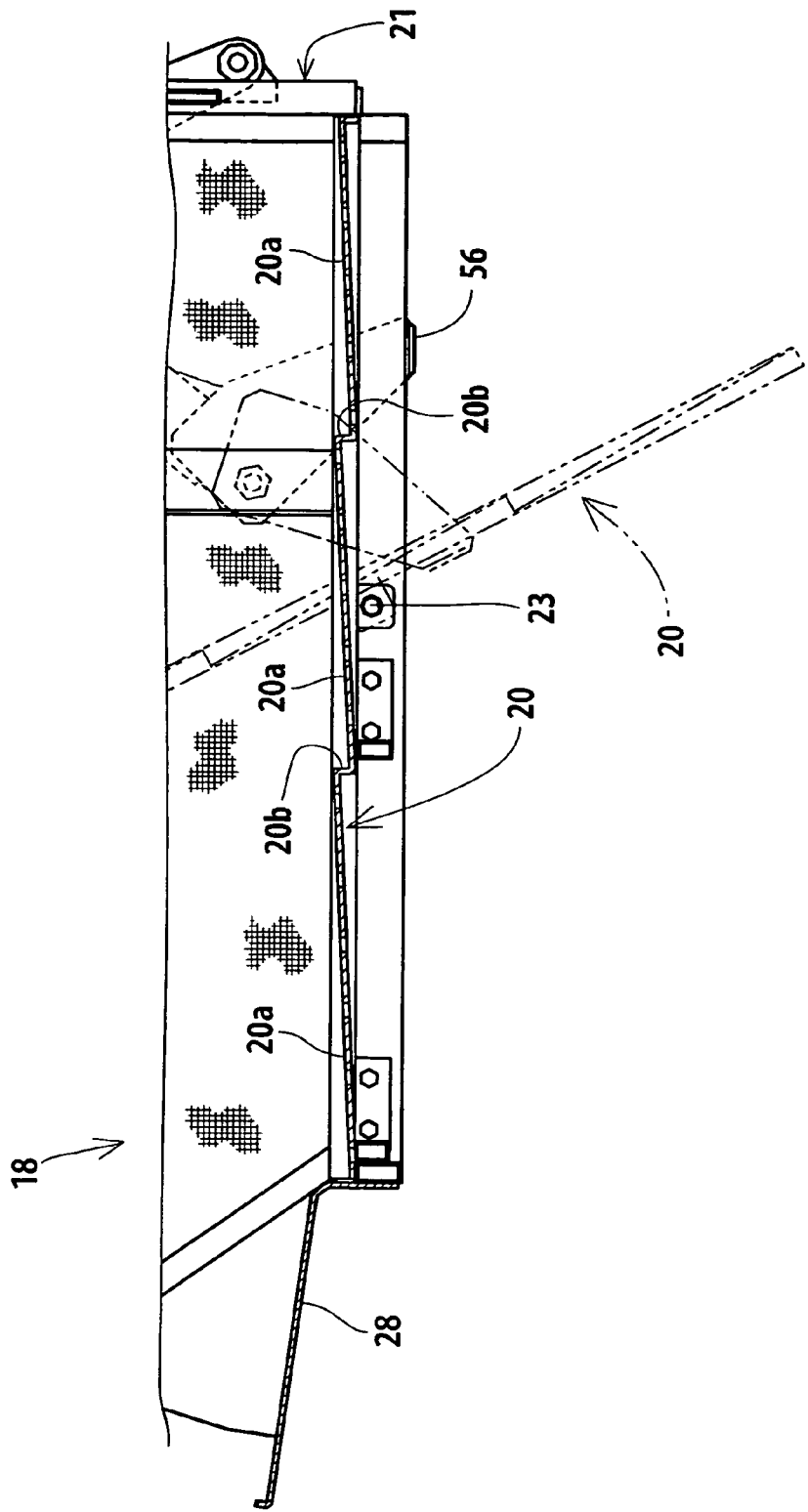
FIG. 5 is a cross sectional view as seen along V-V line in FIG. 4.
Figure 6:
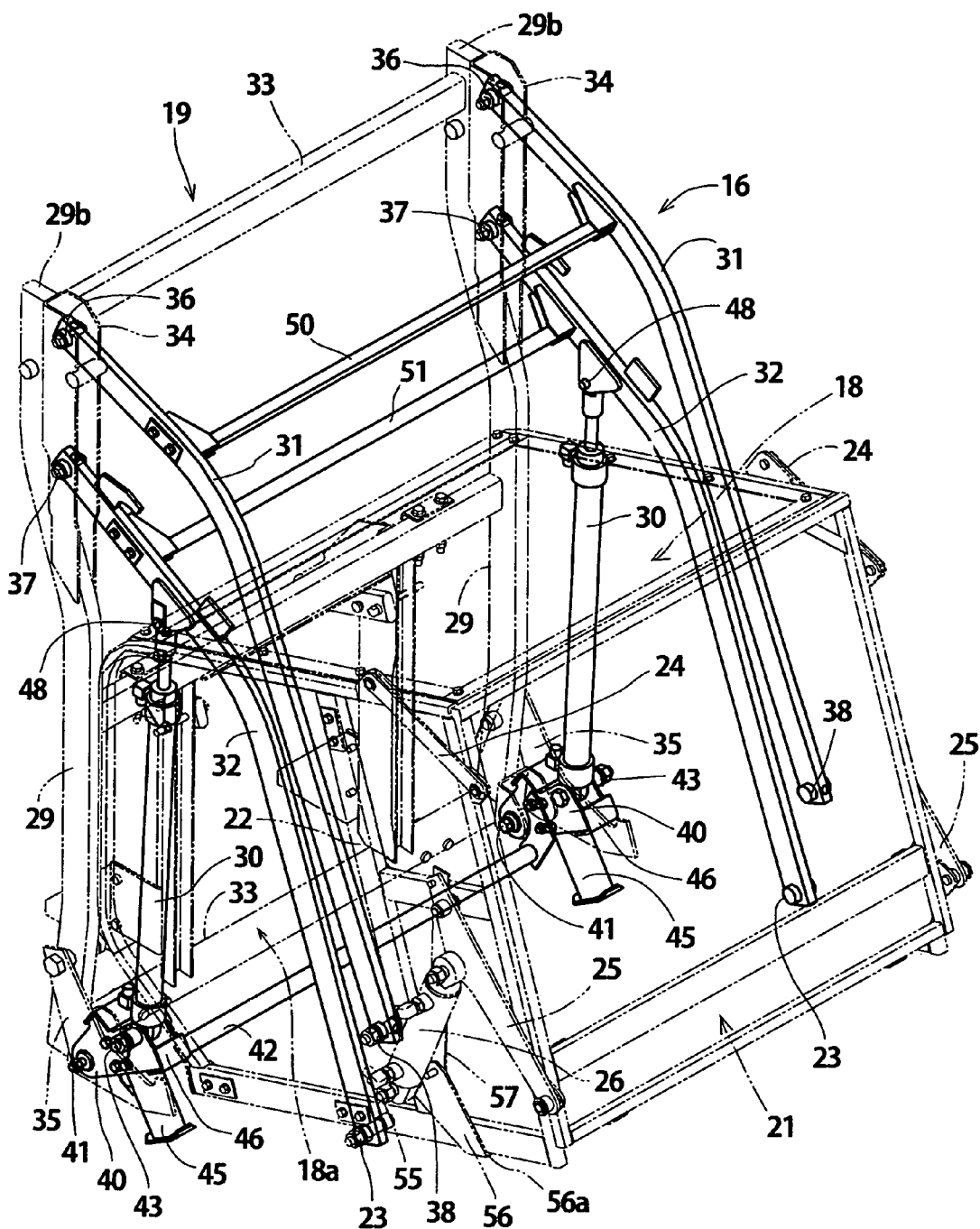
FIG. 6 is a perspective view showing a lift mechanism constructing the grass collection discharge mechanism.
Figure 7:
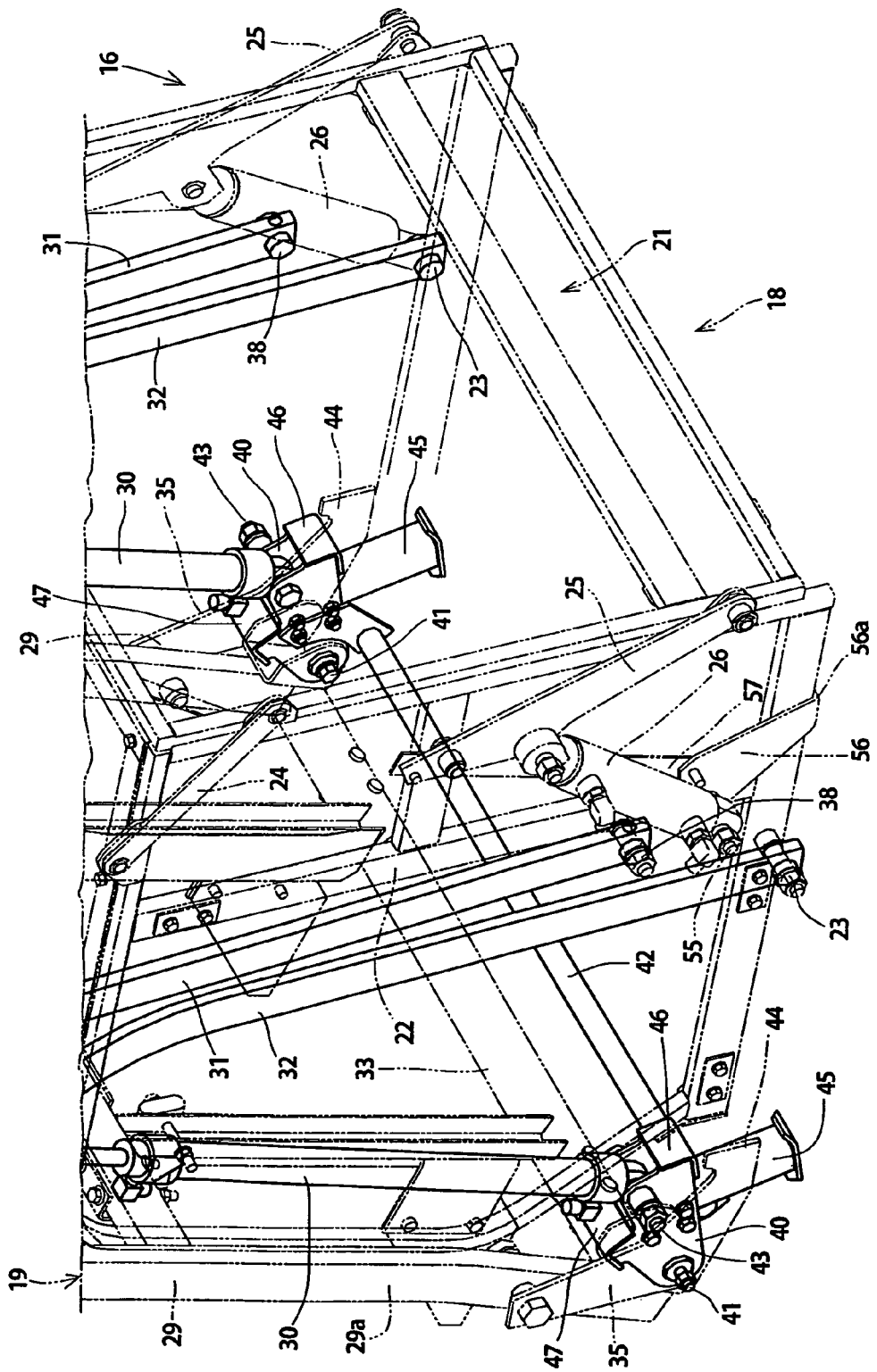
FIG. 7 is an enlarged view of a substantial part in FIG. 6.
Figure 8:
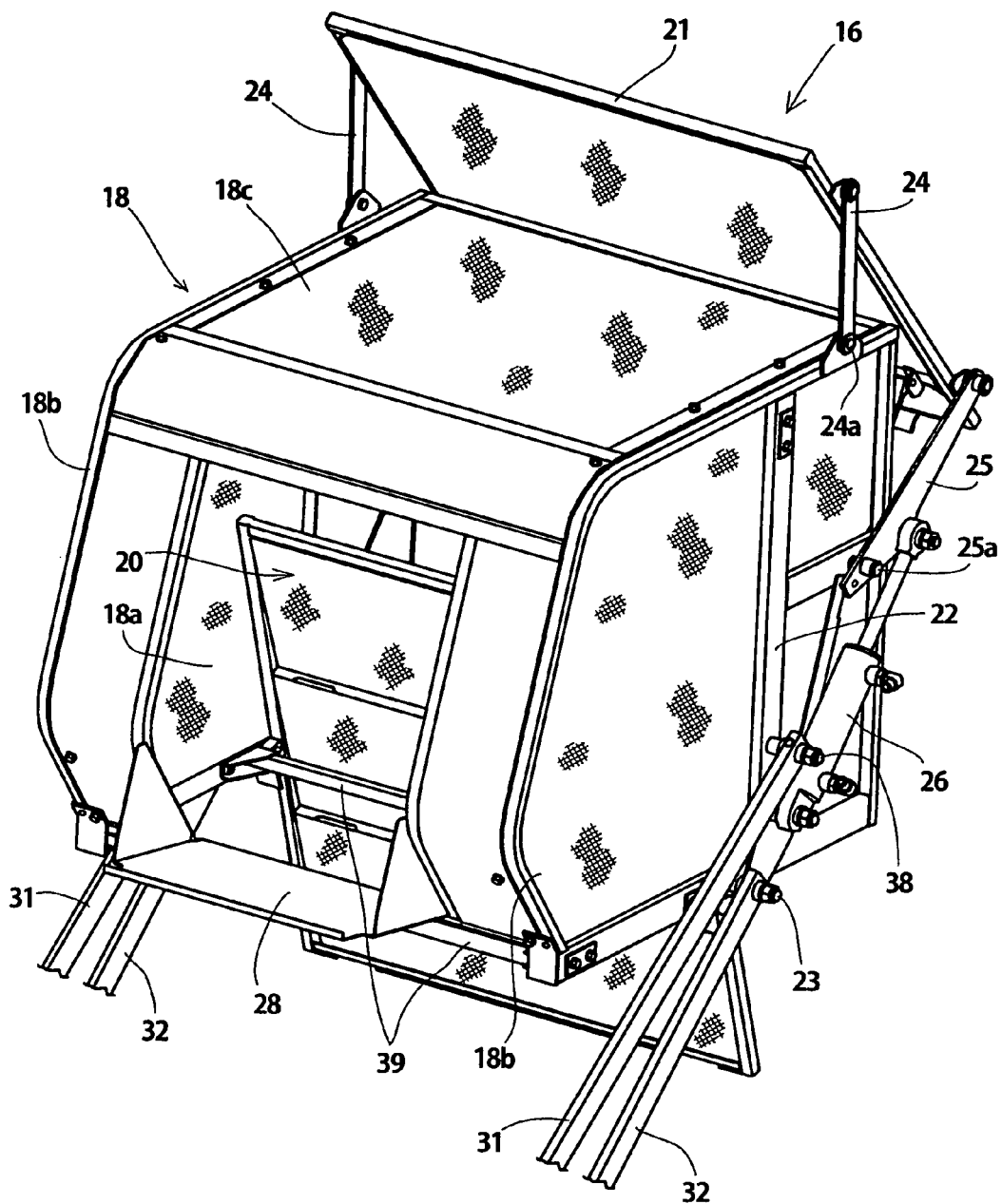
FIG. 8 is a perspective view of a grass collection box at a maximum up position as seen diagonally from the front side.
Figure 9:
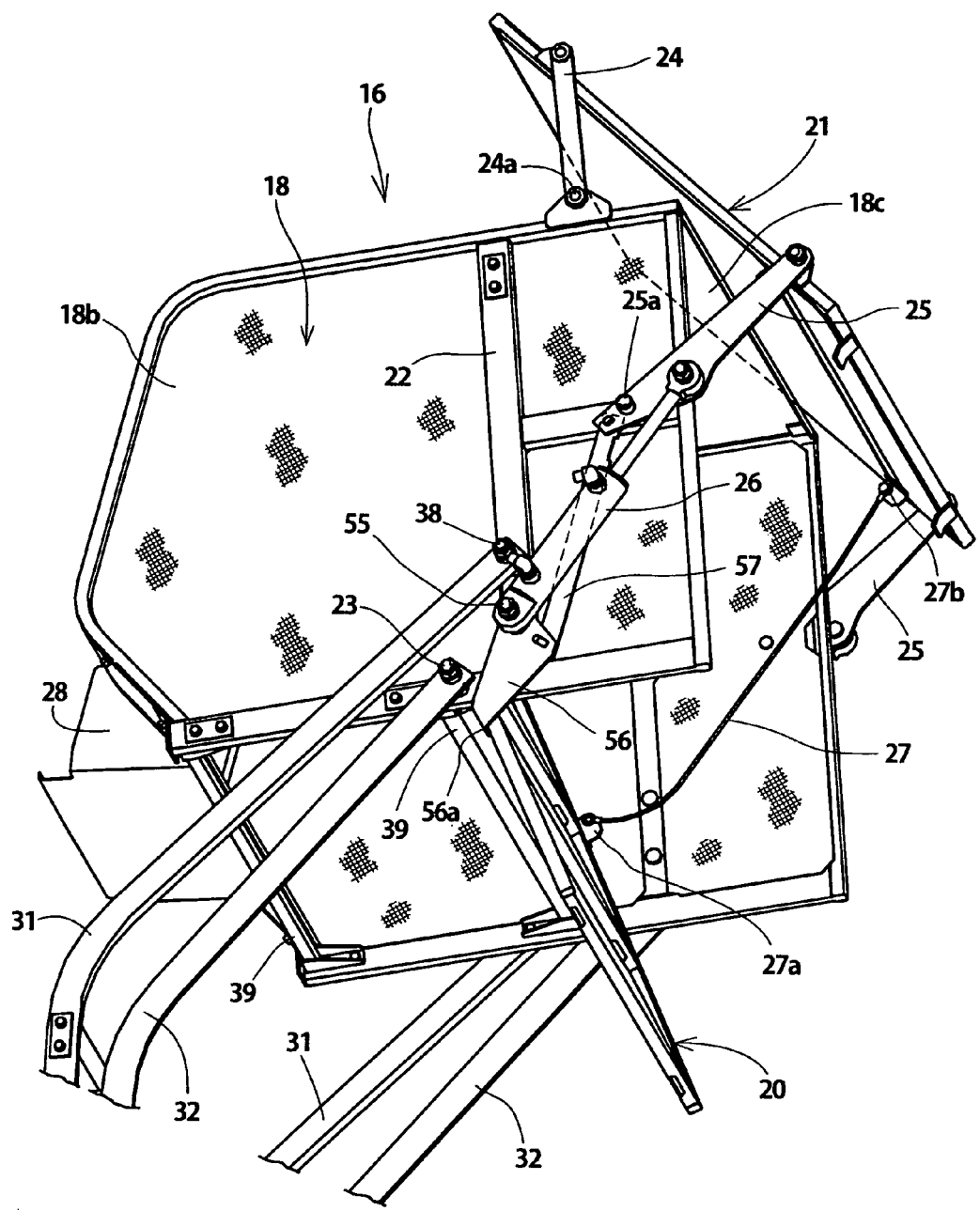
FIG. 9 is a perspective view of the grass collection box at the maximum up position as seen diagonally from the rear side.
Figure 10:
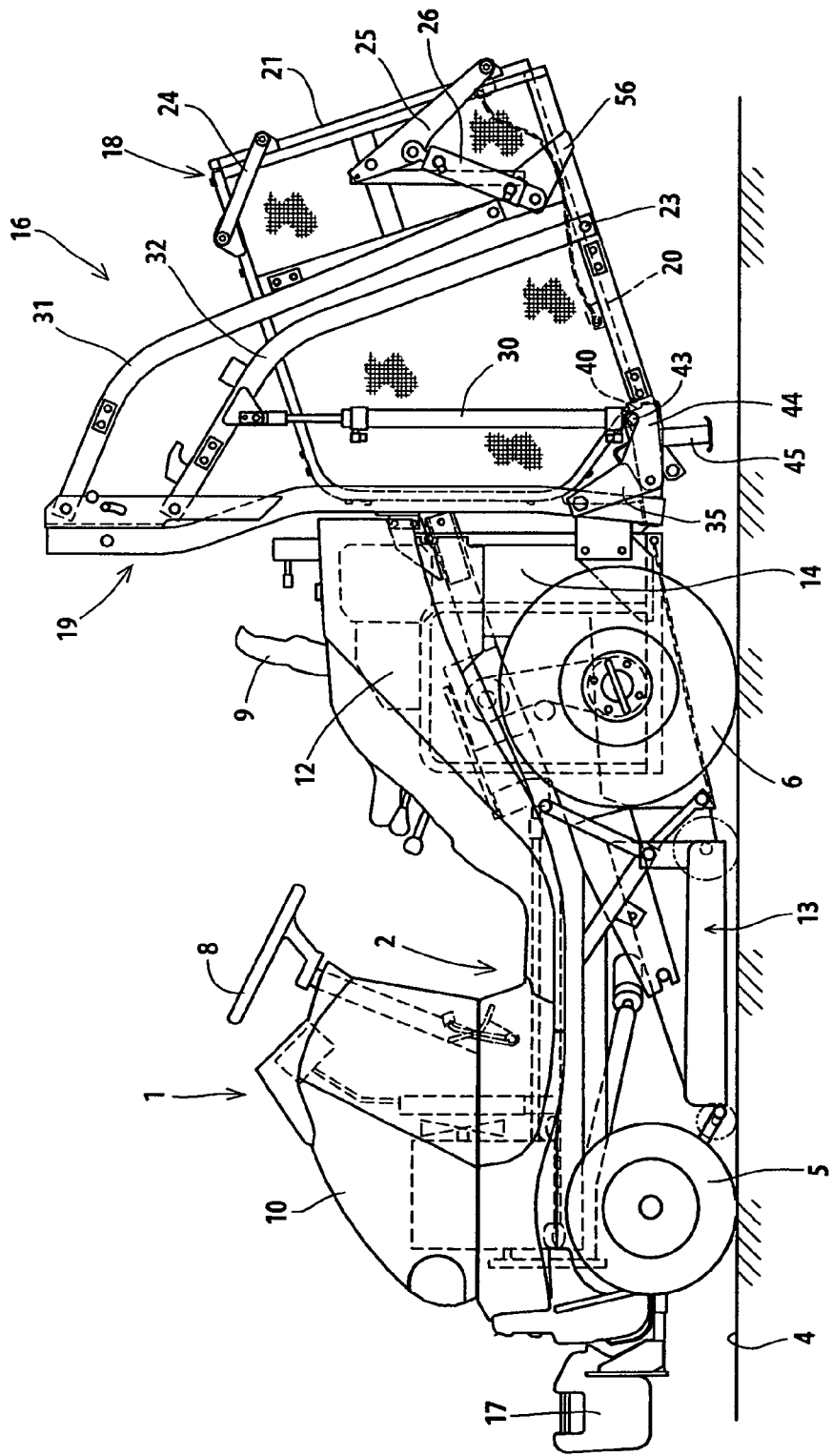
FIG. 10 is a view showing a first state of a mowed grass discharging work.
Figure 11:
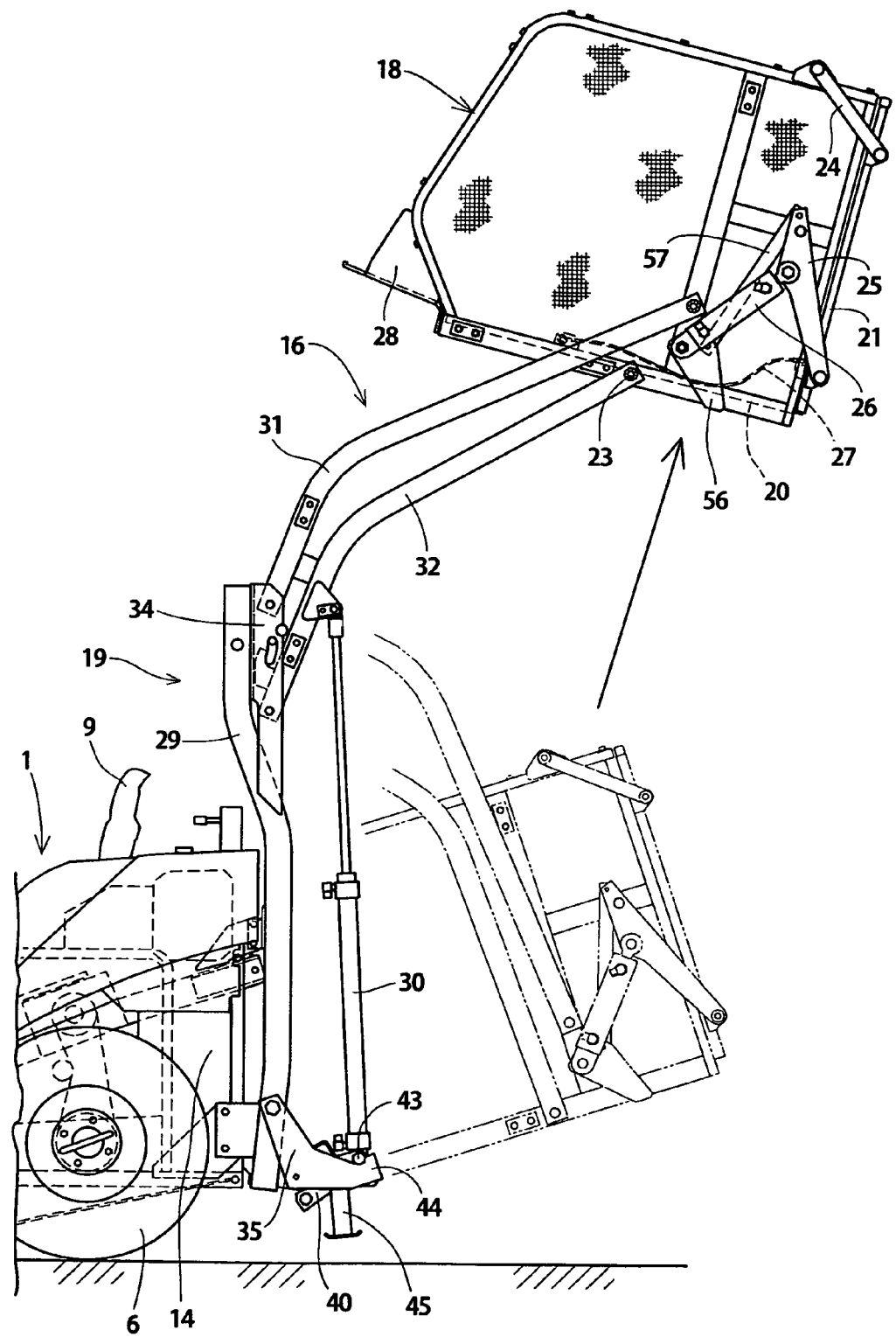
FIG. 11 is a view showing a second state of the mowed grass discharging work.
Figure 12:
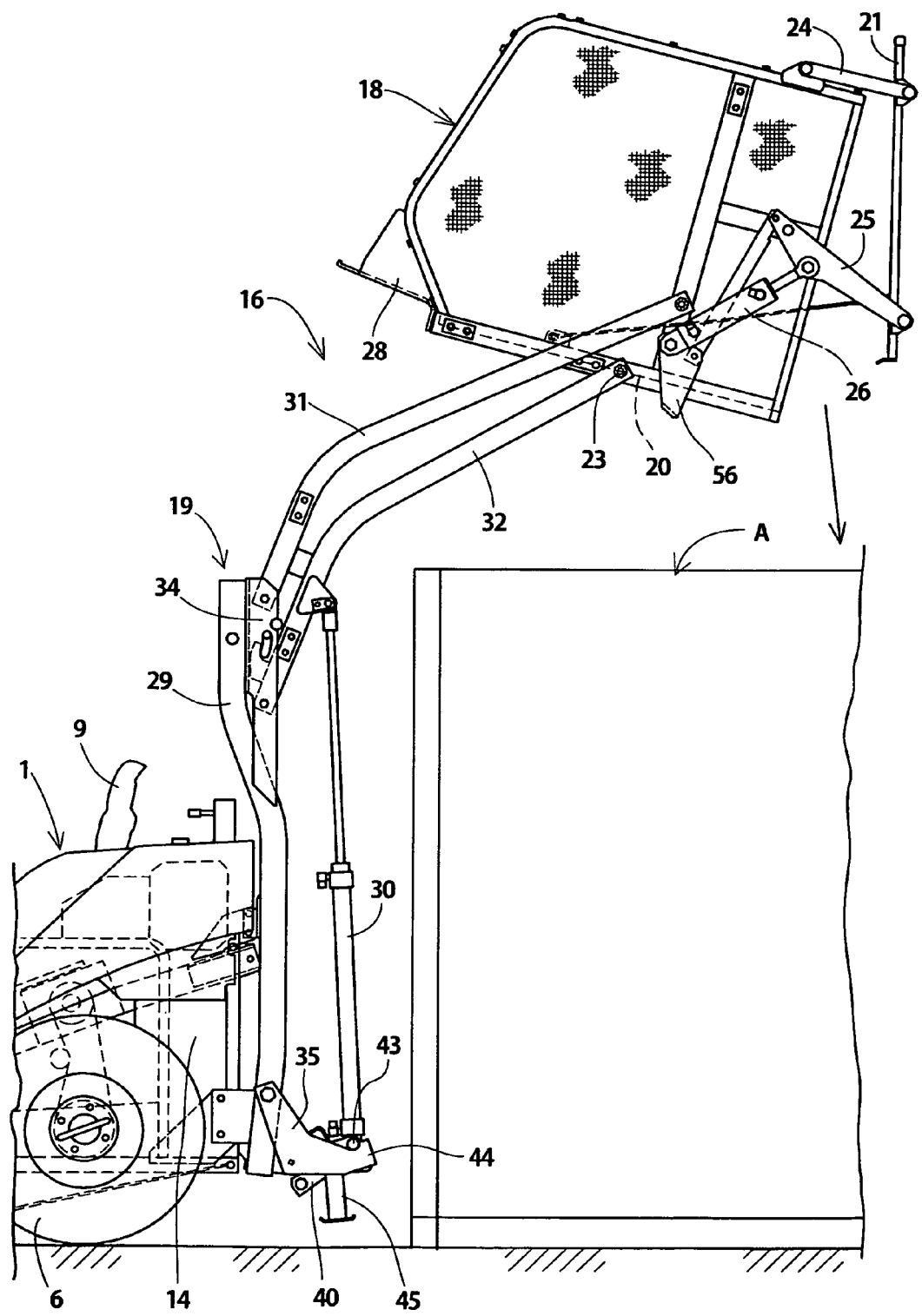
FIG. 12 is a view showing a third state of the mowed grass discharging work.
Figure 1:
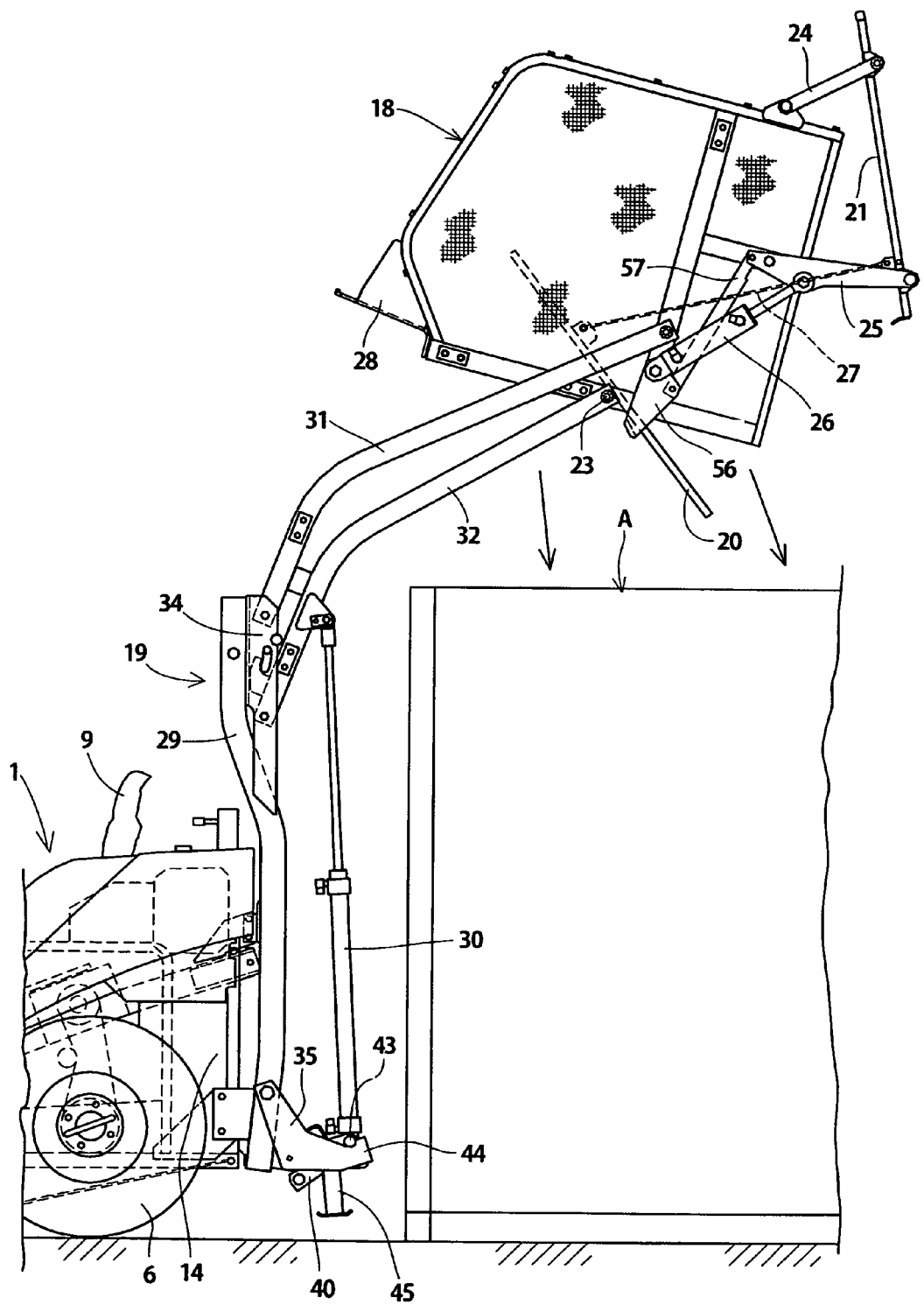
Figure 14:
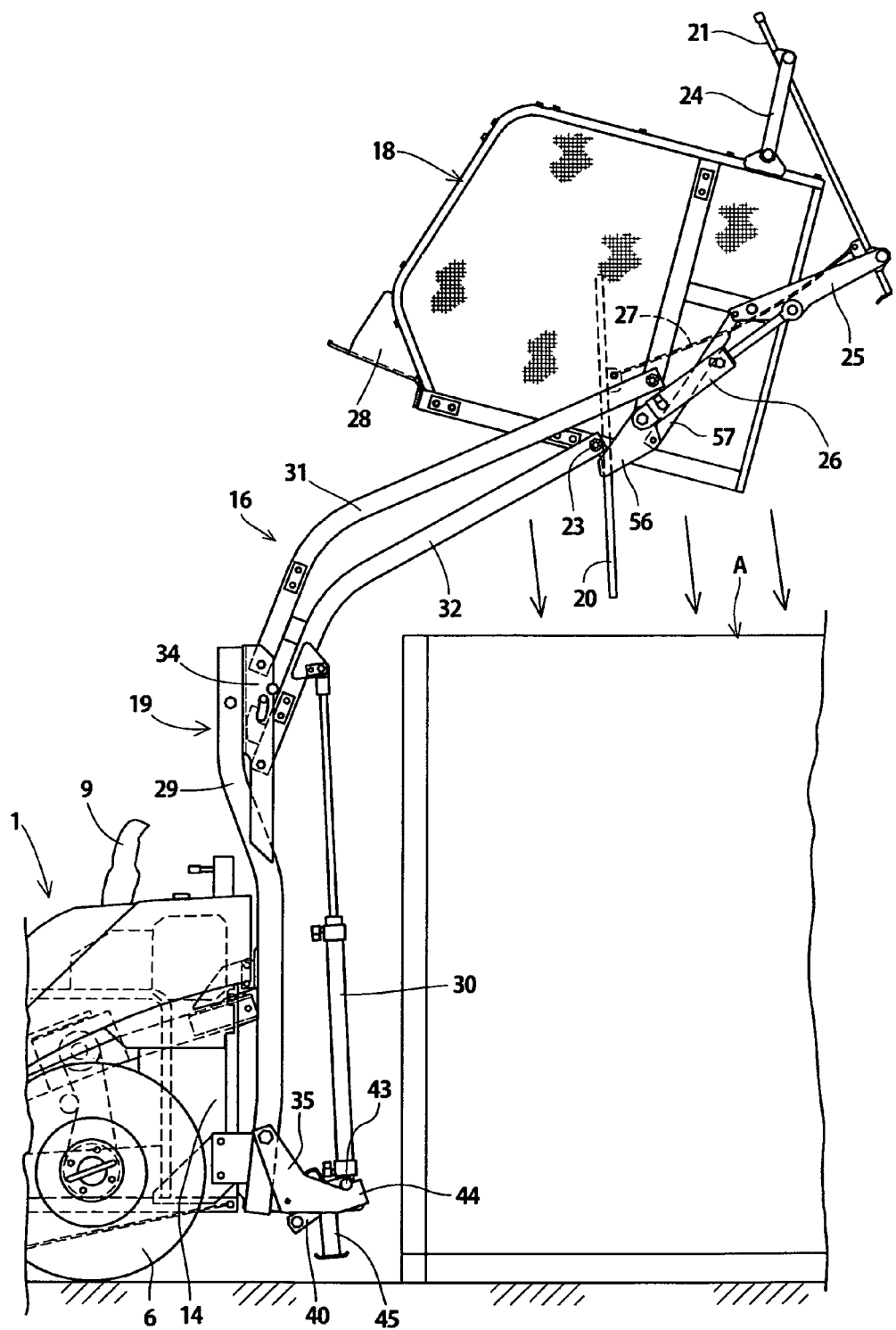
FIG. 14 is a view showing a fifth state of the mowed grass discharging work.
Figure 15:
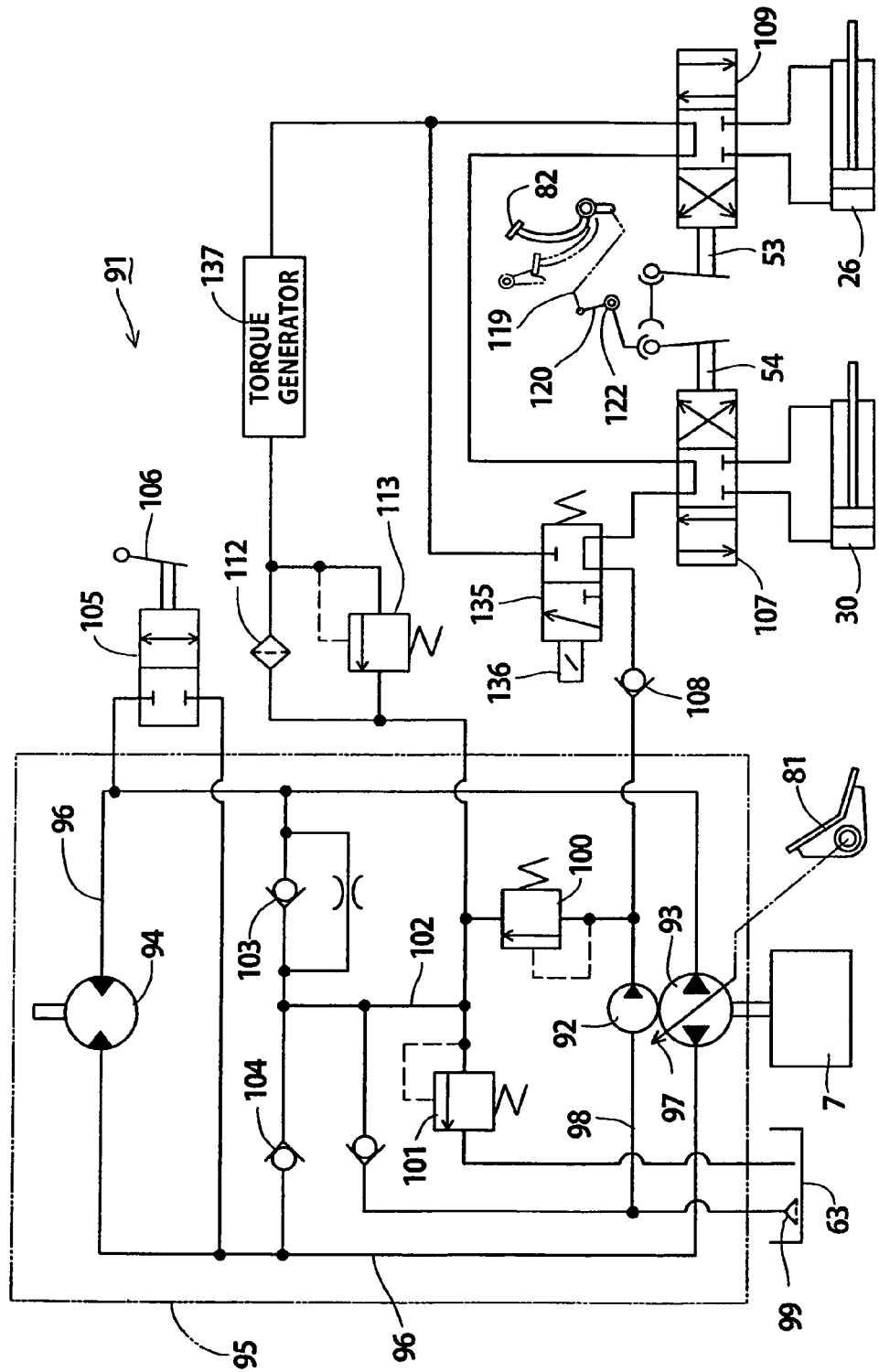
FIG. 15 is a hydraulic circuit view of the lawn mower.
Figure 16:
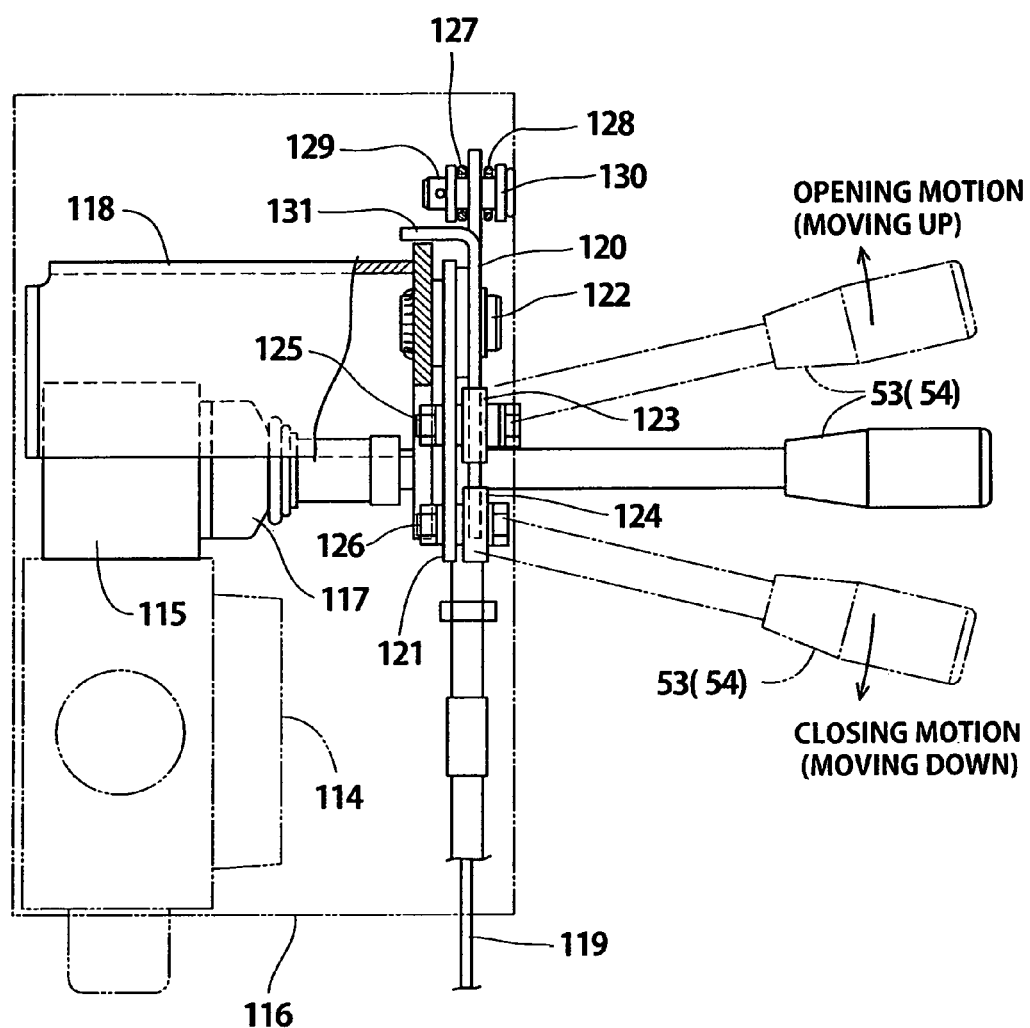
FIG. 16 is a partly cut side elevational view showing an attaching structure of an elevation control lever and an opening and closing control lever.
Figure 17:
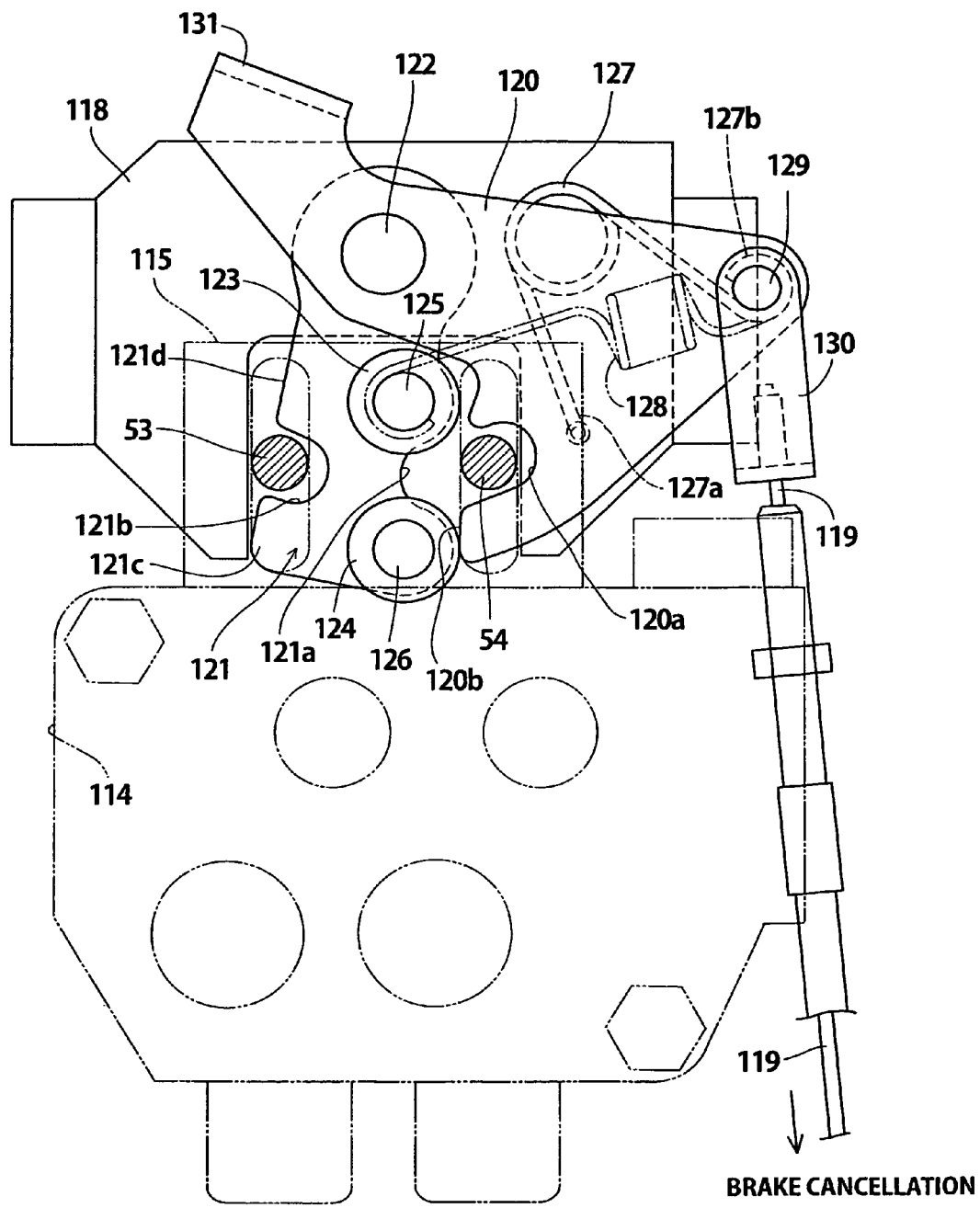
FIG. 17 is a front elevational view showing the attaching structure of the elevation control lever and the opening and closing control lever.
Figure 18:
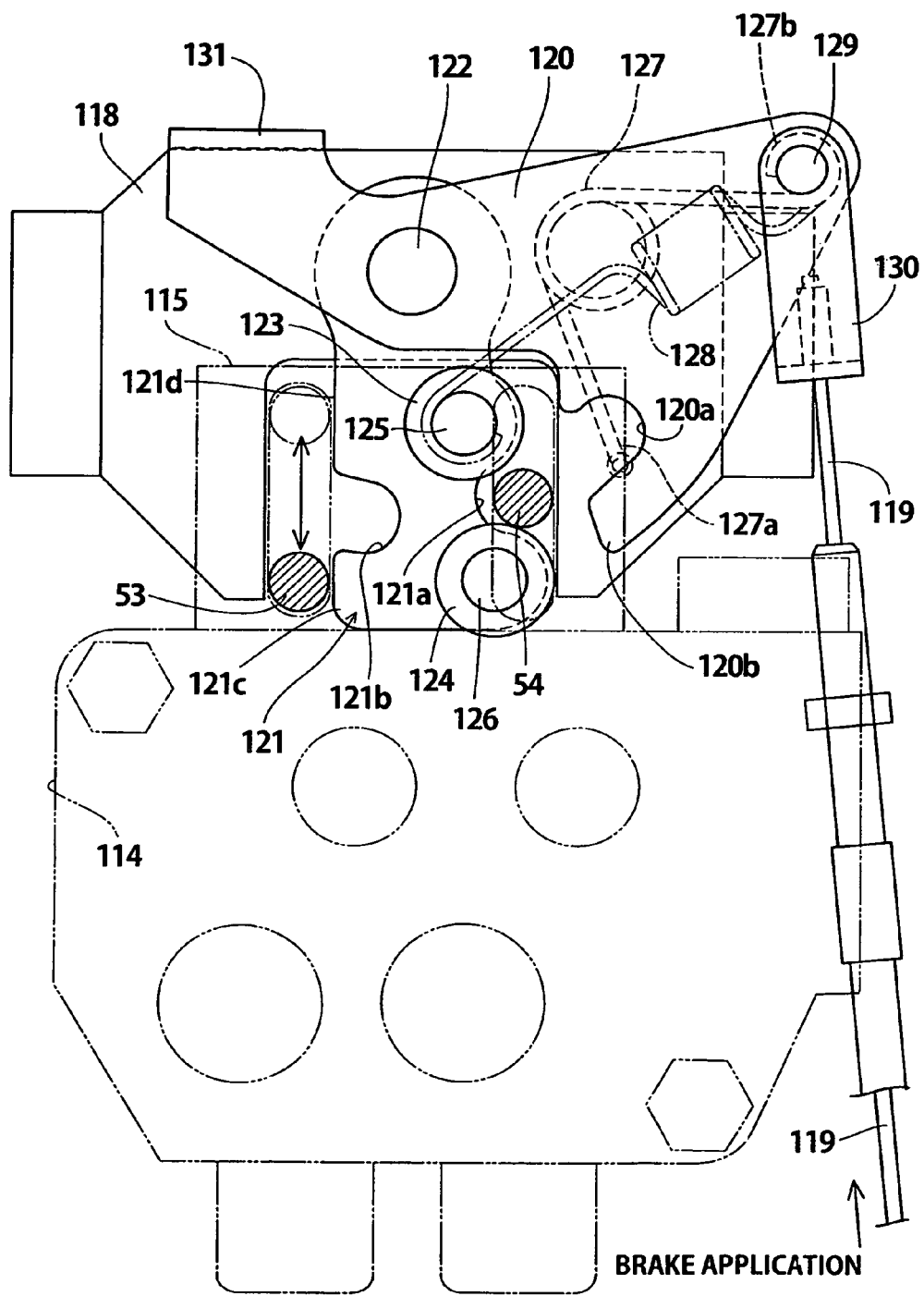
FIG. 18 is an explanatory view of an actuation of the opening and closing control lever.
Figure 19:
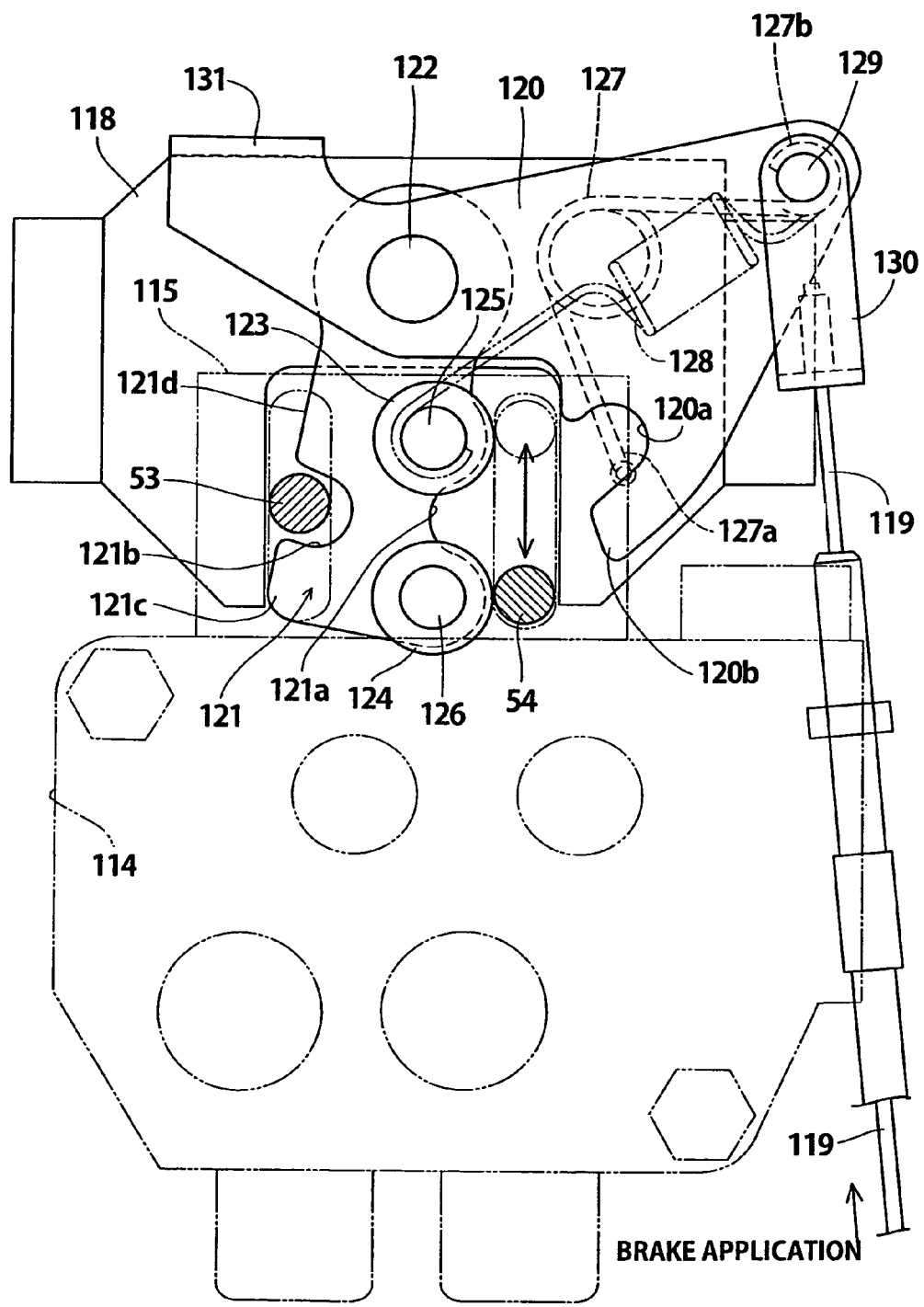
FIG. 19 is an explanatory view of an actuation of the elevation control lever.
Figure 20:
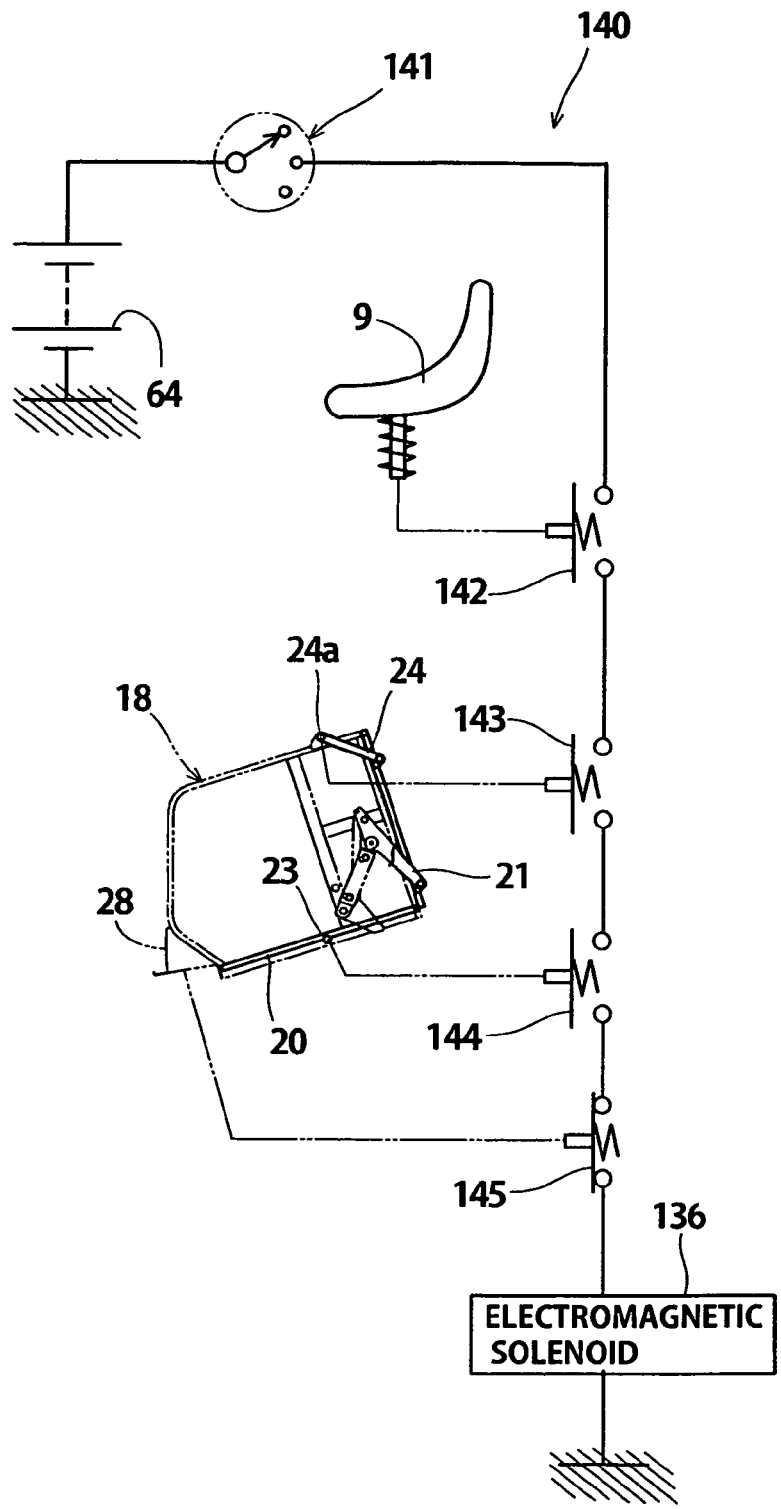
FIG. 20 is an electric circuit view of a limiting mechanism.
Figure 21:
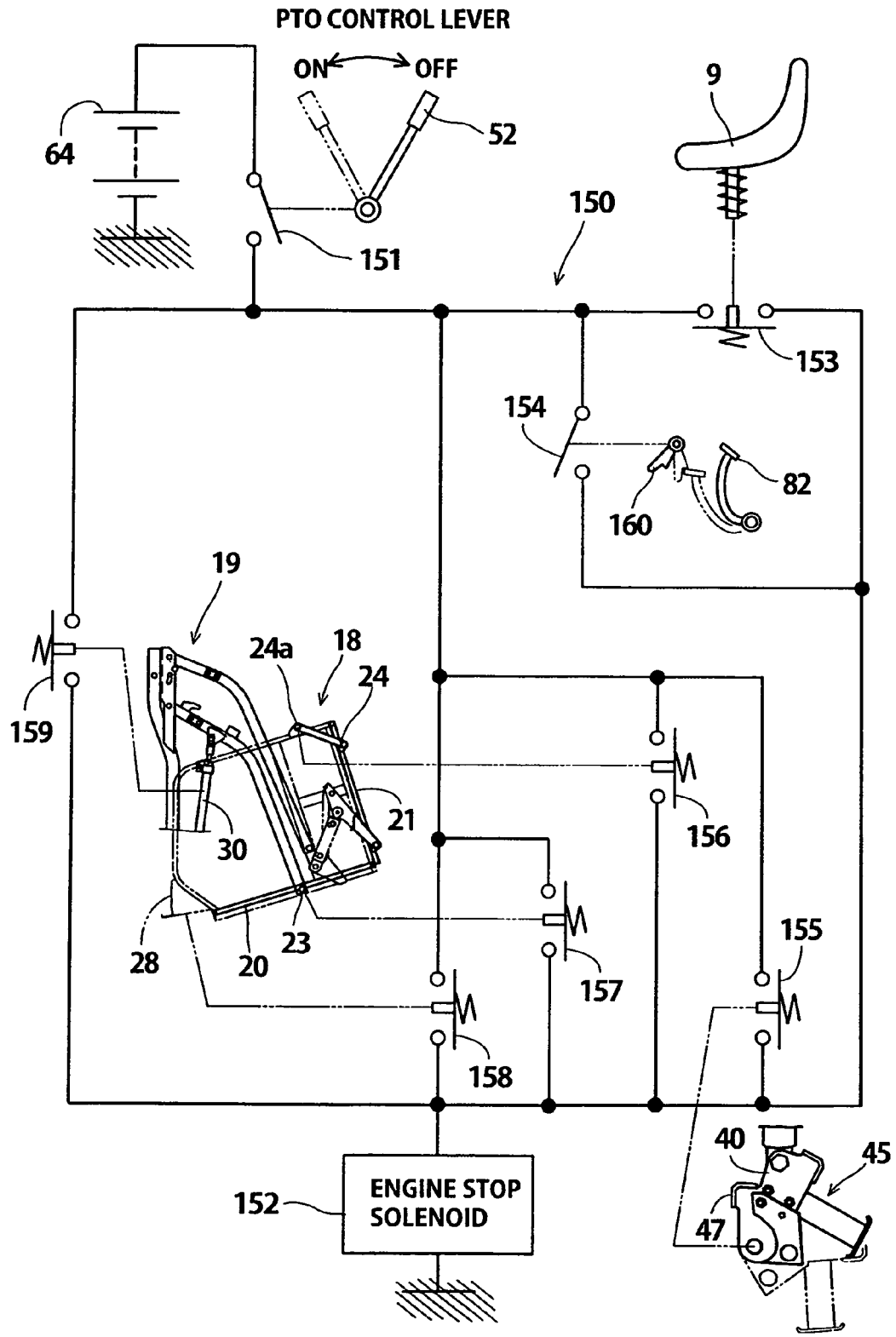
FIG. 21 is an electric circuit view of a PTO regulating mechanism.
Figure 22:
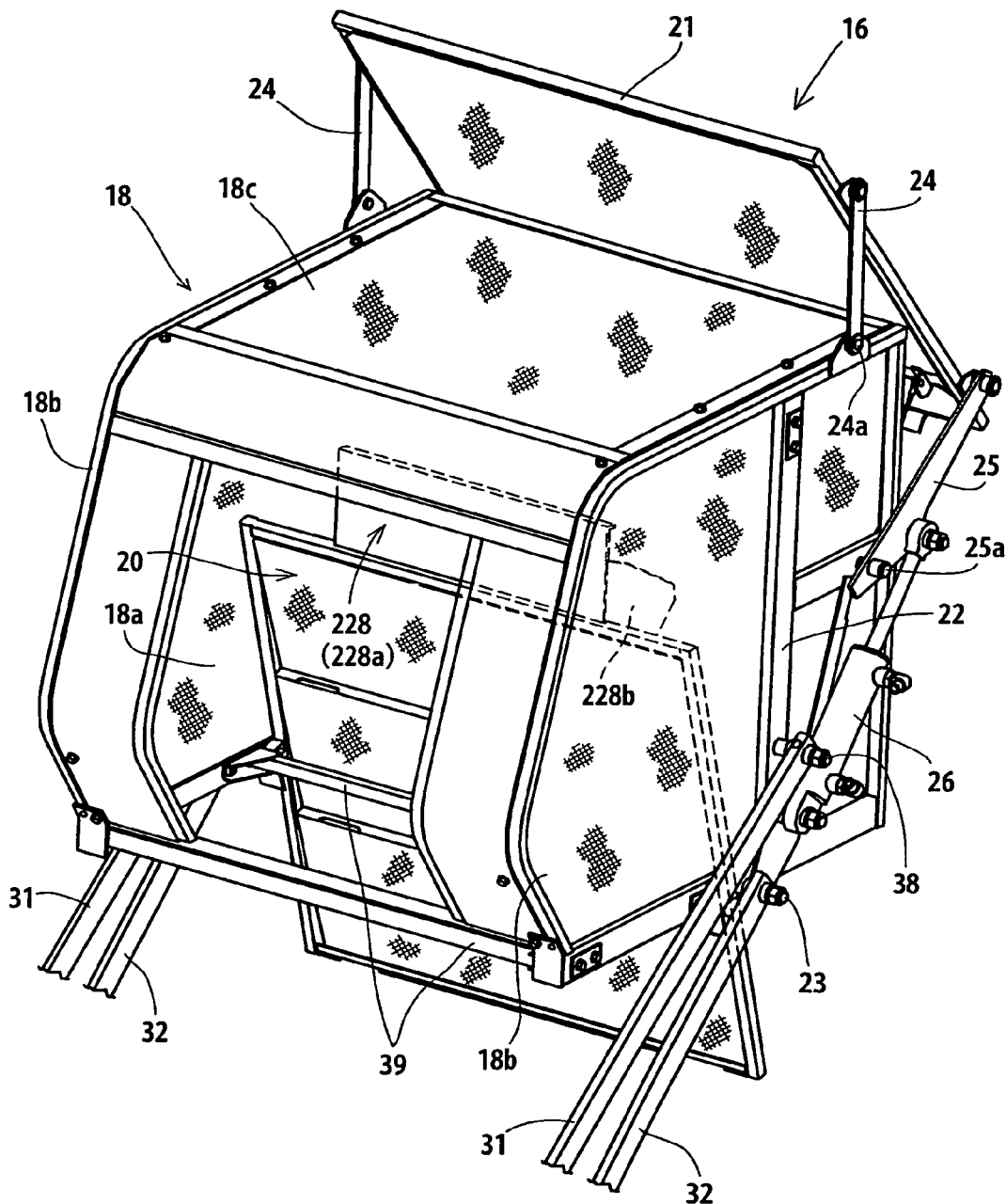
FIG. 22 is a perspective view of a grass collection box at a maximum up position in accordance with a second embodiment as seen diagonally from the front side.
Figure 23:
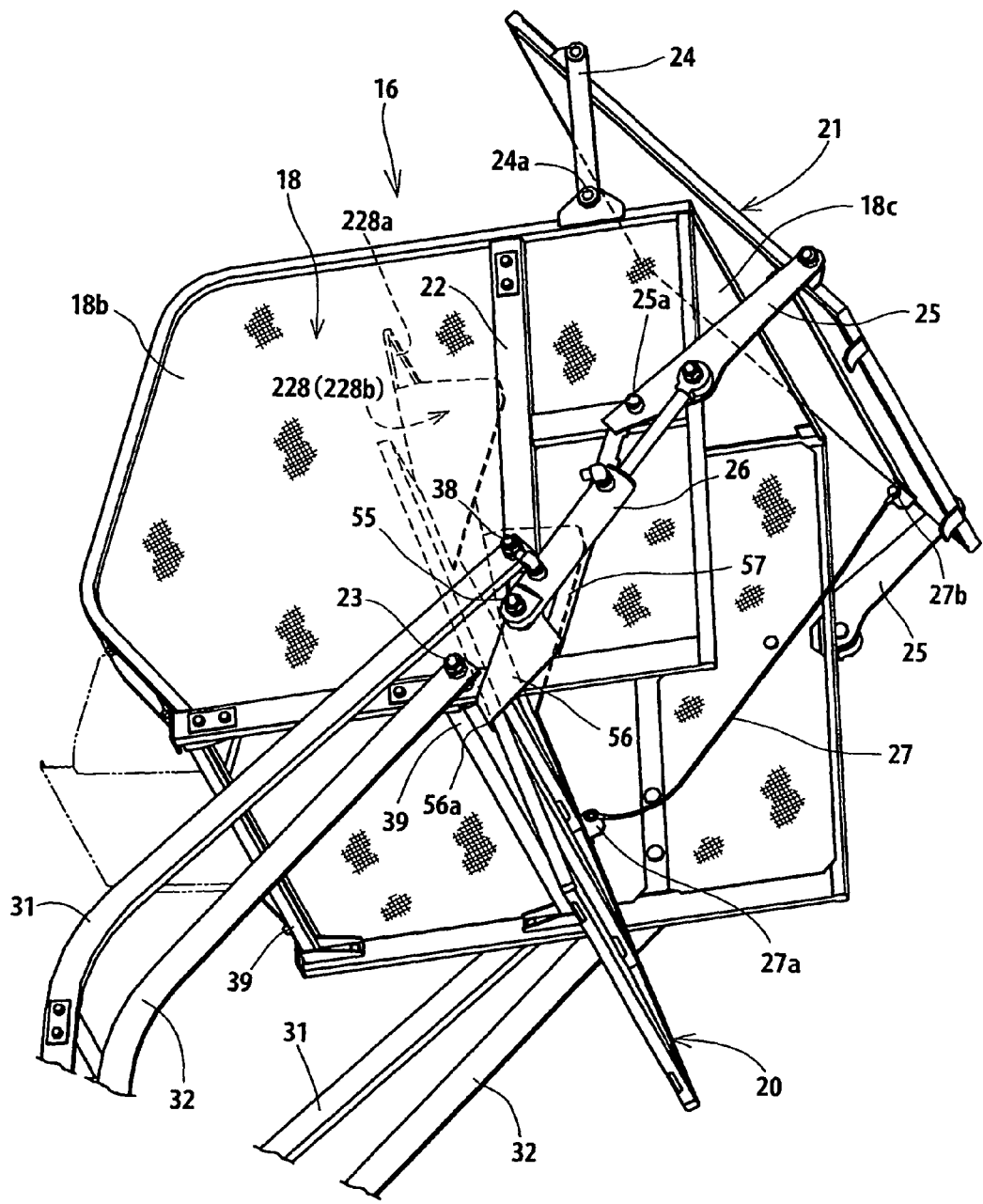
FIG. 23 is a perspective view of the grass collection box at the maximum up position as seen diagonally from the rear side.
Figure 24:
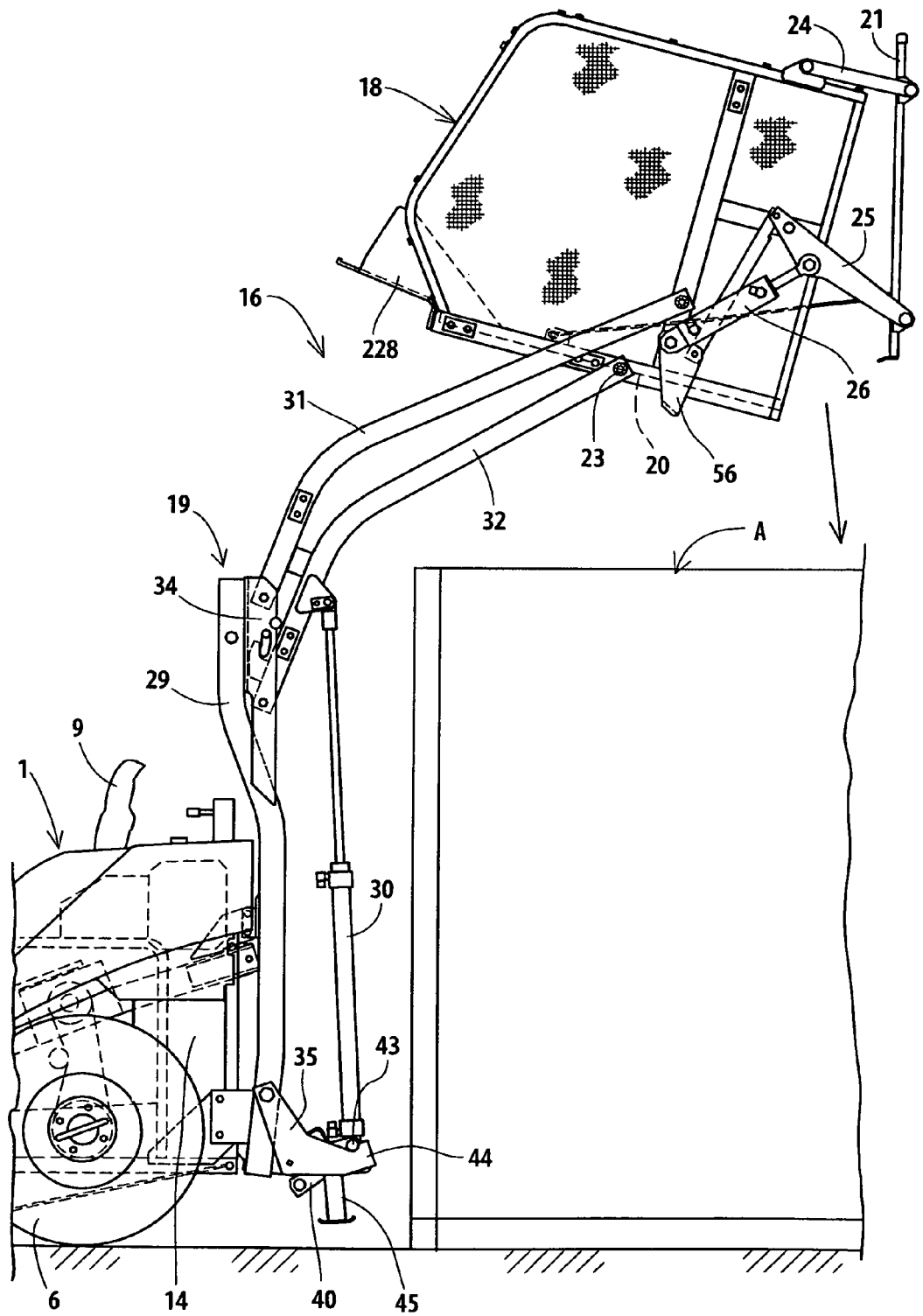
FIG. 24 is a view showing a third state of a mowed grass discharging work.
Figure 25:
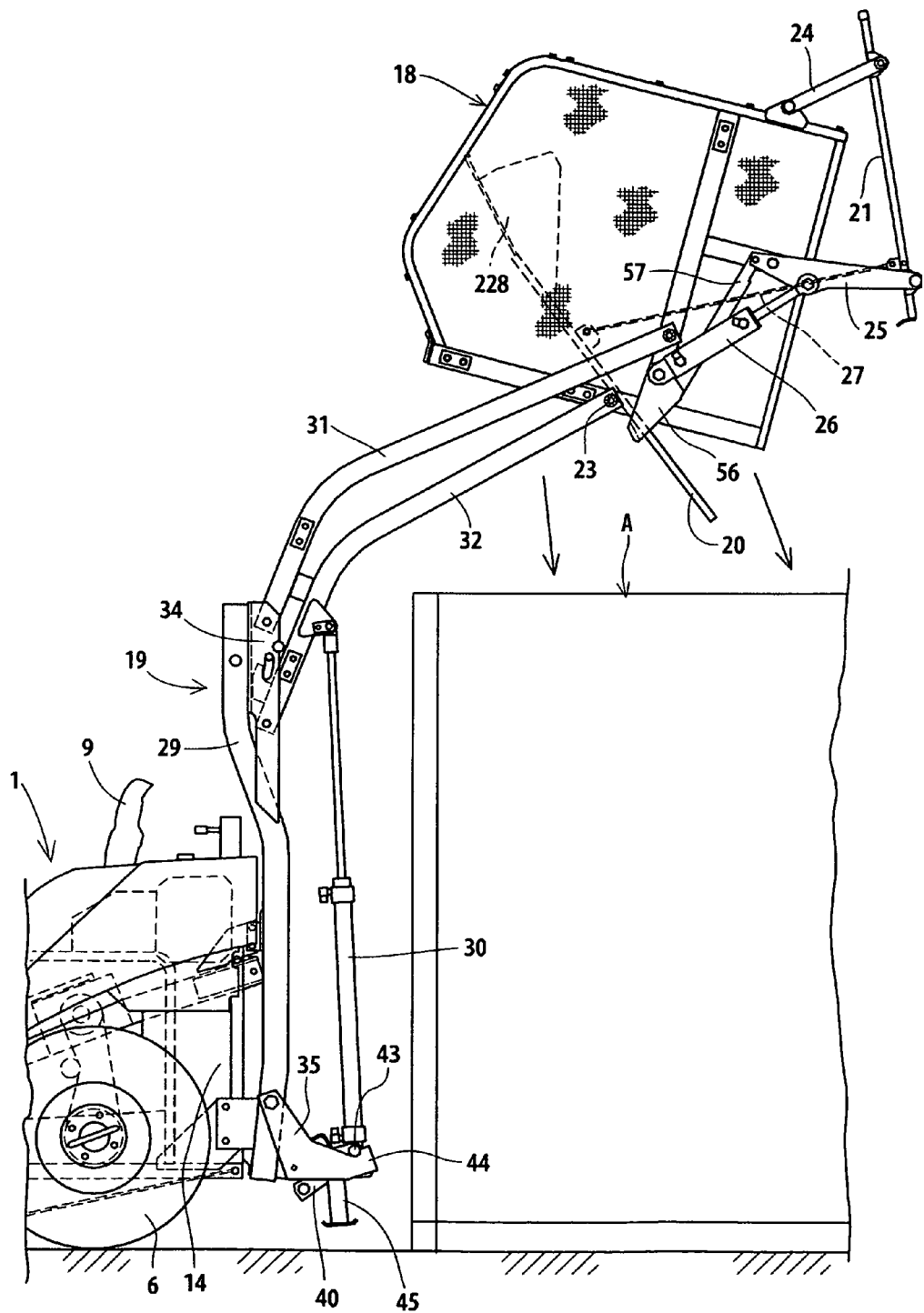
FIG. 25 is a view showing a fourth state of the mowed grass discharging work.
Figure 26:
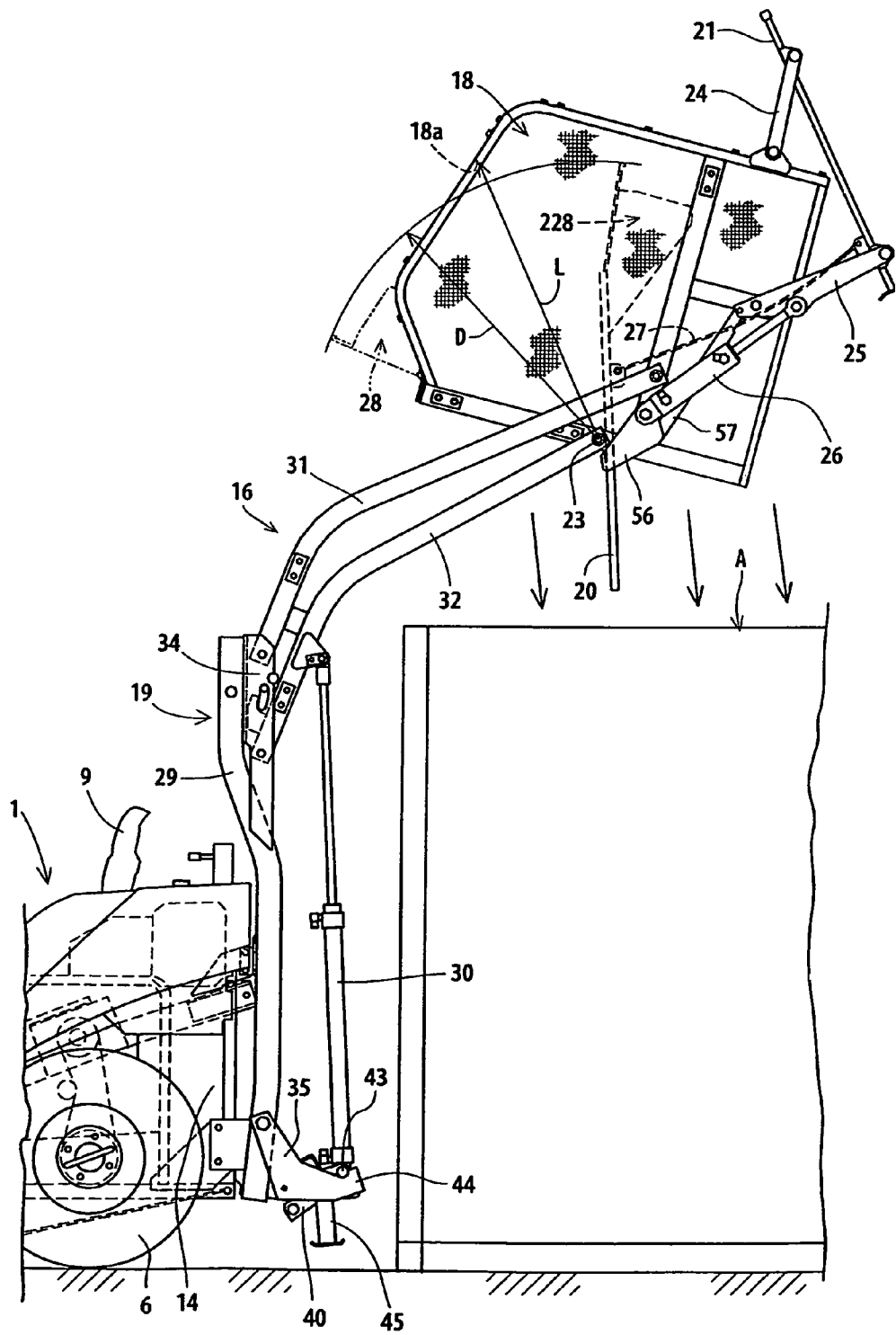
FIG. 26 is a view showing a fifth state of the mowed grass discharging work.
Figure 27:
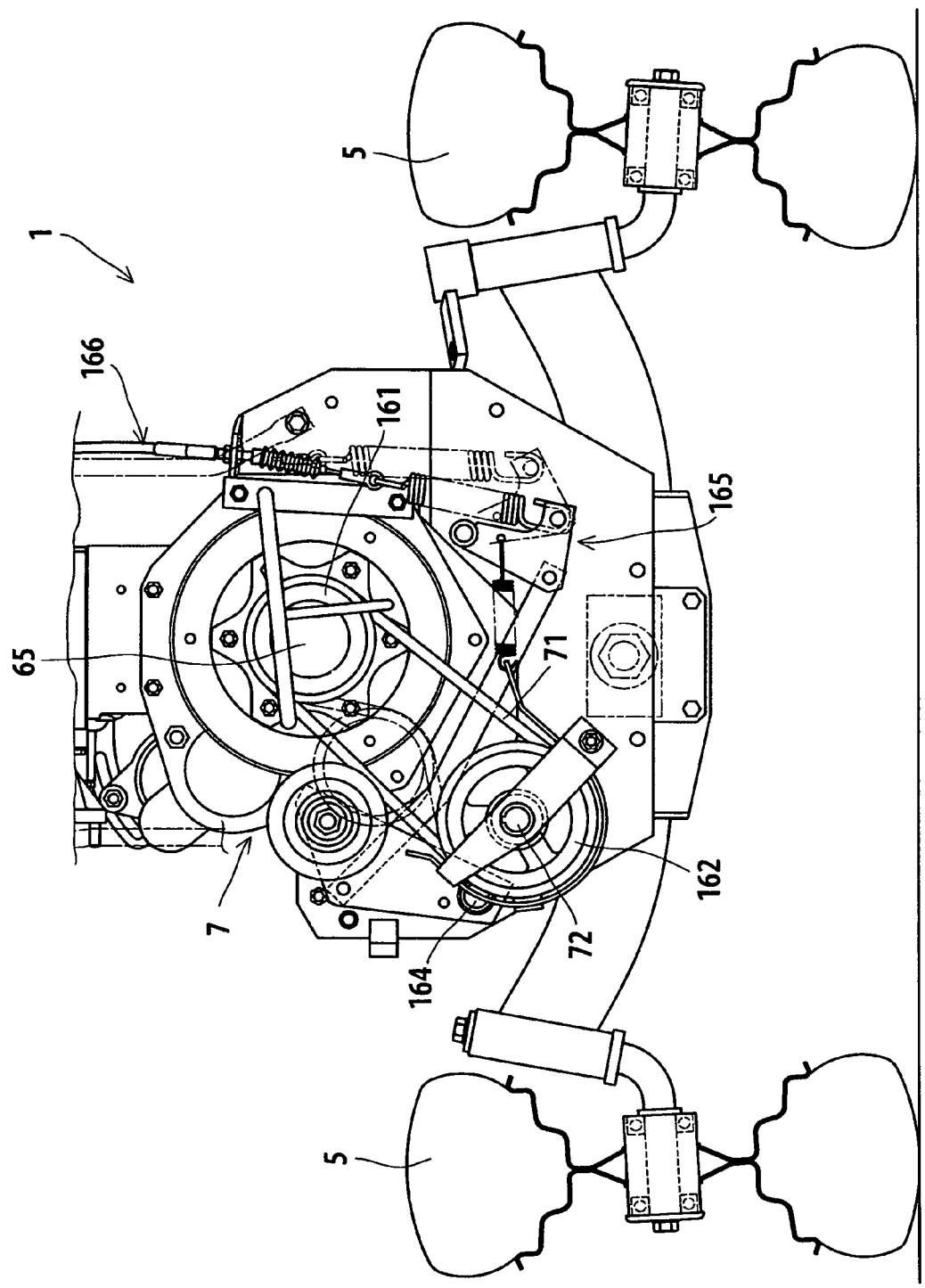
FIG. 27 is a partly omitted front elevational view of a traveling machine body.
Figure 28:
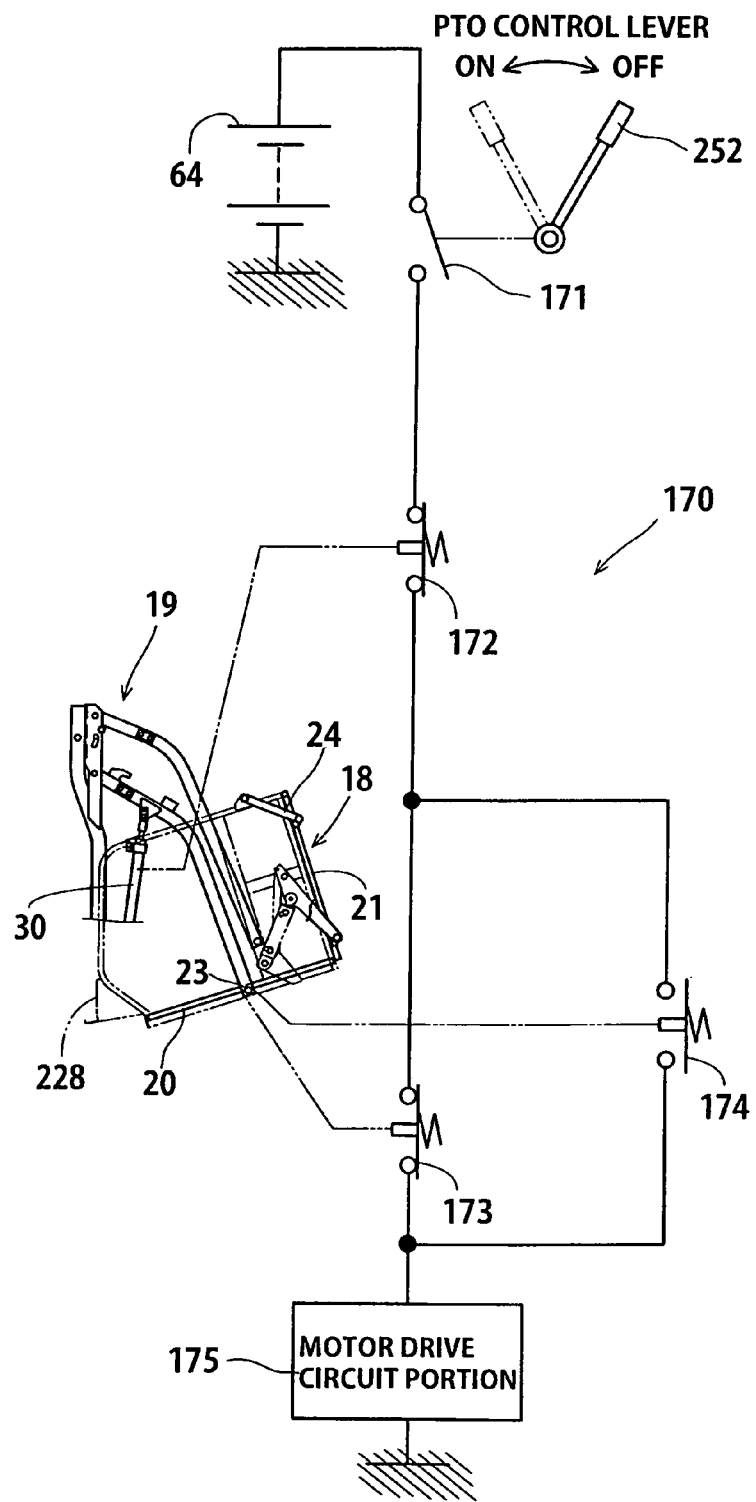
FIG. 28 is an electric circuit view of a PTO regulating mechanism.
Figure 29:
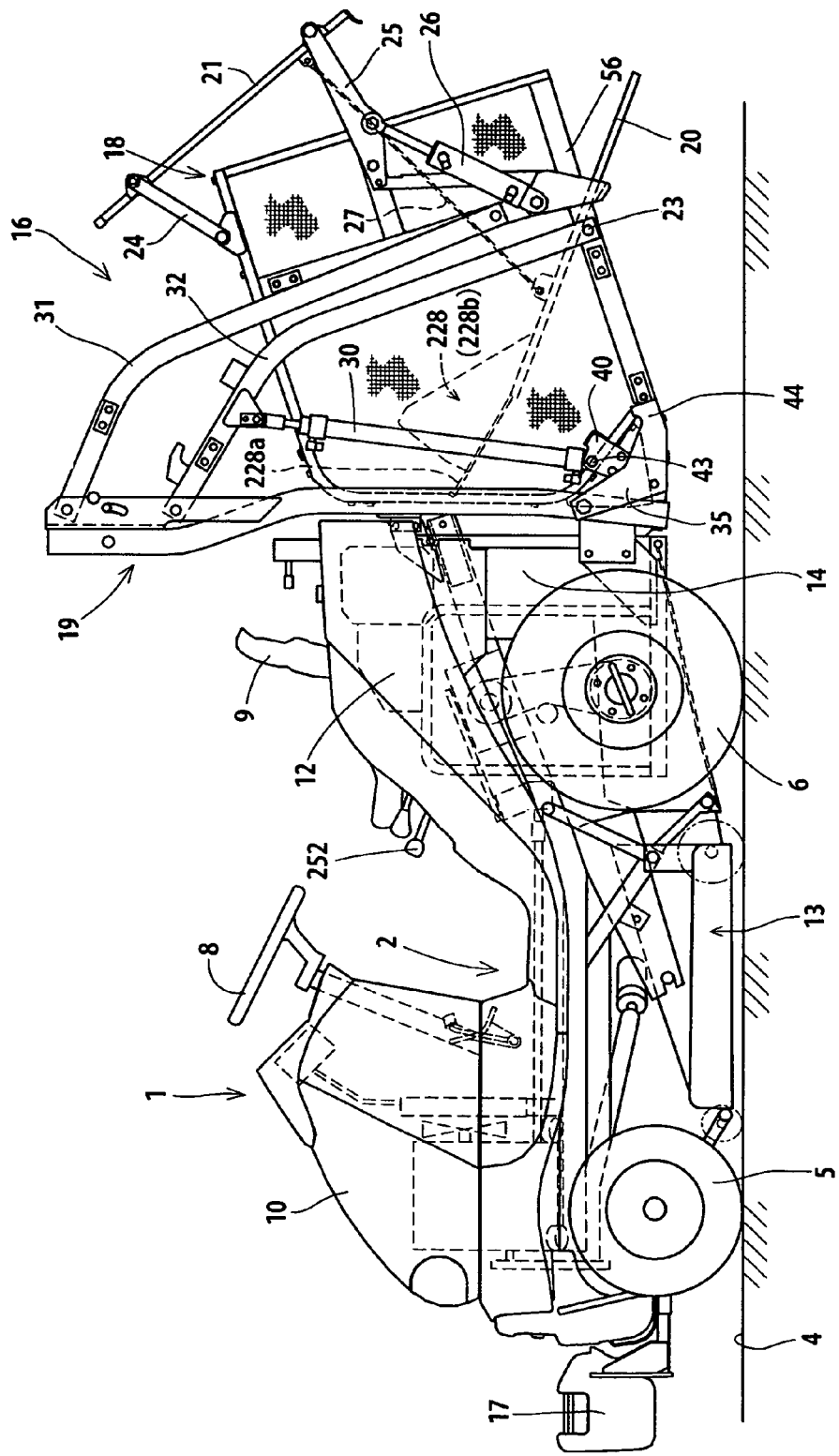
FIG. 29 is a side elevational view showing a state of a discharge work.
Figure 30:
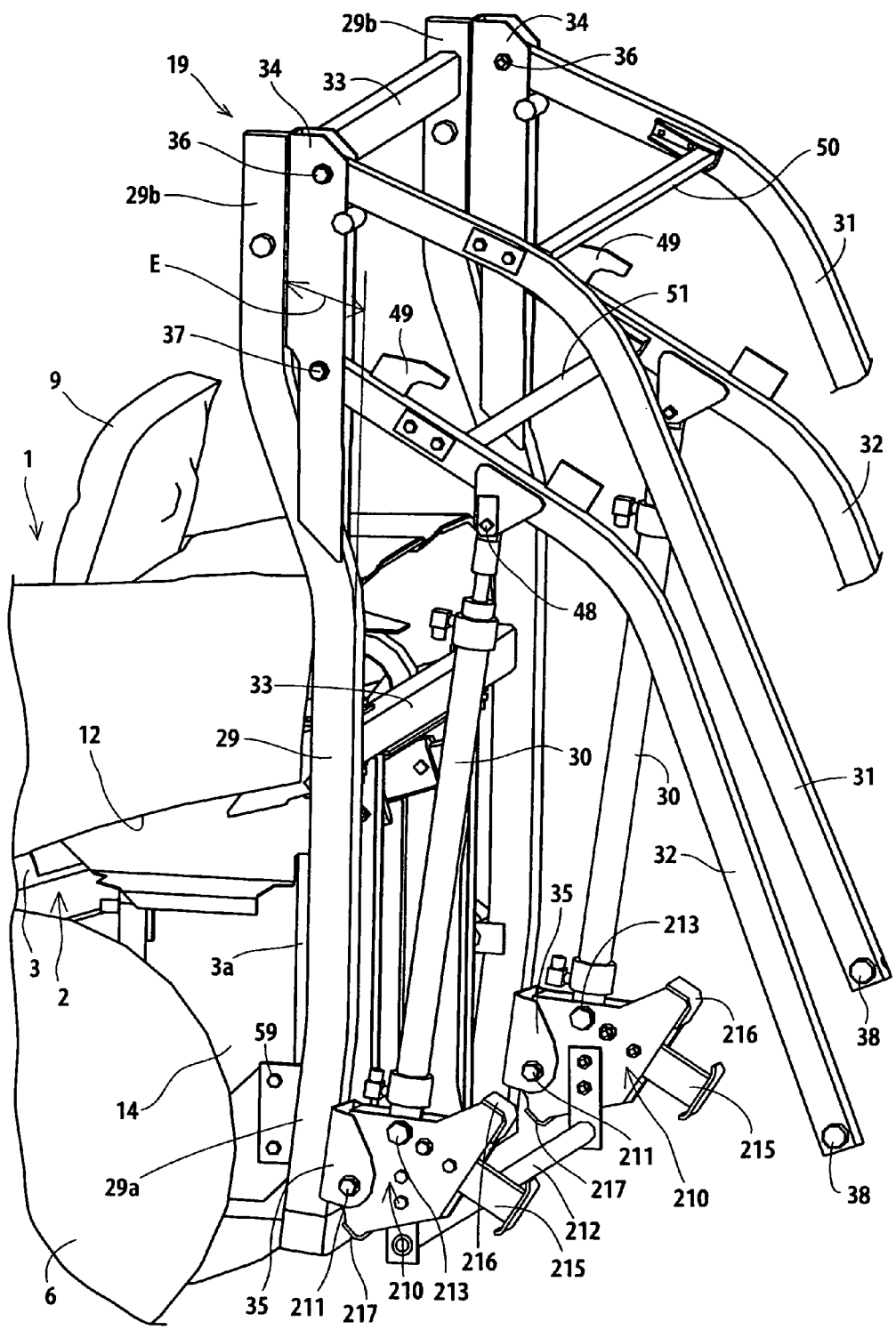
FIG. 30 is a perspective view of a lawn mower from which a grass collection box is detached in accordance with a third embodiment, as seen diagonally from the rear side.
Figure 31:
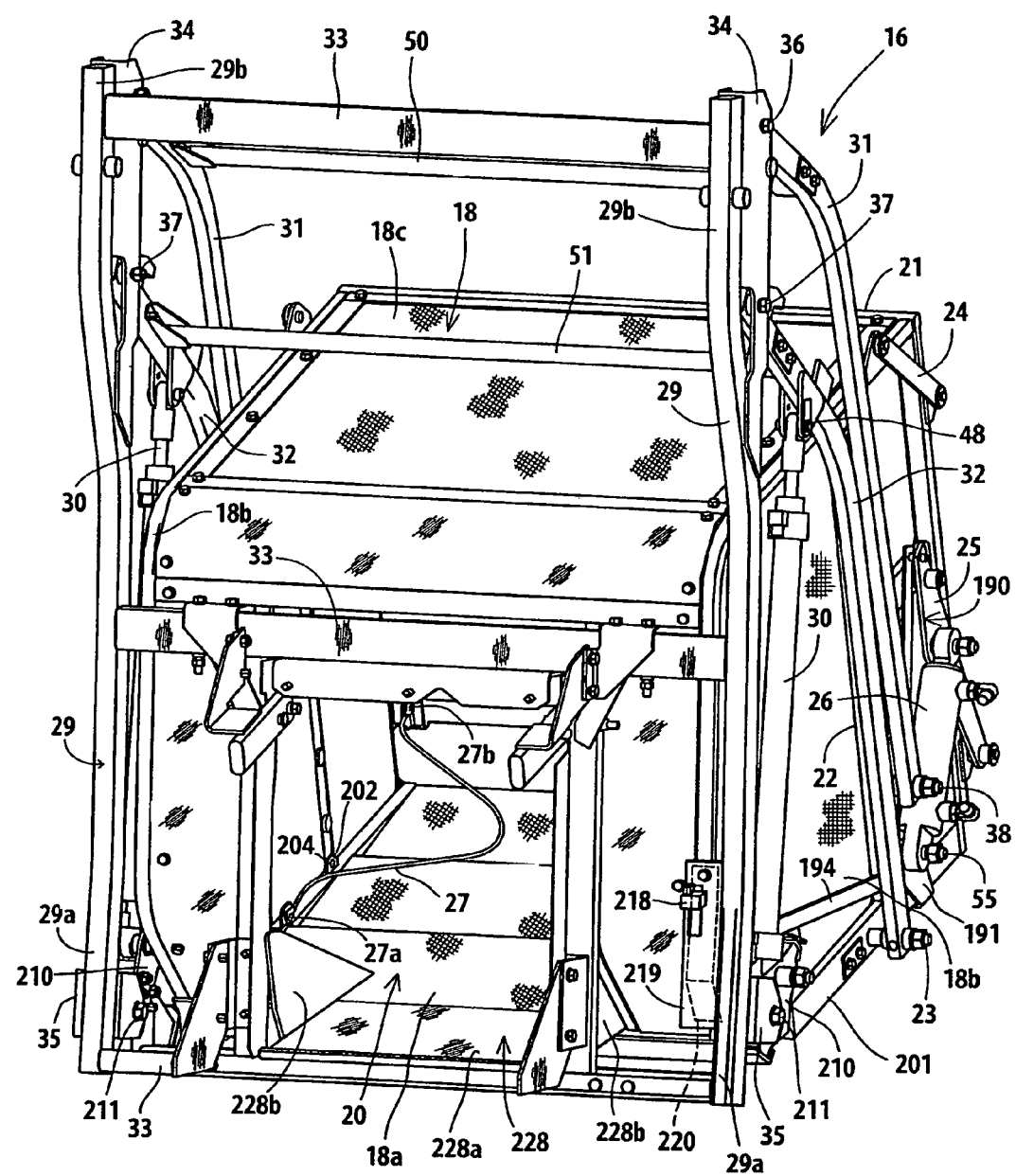
FIG. 31 is a perspective view of a grass collection discharge mechanism detached from the lawn mower as seen diagonally from the front side.
Figure 32:
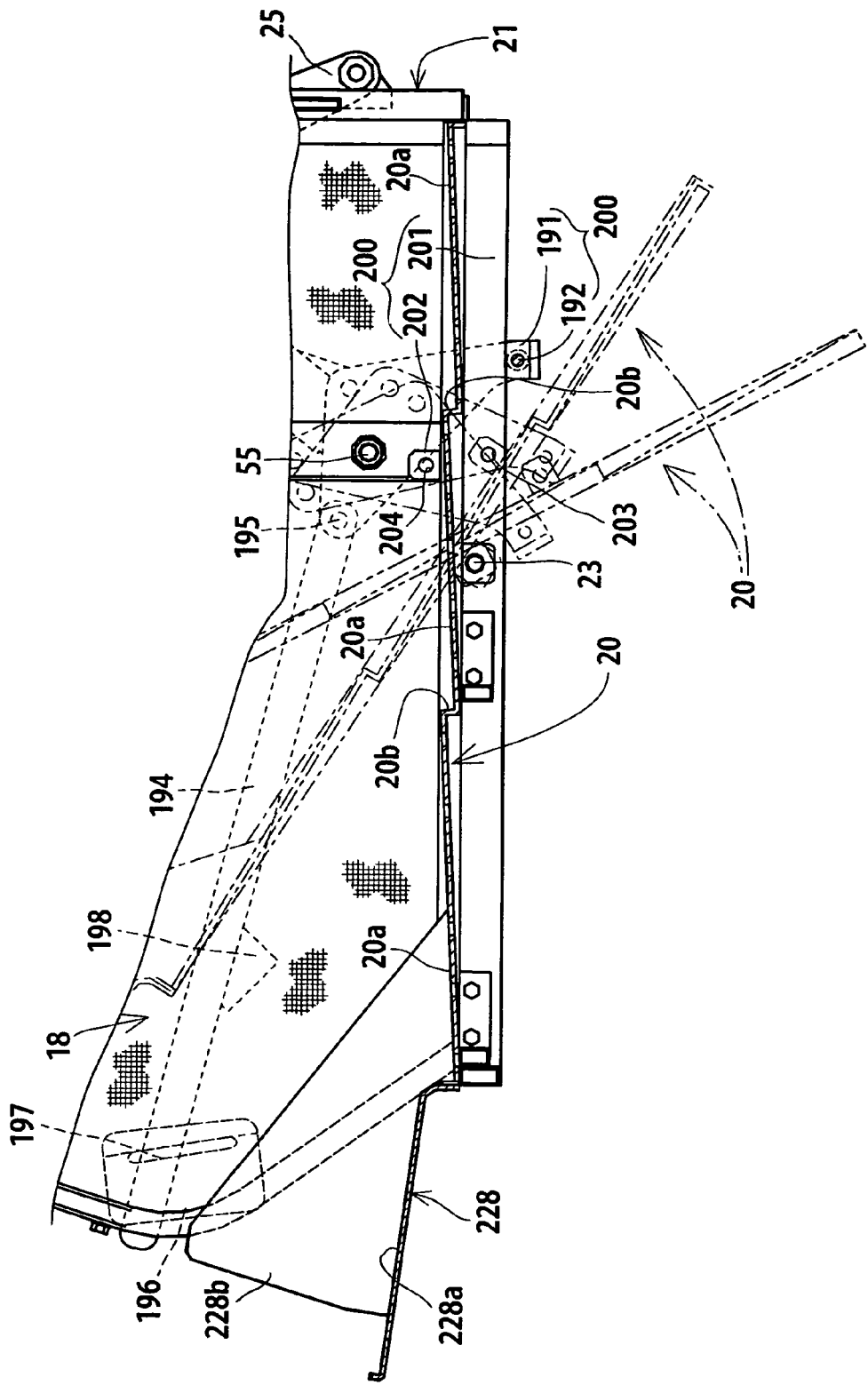
FIG. 32 is an enlarged side elevational cross sectional view of a substantial part of the grass collection box.
Figure 33:
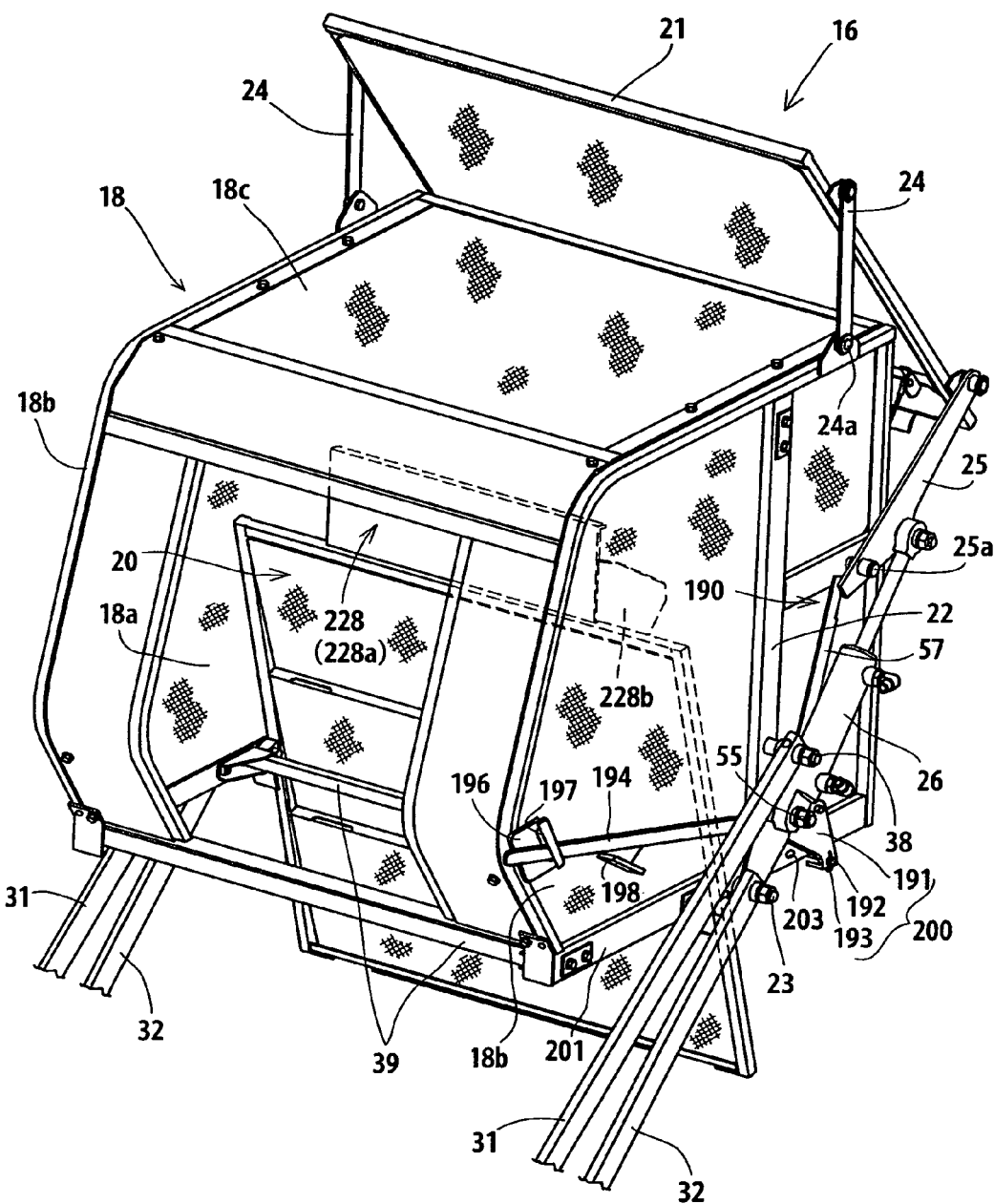
FIG. 33 is a perspective view of the grass collection box at a maximum up position as seen diagonally from the front side.
Figure 34:
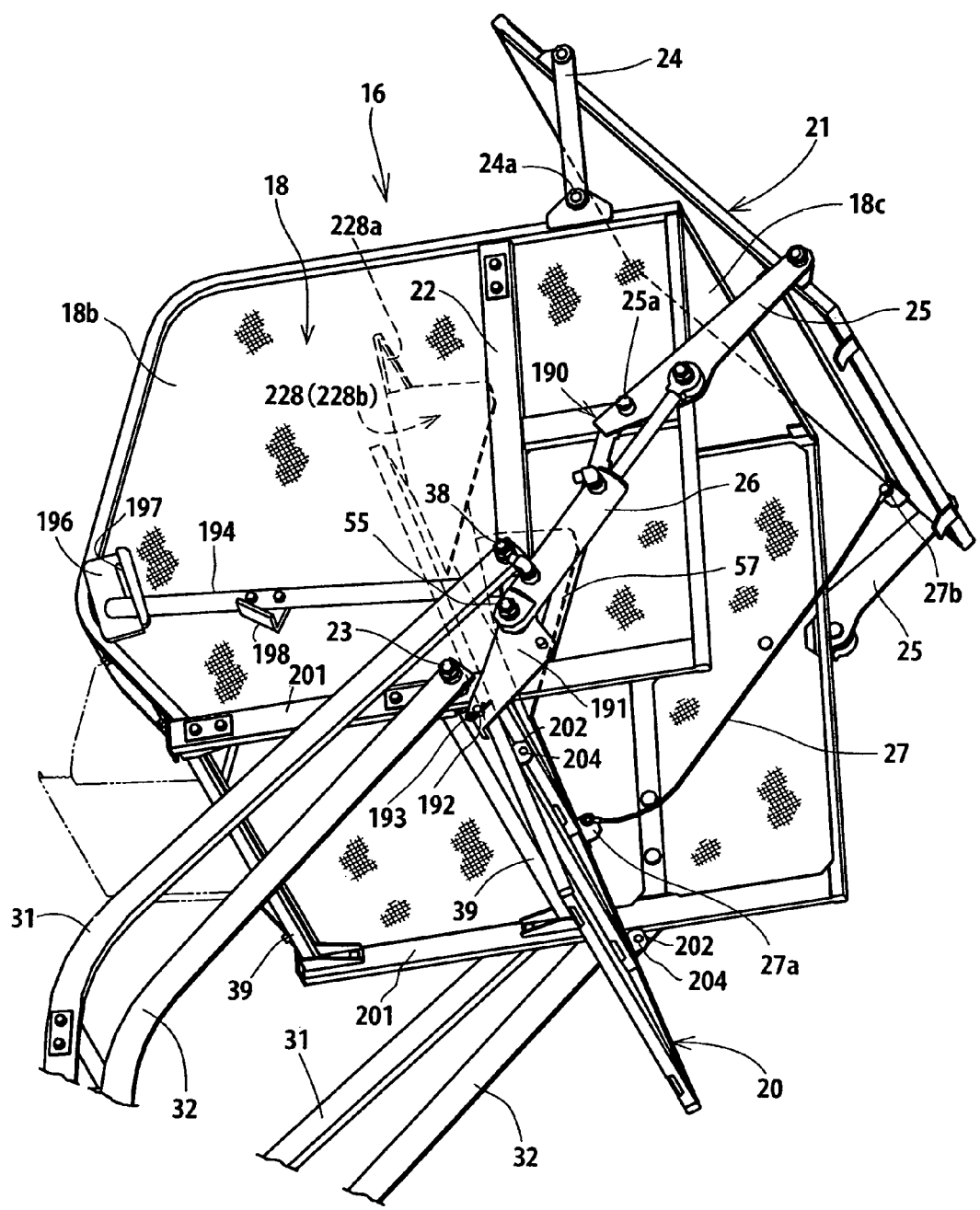
FIG. 34 is a perspective view of the grass collection box at the maximum up position as seen diagonally from the rear side.
Figure 35:
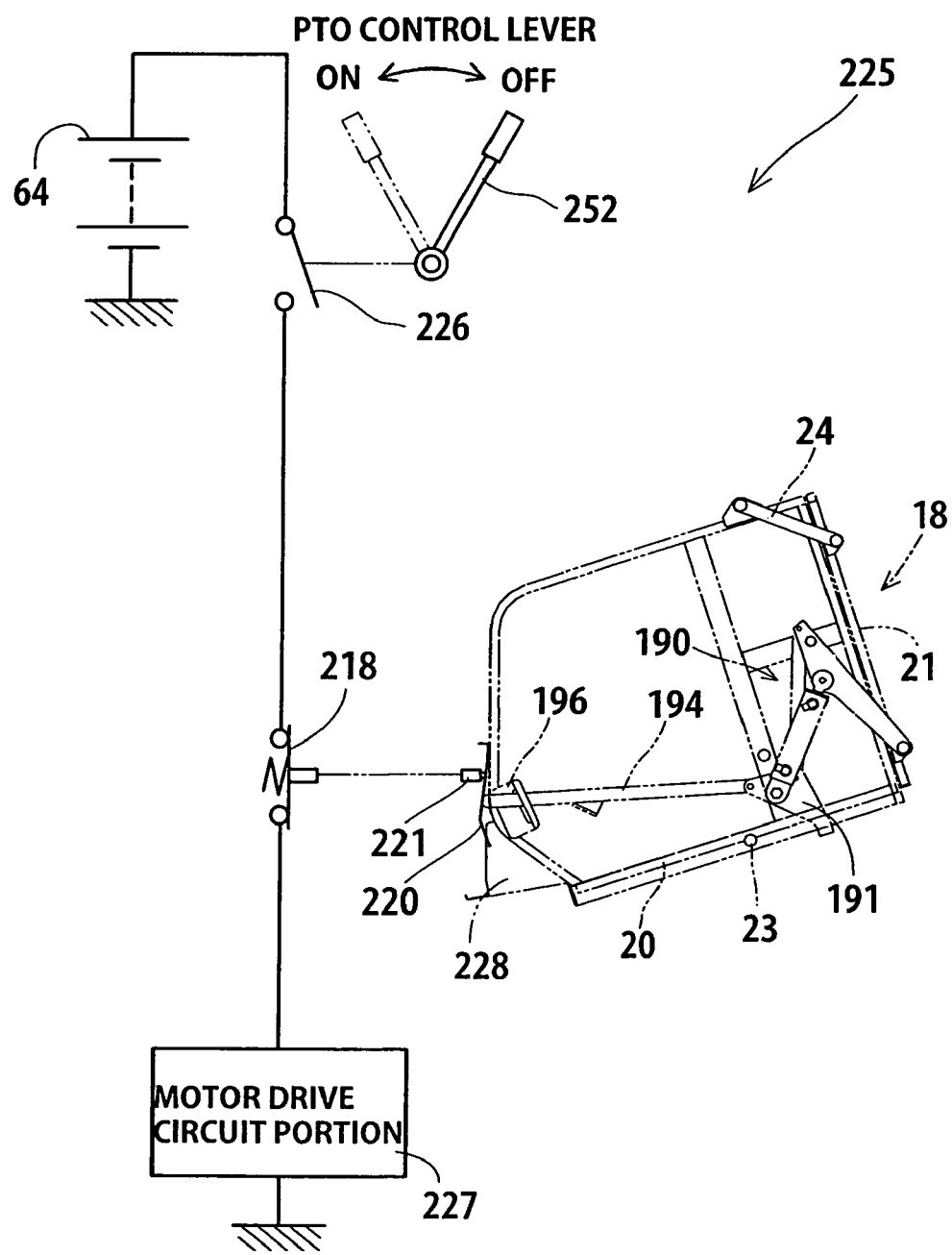
FIG. 35 is an electric circuit view showing a PTO regulating mechanism.
Figure 36:
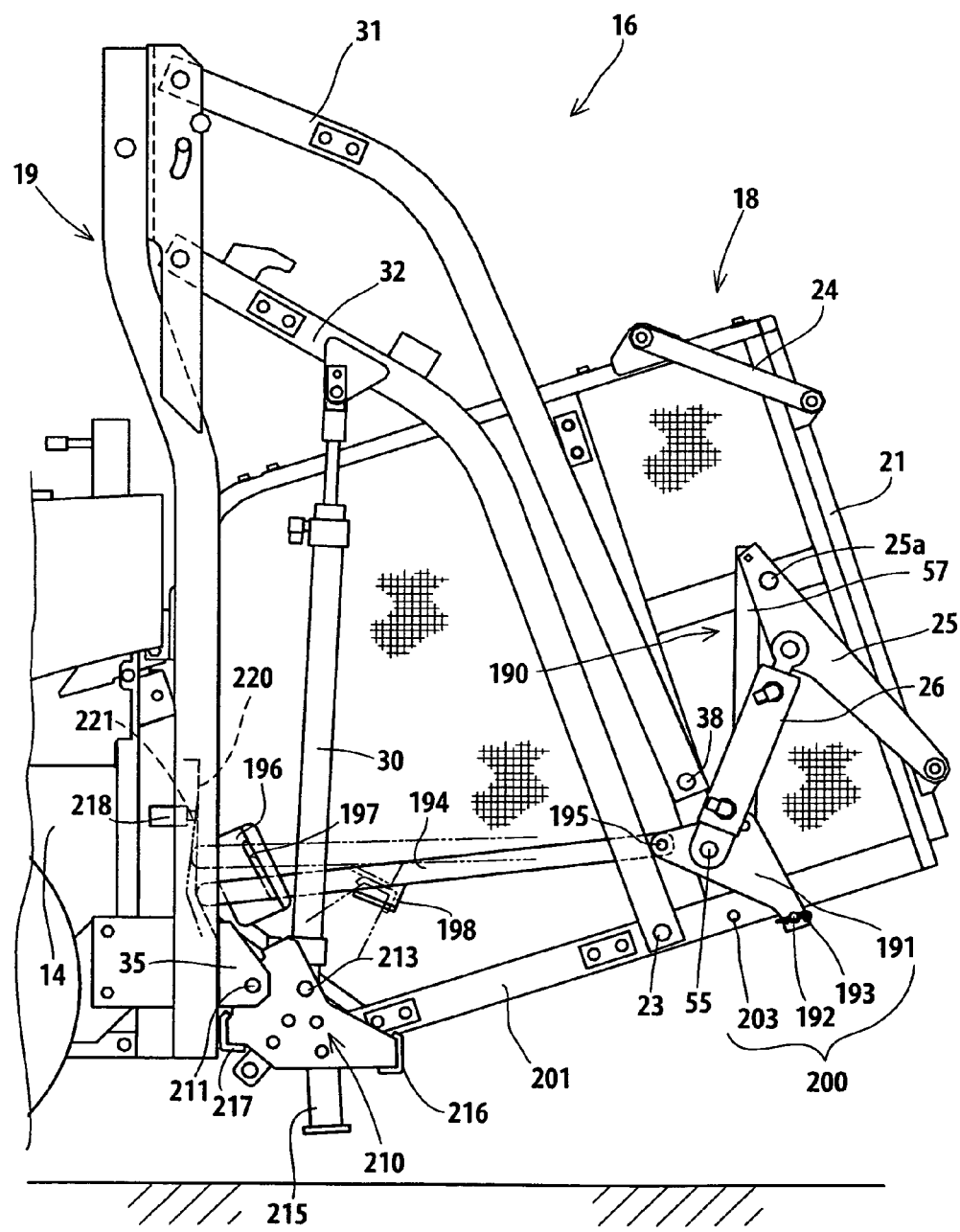
FIG. 36 is an enlarged side elevational view of a grass collection discharge mechanism showing a first state of a mowed grass discharge work.
Figure 37:
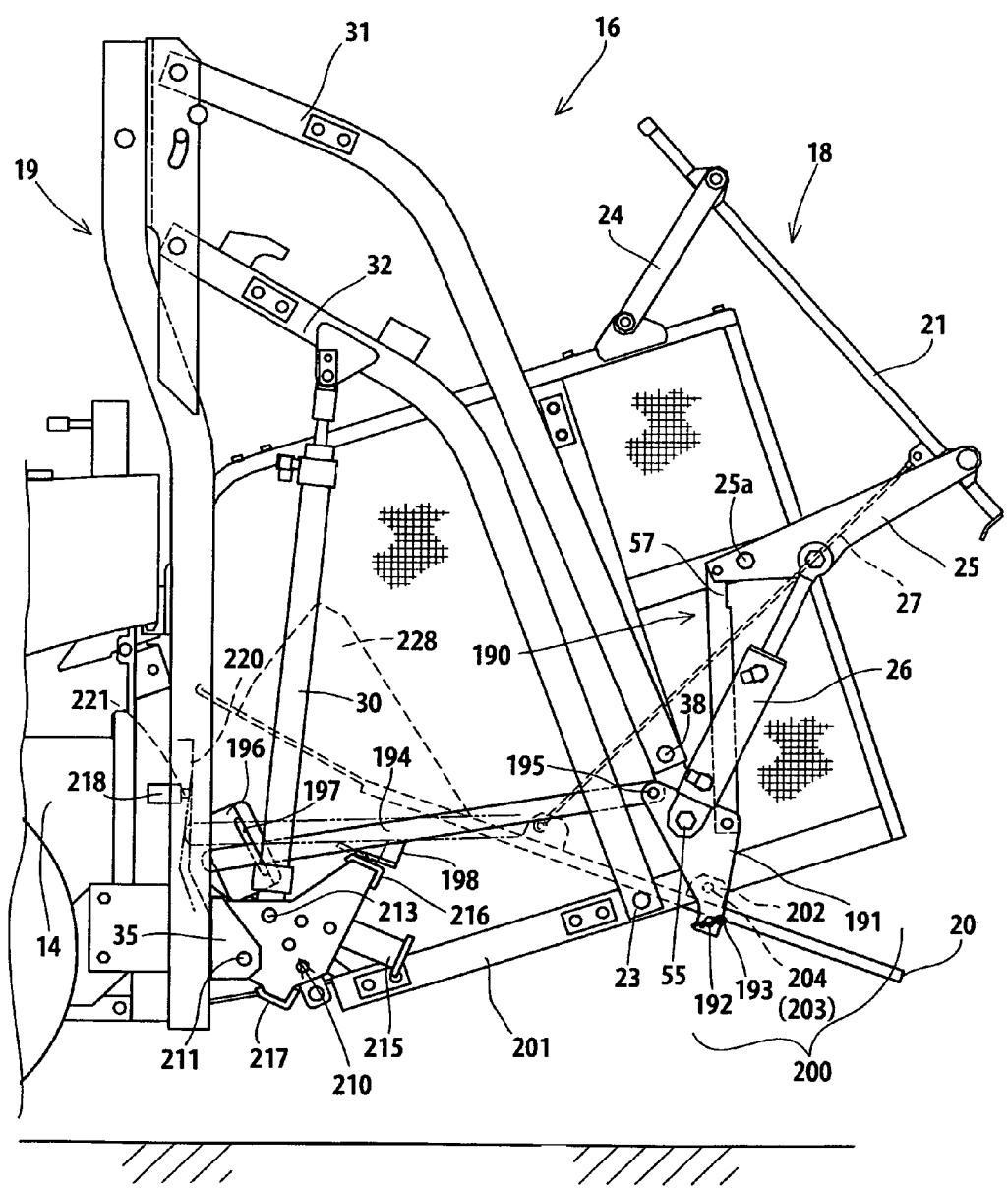
FIG. 37 is an enlarged side elevational view of the grass collection discharge mechanism rotating to open a bottom lid plate and a rear lid plate at a down position.
Figure 38:
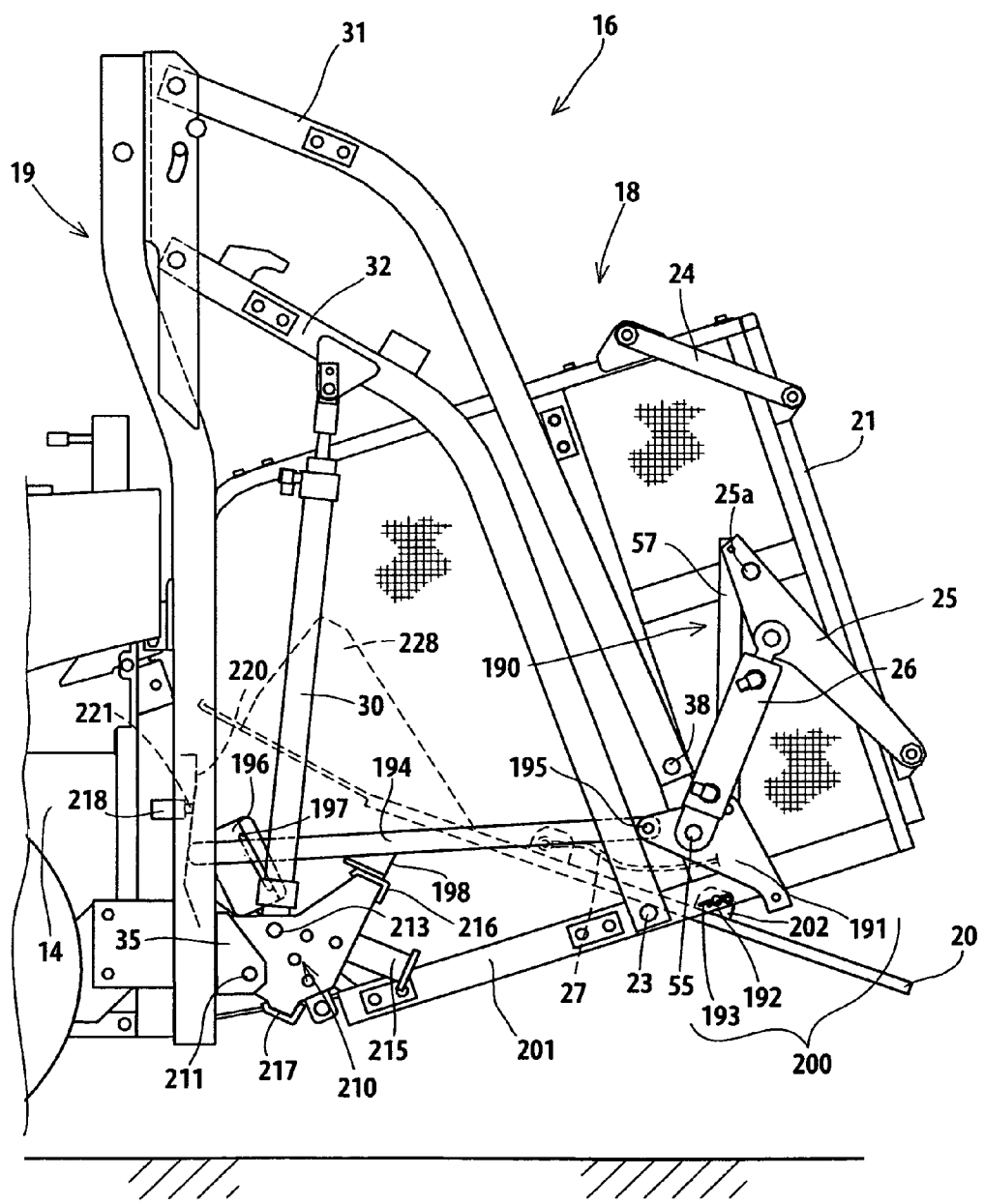
FIG. 38 is an enlarged side elevational view of the grass collection discharge mechanism showing a state of a discharge work.
Figure 39:
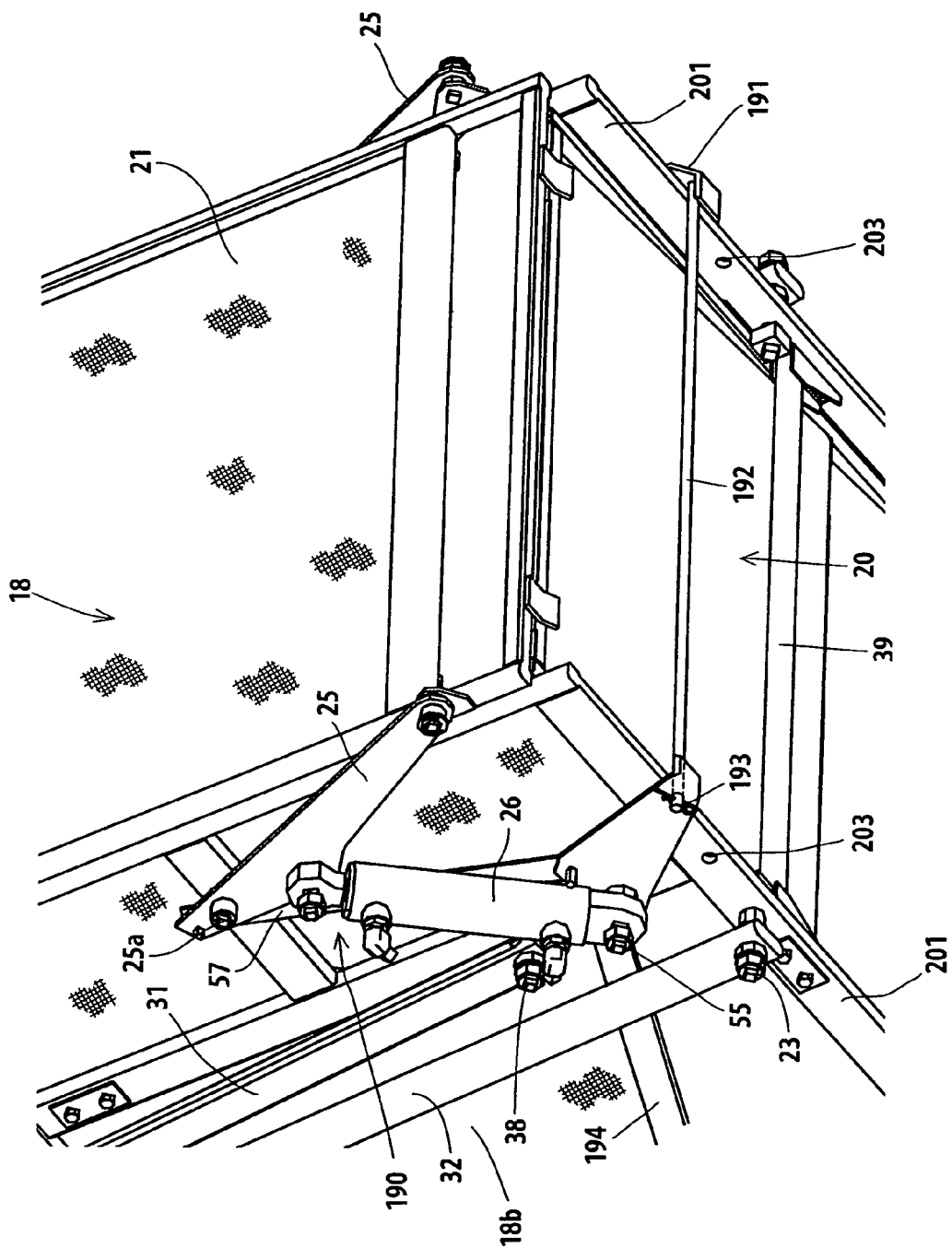
FIG. 39 is a perspective view of the grass collection box as seen diagonally from a lower side on the rear side.
Figure 40:
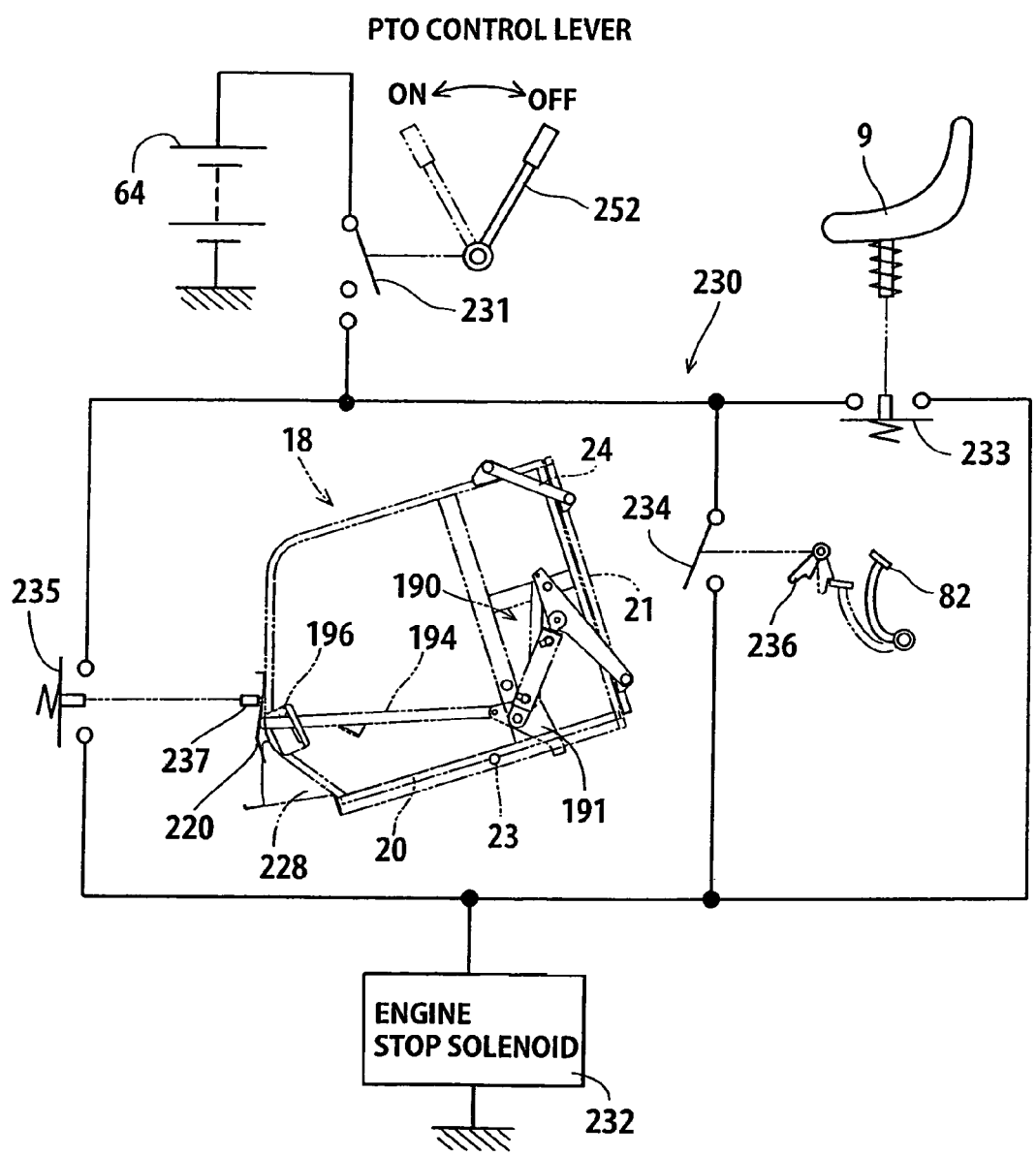
FIG. 40 is an electric circuit view showing a PTO regulating mechanism in accordance with a fourth embodiment.
Figure 41:
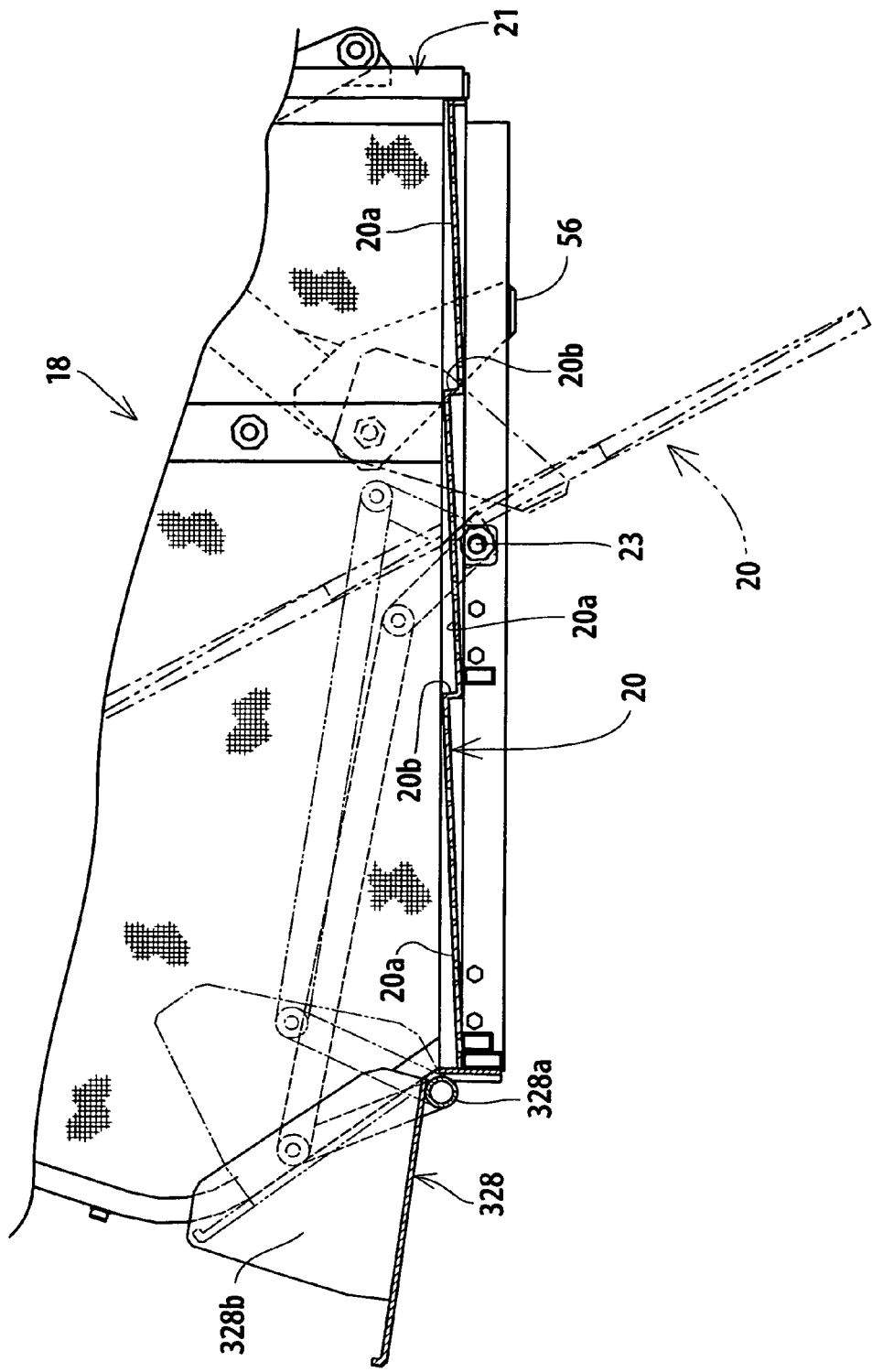
FIG. 41 is an enlarged side elevational cross sectional view of a substantial part of a grass collection box in accordance with a fifth embodiment.
Figure 42:
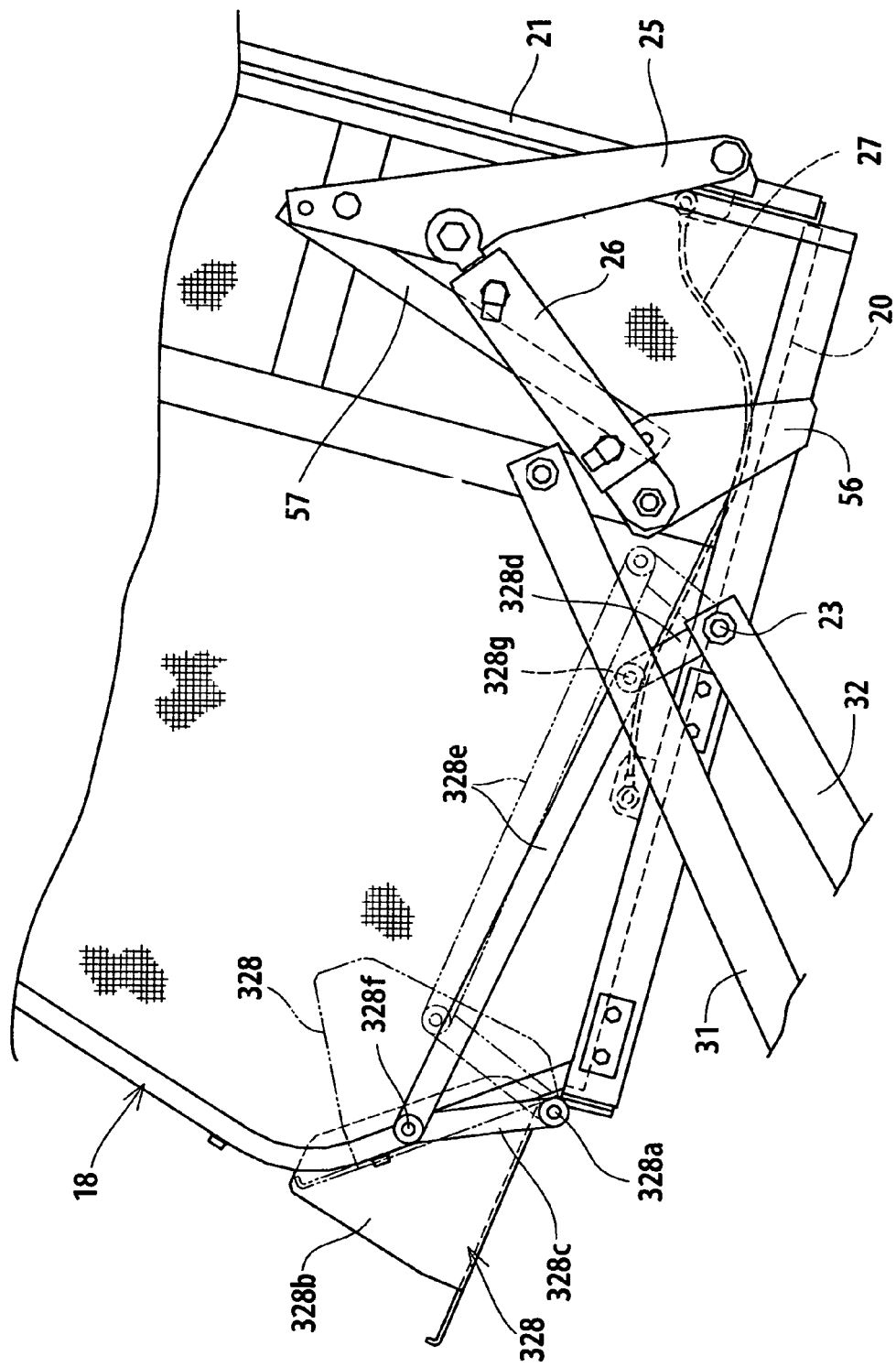
FIG. 42 is an enlarged side elevational view of a substantial part of the grass collection box.
Figure 43:
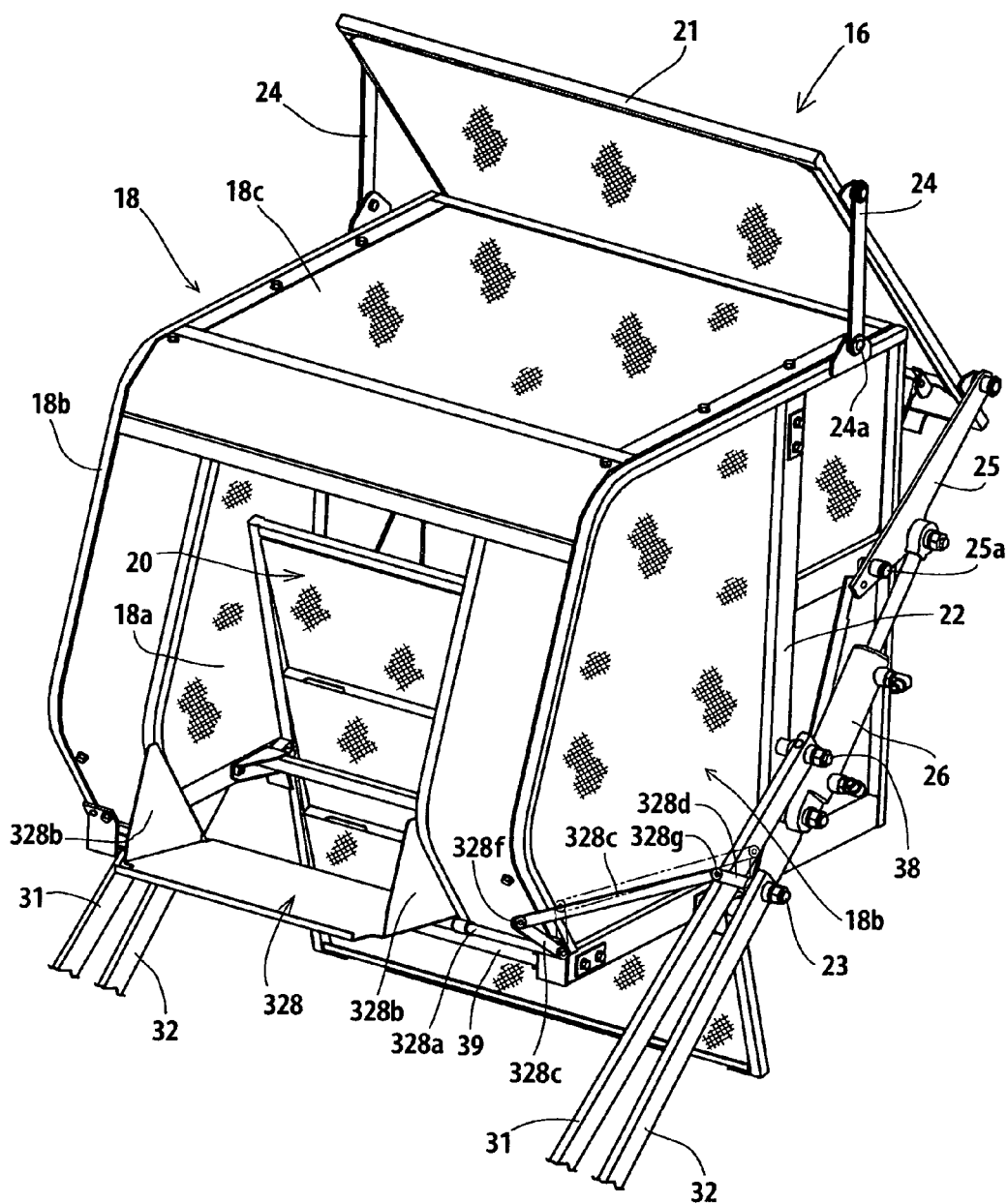
FIG. 43 is a perspective view of the grass collection box at a maximum up position as seen diagonally from the front side.
Figure 44:
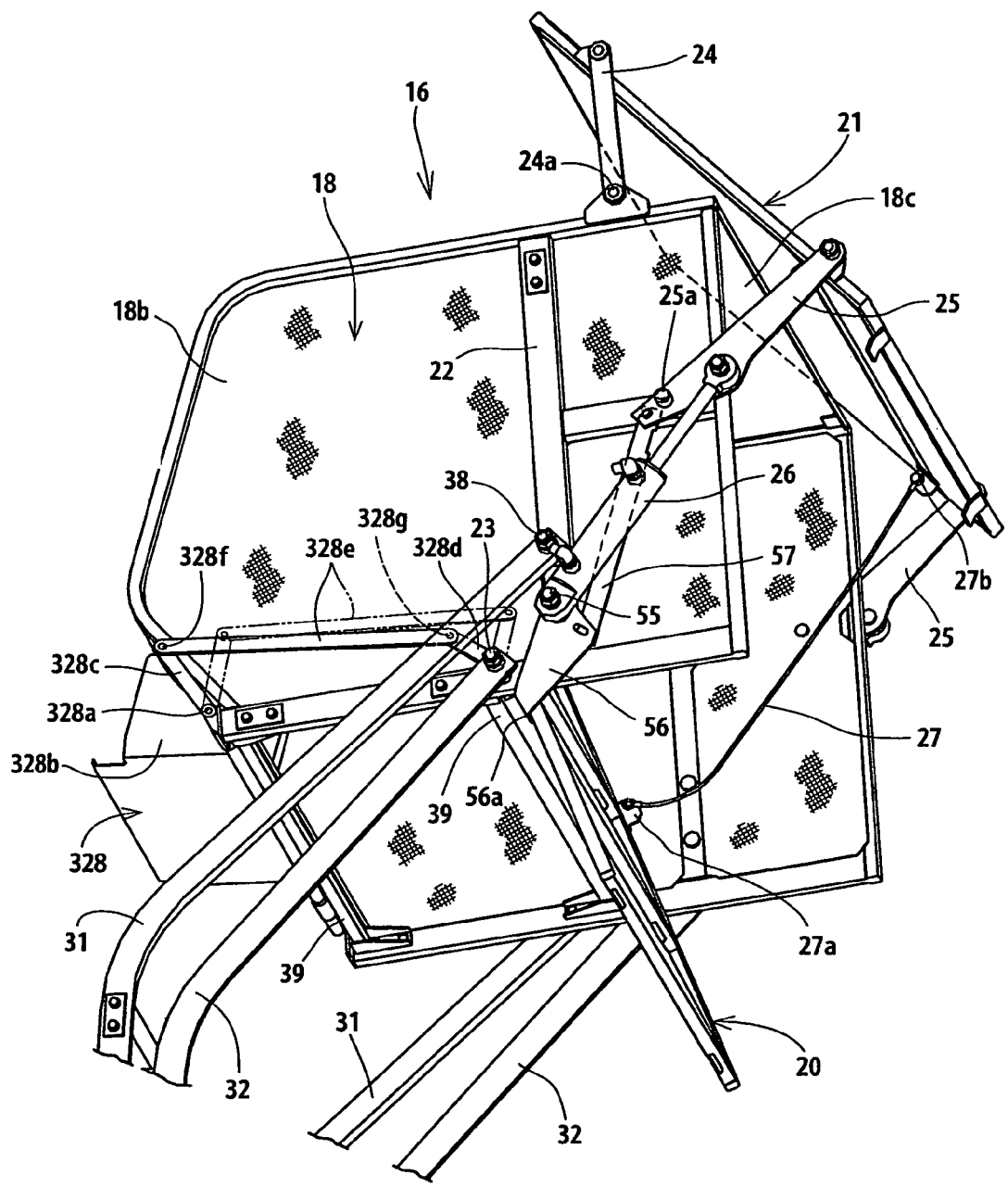
FIG. 44 is a perspective view of the grass collection box at the maximum up position as seen diagonally from the rear side.
Figure 45:
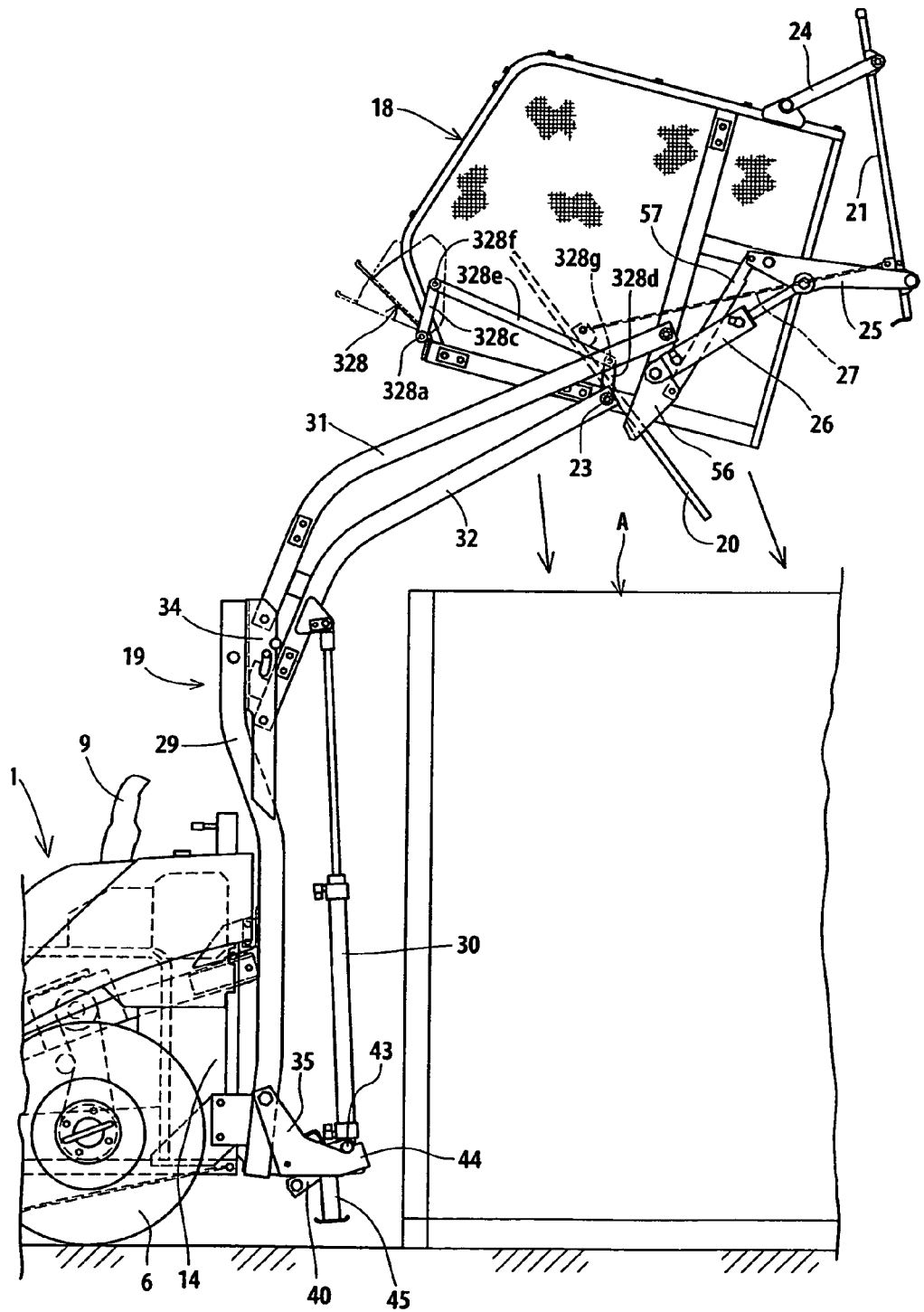
FIG. 45 is a view showing a fourth state of the mowed grass discharge work.
Figure 46:
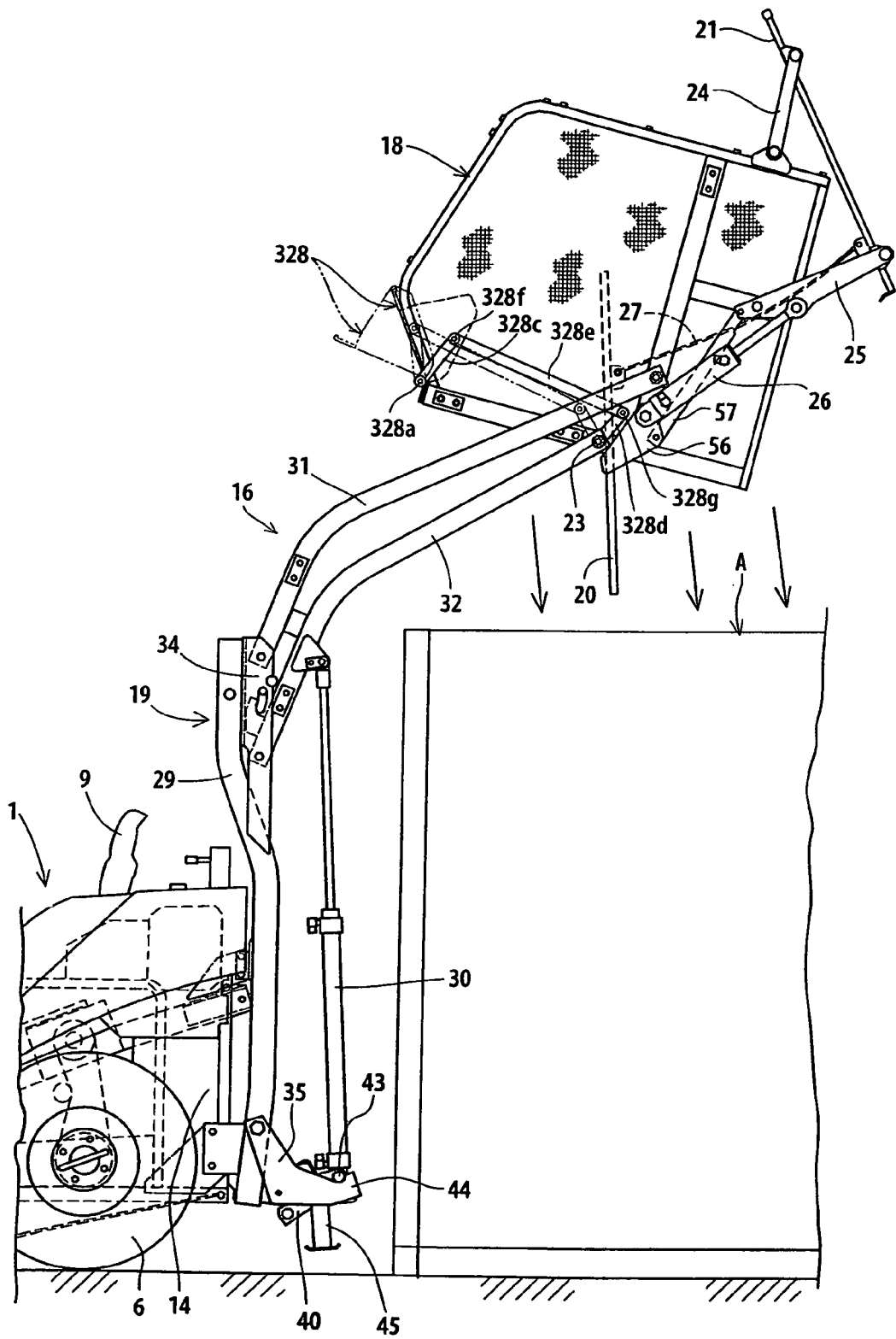
FIG. 46 is a view showing a fifth state of the mowed grass discharge work.
Figure 47:
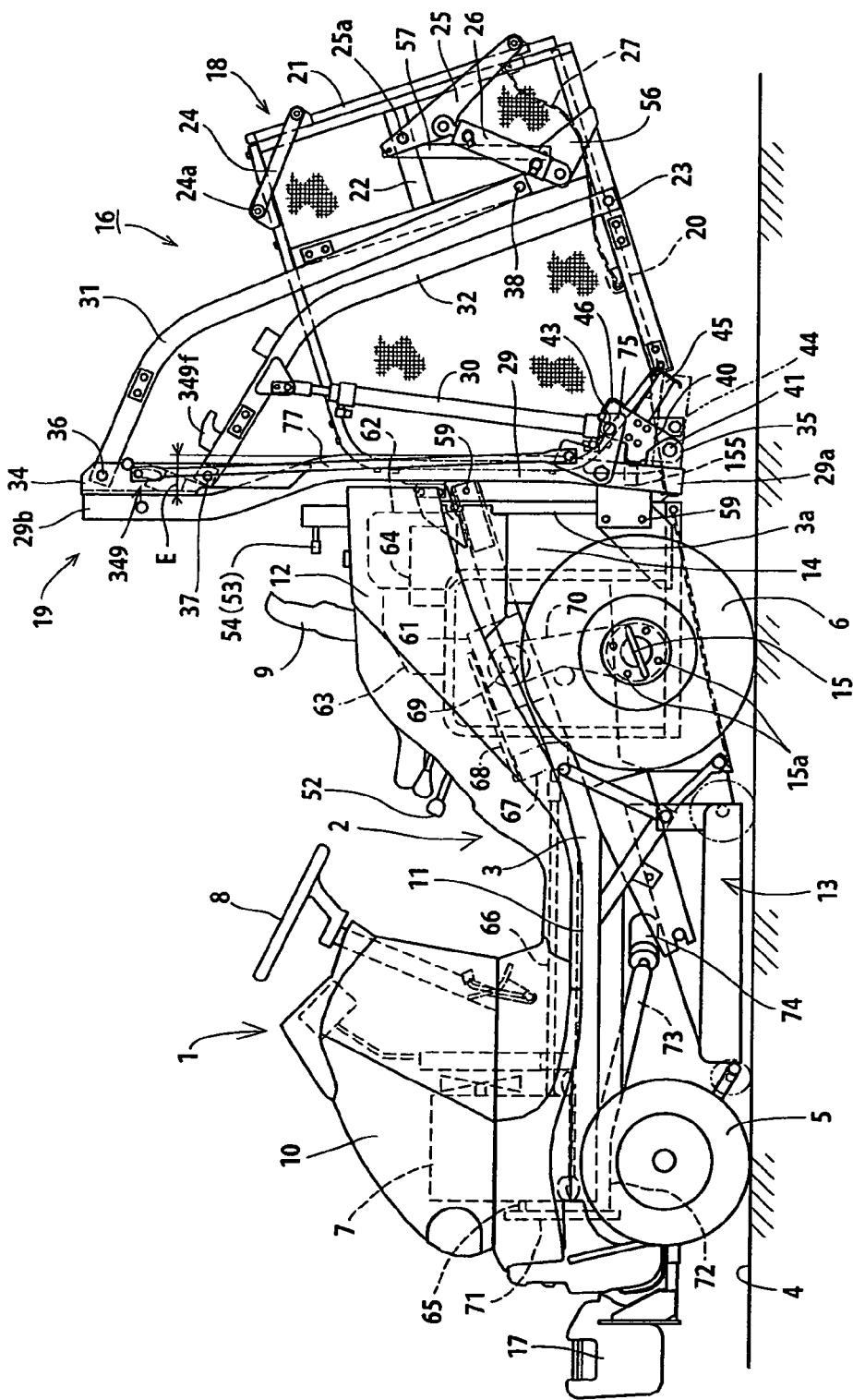
FIG. 47 is a side elevational view of a lawn mower in accordance with a sixth embodiment.
Figure 48:
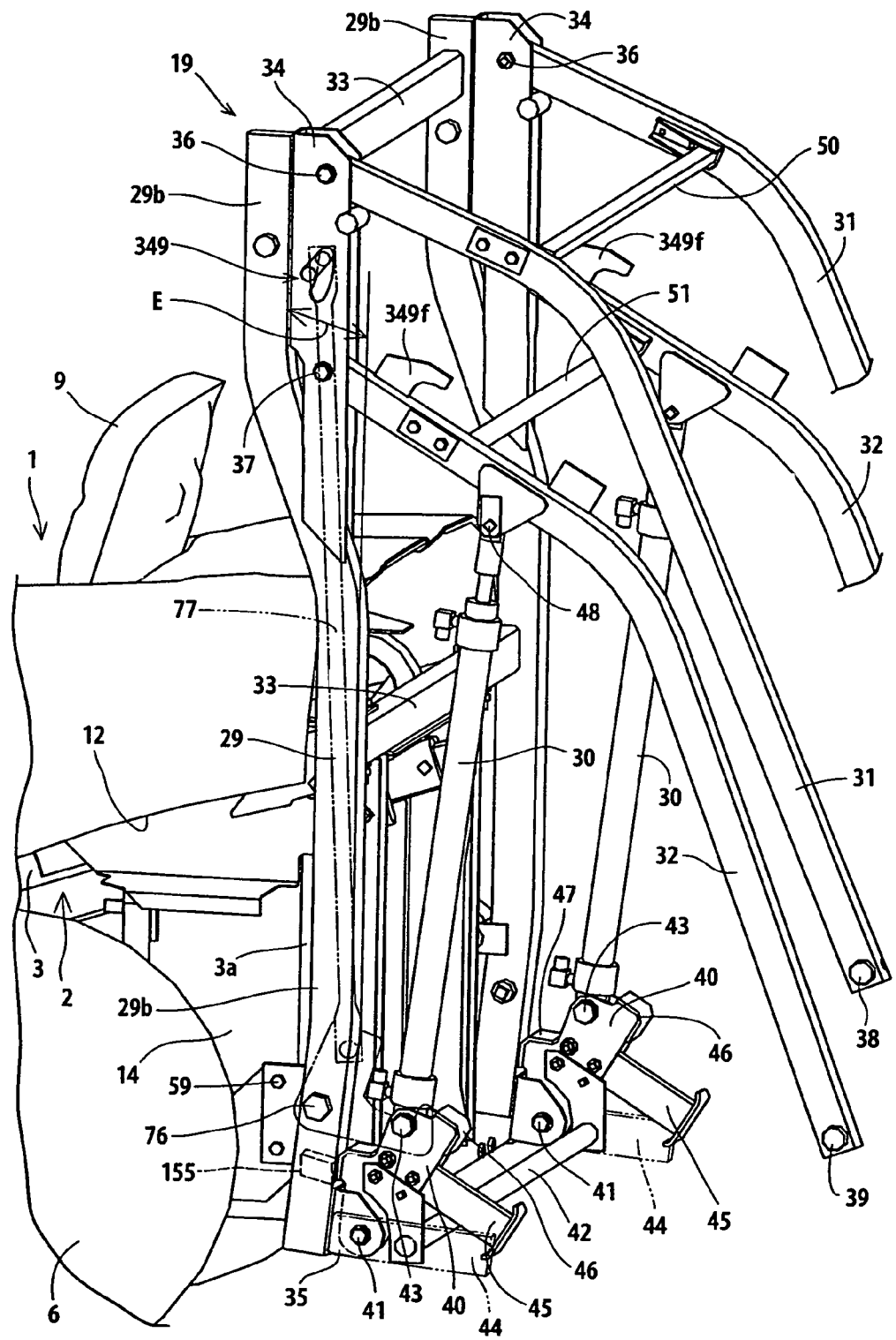
FIG. 48 is a perspective view of the lawn mower from which the grass collection box is detached, as seen diagonally from the rear side.
Figure 49:
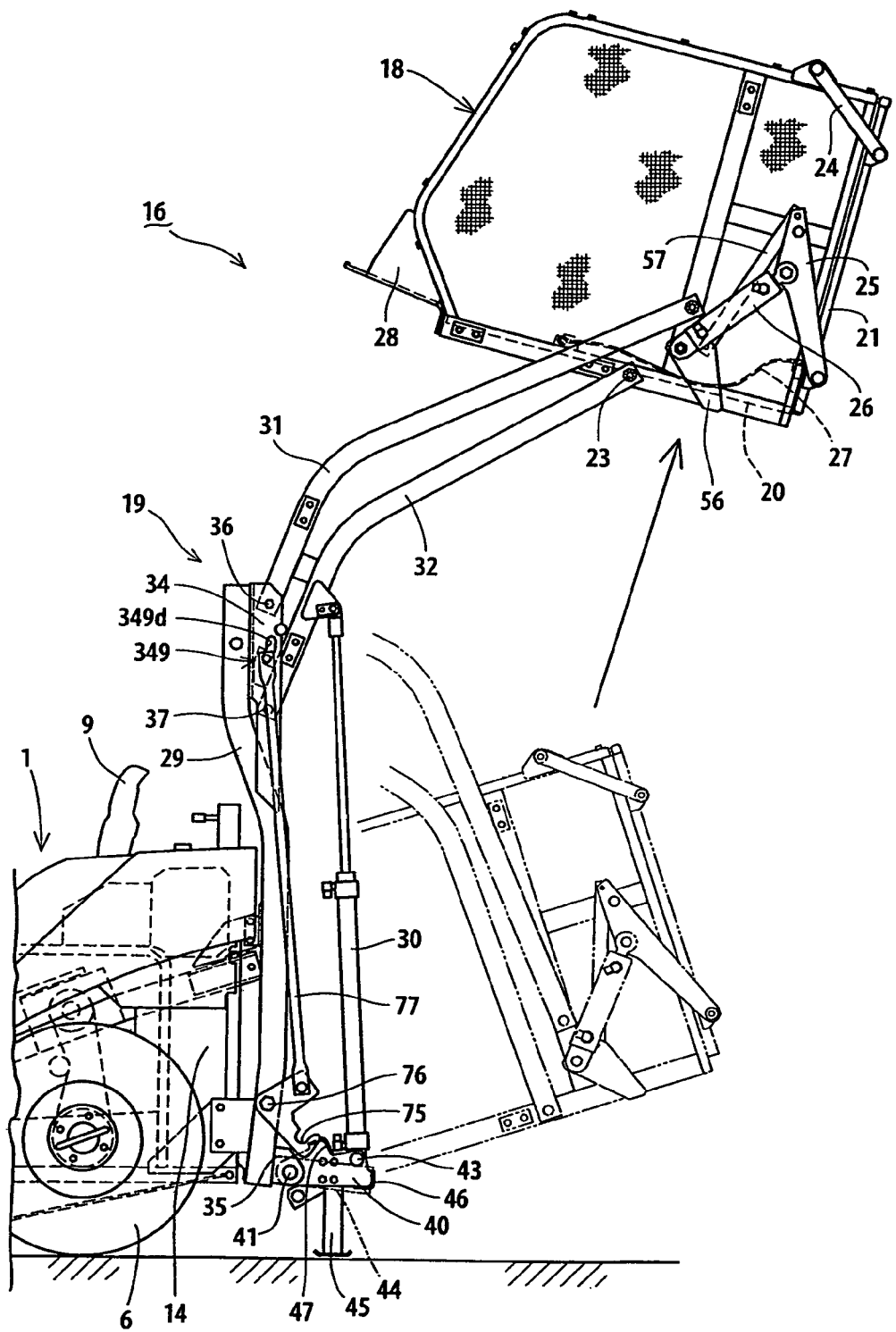
FIG. 49 is a view showing a second state of the mowed grass discharge work.
Figure 50:
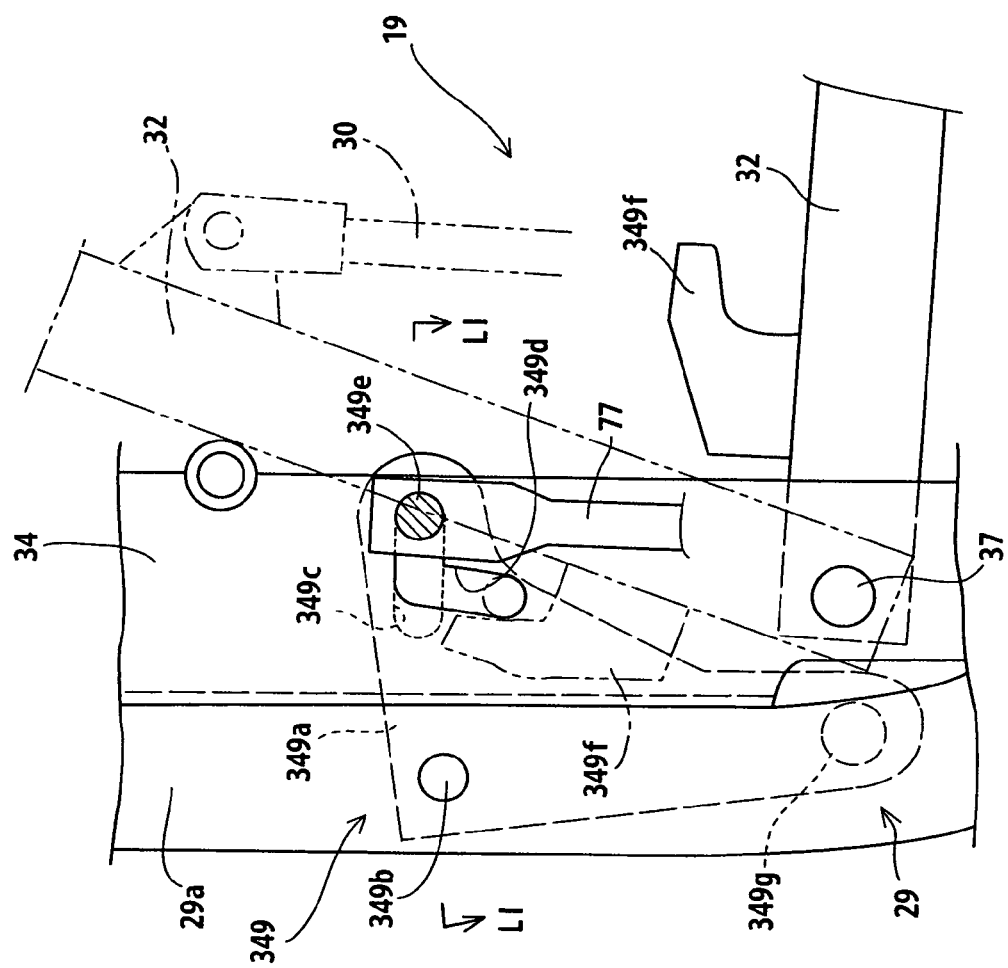
FIG. 50 is an enlarged side elevational view of an upper portion of a lift mechanism.
Figure 51:
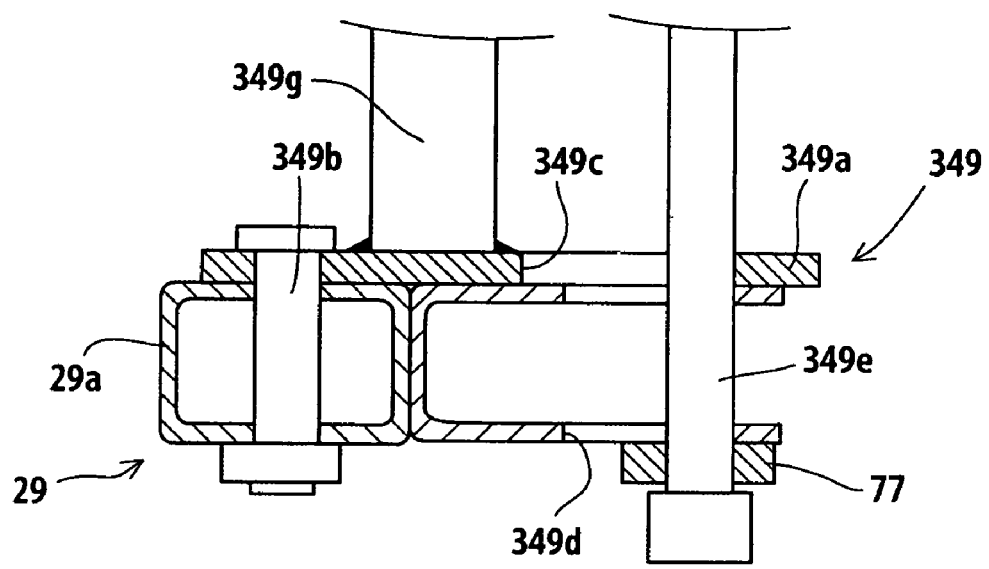
FIG. 51 is a cross sectional view as seen along LI-LI line in FIG. 50.
Figure 52:
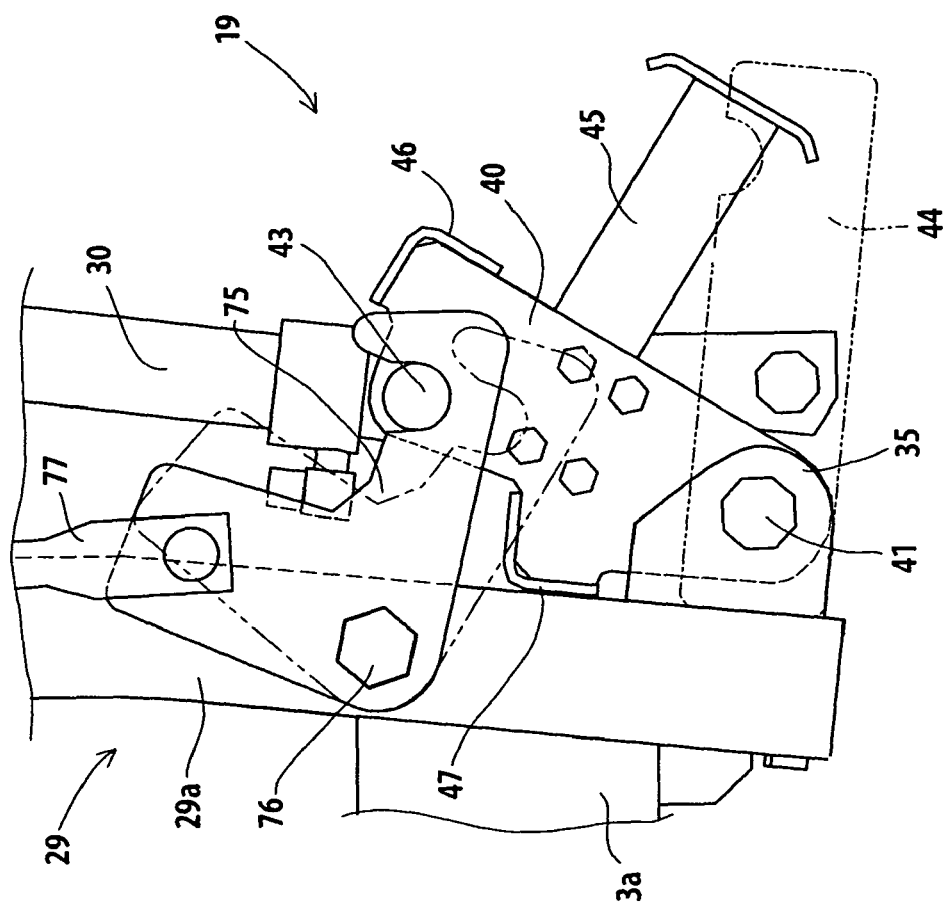
FIG. 52 is an enlarged side elevational view of a lower portion of the lift mechanism.

1 Lawn mower
2 Traveling machine body
7 Engine
9 Control seat
13 Rotary type lawn mowing mechanism
14 Discharge duct]
16 Grass collection discharge mechanism
18 Grass collection box
19 Lift mechanism
20 Bottom lid plate
21 Rear lid plate
26 Opening and closing hydraulic cylinder
28 Bottom portion guide plate
30 Elevating hydraulic cylinder
31, 32 Lifting link
45 Outrigger
52 PTO control lever (PTO control body)
53 Opening and closing control lever
54 Elevating control lever

The invention claimed is:

1. A lawn mower comprising:
a lawn mowing mechanism installed to a traveling machine body;
a grass collection box for receiving grass mowed by the lawn mowing mechanism in a forward attitude;
a lift mechanism for lifting up the grass collection box in the forward attitude;
the grass collection box having a rear lid plate for operably closing an opening formed in a rear surface thereof,
wherein the lawn mower is provided with a bottom lid plate for opening a bottom portion of the grass collection box and operably closing the opened bottom portion, and the mowed grass in the grass collection box is discharged by an opening actuation of the bottom lid plate and the rear lid plate,
the bottom lid plate being coupled to the rear lid plate or an opening and closing mechanism thereof via a flexible member which is arranged in the grass collection box in such a manner as to rotate to open in accordance with the opening actuation of the rear lid plate.

2. The lawn mower according to claim 1, wherein the lawn mower is provided with an outrigger protruding toward the ground surface so as to come close thereto by a driving motion of an elevating hydraulic cylinder of the lift mechanism, at any moment from a time before lifting up the grass collection box to a partway of the lift.

* * * * *